US010412619B2

(12) United States Patent
Ahmadzadeh et al.

(10) Patent No.: US 10,412,619 B2
(45) Date of Patent: Sep. 10, 2019

(54) BUFFER STATUS REPORT FOR EDCS

(71) Applicant: QUALCOMM Incorporated, San Diego, CA (US)

(72) Inventors: Seyed Ali Ahmadzadeh, San Jose, CA (US); Srinivasan Balasubramanian, San Diego, CA (US); Shailesh Maheshwari, San Diego, CA (US); Ashwini Raina, Mountain View, CA (US); Vishal Dalmiya, San Diego, CA (US); Rohit Kapoor, Bangalore (IN); Leena Zacharias, San Jose, CA (US); Bao Vinh Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 14/936,479

(22) Filed: Nov. 9, 2015

(65) Prior Publication Data

US 2016/0142934 A1 May 19, 2016

Related U.S. Application Data

(60) Provisional application No. 62/207,768, filed on Aug. 20, 2015, provisional application No. 62/207,852, filed on Aug. 20, 2015, provisional application No. 62/080,156, filed on Nov. 14, 2014.

(51) Int. Cl.
*H04W 28/02* (2009.01)
*H04W 72/04* (2009.01)
(Continued)

(52) U.S. Cl.
CPC ........... *H04W 28/0278* (2013.01); *H04L 1/00* (2013.01); *H04L 47/36* (2013.01); *H04W 28/06* (2013.01); *H04W 72/04* (2013.01); *H04L 47/30* (2013.01)

(58) Field of Classification Search
None
See application file for complete search history.

(56) References Cited

U.S. PATENT DOCUMENTS 9,398,489 B1 * 7/2016 Akhter ................. H04W 28/06
2009/0296637 A1 12/2009 Fischer
(Continued)

FOREIGN PATENT DOCUMENTS

WO WO-2009058086 A1 5/2009

OTHER PUBLICATIONS

ISA/EPO, International Search Report and Written Opinion of the International Searching Authority, Int'l. App. No. PCT/US2015/059904, dated Feb. 16, 2016, European Patent Office, Rijswijk, NL, 11 pgs.

(Continued)

*Primary Examiner* — Rebecca E Song
(74) *Attorney, Agent, or Firm* — Dalei Dong; Holland & Hart LLP

(57) ABSTRACT

Methods, systems, and devices are described for wireless communication. A user equipment (UE), for example, may determine a content size of an uncompressed buffer and a content size of a compressed buffer. The UE may then generate a buffer status report (BSR) based on the content sizes of the uncompressed buffer and the compressed buffer. Alternatively, a base station may receive a BSR based on a size of an uncompressed buffer of the UE. The base station may then receive a compressed packet from the UE and may determine a compression gain based on a size of the compressed packet and a size of a corresponding uncompressed packet. The base station may then adjust the received BSR based on the compression gain.

18 Claims, 29 Drawing Sheets

(51) Int. Cl.
  *H04L 1/00* (2006.01)
  *H04W 28/06* (2009.01)
  *H04L 12/805* (2013.01)
  *H04L 12/835* (2013.01)

(56) References Cited

U.S. PATENT DOCUMENTS

| | | |
|---|---|---|
| 2010/0284314 A1 | 11/2010 | Pelletier et al. |
| 2010/0329135 A1 | 12/2010 | Pelletier et al. |
| 2011/0019643 A1* | 1/2011 | Kim .................... H04W 36/02 370/331 |
| 2013/0121157 A1* | 5/2013 | Logvinov ........... H04L 41/0833 370/238 |
| 2014/0281344 A1* | 9/2014 | Shin ........................ G06F 12/02 711/171 |
| 2015/0117245 A1* | 4/2015 | Zhang ............... H04W 72/1284 370/252 |
| 2015/0180936 A1* | 6/2015 | Ichien .................... H04L 67/06 709/217 |
| 2016/0286429 A1* | 9/2016 | Chen ................. H04W 72/1284 |
| 2016/0309363 A1* | 10/2016 | Persson .................. H04L 69/04 |

OTHER PUBLICATIONS

IPEA/EP, Second Written Opinion of the International Preliminary Examining Authority, Int'l Application No. PCT/US2015/059904, dated Oct. 12, 2016, European Patent Office, Rijswijk, NL, 11 pgs.

\* cited by examiner

BUFFER STATUS REPORT FOR EDCS

CROSS REFERENCES

The present Application for Patent claims priority to U.S. Provisional Patent Application No. 62/080,156 by Ahmadzadeh, et al., entitled, "Buffer Status Report For eDCS", filed Nov. 14, 2014 and U.S. Provisional Patent Application No. 62/207,852 by Zacharias, et al., entitled, "Buffer Status Report For eDCS", filed Aug. 20, 2015 and U.S. Provisional Application No. 62/207,768 by Zacharias, et al., entitled, "Techniques For Optimizing Uplink Data Compression" filed Aug. 20, 2015, assigned to the assignee hereof, and each is hereby incorporated by reference in its entirety.

BACKGROUND

Field of Disclosure

The following relates generally to wireless communication, and more specifically to buffer status reports in an evolved data compression scheme (eDCS).

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a user equipment (UE) to a base station).

In some cases, a UE may use a buffer status report (BSR) in order to communicate an amount of data that is pending for transmission over a channel to a base station. The data may be divided into packets, and the BSR may be based on the size of the packets. Using the BSR, a scheduler in a base station may decide on a grant size and a grant assignment frequency for the UE. The UE may then communicate one or more pending packets to the base station based on the grant size. However, in some cases, data acceleration techniques may be used to compress the packets. When the packets are compressed, the BSR may not accurately communicate the amount of data that is pending for transmission.

SUMMARY

Systems, methods, and apparatuses for generating buffer status reports in network employing an evolved data compression scheme (eDCS) are described. A UE may determine a content size of an uncompressed buffer and a content size of a compressed buffer. The UE may then generate a buffer status report (BSR) based on the content sizes of the uncompressed buffer and the compressed buffer. Additionally or alternatively, a base station may receive a BSR based on a size of an uncompressed buffer of the UE. The base station may then receive a compressed packet from the UE and may determine a compression gain based on a size of the compressed packet and a size of a corresponding uncompressed packet. The base station may then adjust the received BSR based on the compression gain.

In some aspects, a method of communication at a wireless device may include determining a first content size of an uncompressed buffer; determining a second content size of a compressed buffer; and generating a buffer status report (BSR) based at least in part on the first content size of the uncompressed buffer and the second content size of the compressed buffer.

In some aspects, the method may further include determining whether a packet is uncompressed or compressed based at least in part on a contents of the uncompressed buffer and a contents of the compressed buffer, wherein generating the BSR is based at least in part on an uncompressed service data unit (SDU) size if the packet is uncompressed or on a compressed SDU size if the packet is compressed.

In some aspects, the method may further include receiving an acknowledgement (ACK) indicating a successfully received packet; removing a compressed copy of the packet from the compressed buffer; and removing an uncompressed copy of the packet from the uncompressed buffer.

In some aspects, receiving the acknowledgement may include receiving a radio link control (RLC) ACK message corresponding to the successfully received packet. In some aspects, receiving the ACK may include receiving RLC ACK messages corresponding to previously transmitted packets of a packet data convergence protocol (PDCP) sequence.

In some aspects, the method may further include receiving an acknowledgement indicating a successfully received packet; determining that a previously transmitted packet of a packet data convergence protocol (PDCP) sequence corresponds to a hole in a receiver window; and omitting the successfully received packet from subsequent BSRs.

In some aspects, the method may further include determining a data compression scheme is disabled or reset; removing a contents of the compressed buffer; and generating a subsequent BSR based at least in part on the content size of the uncompressed buffer.

In some aspects, the method, may further include determining that the uncompressed buffer contains an uncompressed packet; identifying a compressed packet in the compressed buffer corresponding to the uncompressed packet; determining a compression gain based at least in part on the uncompressed packet and the corresponding compressed packet; and generating the BSR based at least in part on the compression gain. In some aspects, determining the compression gain may include determining a size of the uncompressed packet, determining a size of the corresponding compressed packet, and comparing the size of the uncompressed packet to the size of the corresponding compressed packet.

In some aspects, generating the BSR may include scaling the first content size of the uncompressed buffer by the compression gain. In some aspects, the method may further include identifying a subsequent uncompressed packet in the uncompressed buffer; identifying a subsequent compressed packet in the compressed buffer corresponding to the subsequent uncompressed packet; comparing the subsequent uncompressed packet and the corresponding subsequent compressed packet; and adjusting the compression gain based at least in part on the comparison of the subsequent uncompressed packet and the corresponding subsequent compressed packet. In some aspects, adjusting the compression gain may include determining an average of the compression gain based at least in part on the uncompressed packet, the corresponding compressed packet, the subsequent uncompressed packet, and the corresponding subsequent compressed packet.

In some aspects, determining the compression gain may include determining the compression gain based at least in part on a bearer. In some aspects, determining the compression gain may include determining the compression gain for all bearers with data compression enabled. In some aspects, the bearer comprises all active bearers of a user equipment (UE). In some aspects, the method may further include determining a data compression scheme is disabled; and assigning the compression gain a predetermined value. In some aspects, the method may further include initializing the compression gain at a predetermined value; and updating the compression gain based at least in part on the uncompressed packet and the corresponding compressed packet.

In some aspects, a method of communication at a wireless device may include determining a content size of an uncompressed buffer; generating a BSR based at least in part on the content size of the uncompressed buffer; receiving an acknowledgement indicating a successfully received compressed packet; removing the compressed packet from the compressed buffer; and removing the uncompressed packet from the uncompressed buffer.

In some aspects, the receiving the acknowledgement may include receiving a RLC ACK message corresponding to the compressed packet. In some aspects, the receiving the acknowledgement may include receiving RLC ACK messages corresponding to previously transmitted packets of a packet data convergence protocol (PDCP) sequence.

In some aspects, a method of communication at a wireless device may include receiving a BSR based at least in part on a size of an uncompressed buffer of a UE; receiving a compressed packet from the UE; determining a compression gain based at least in part on a size of the compressed packet and a size of a corresponding uncompressed packet; adjusting the received BSR based at least in part on the compression gain; and assigning a grant to the UE based at least in part on the adjusted BSR.

In some aspects, the method may further include determining a padding size used by the UE to fill a previous grant; and wherein the determining the compression gain is based at least in part on the determined padding size. In some aspects, adjusting the received buffer status report may include determining a grant size associated with the received BSR, and scaling the grant size by compression gain. In some aspects, the method may further include receiving a subsequent compressed packet from the UE; and adjusting the compression gain based at least in part on a size of the subsequent compressed packet and a size of a corresponding subsequent uncompressed packet. In some aspects, adjusting the compression gain may include determining an average of the compression gain based at least in part on the size of the uncompressed packet, the size of the corresponding compressed packet, the size of the subsequent uncompressed packet, and the size of the corresponding subsequent compressed packet.

In some aspects, determining the compression gain may include determining the compression gain based at least in part on a bearer. In some aspects, determining the compression gain may include determining the compression gain for all bearers with data compression enabled. In some aspects, the bearer may include all active bearers of the UE.

In some aspects, the method may further include determining a data compression scheme is disabled or reset; and assigning the compression gain a predetermined value. In some aspects, the method may further include transmitting the compression gain to a base station via a backhaul link. In some aspects, the method may further include receiving compression information from the UE; and determining the compression gain based at least in part on the compression information.

In some aspects, an apparatus for communication at a wireless device may include means for determining a first content size of an uncompressed buffer; means for determining a second content size of a compressed buffer; and means for generating a buffer status report (BSR) based at least in part on the first content size of the uncompressed buffer and the second content size of the compressed buffer. In some aspects, the apparatus may further include means for determining whether a packet is uncompressed or compressed based at least in part on a contents of the uncompressed buffer and a contents of the compressed buffer, wherein generating the BSR is based at least in part on an uncompressed service data unit (SDU) size if the packet is uncompressed or on a compressed SDU size if the packet is compressed.

In some aspects, the apparatus may further include means for receiving an acknowledgement indicating a successfully received packet; means for removing a compressed copy of the packet from the compressed buffer; and means for removing an uncompressed copy of the packet from the uncompressed buffer. In some aspects, receiving the acknowledgement (ACK) may include receiving a radio link control (RLC) ACK message corresponding to the successfully received packet. In some aspects, receiving the ACK may include receiving RLC ACK messages corresponding to previously transmitted packets of a packet data convergence protocol (PDCP) sequence.

In some aspects, the apparatus may further include means for receiving an acknowledgement indicating a successfully received packet; means for determining that a previously transmitted packet of a packet data convergence protocol (PDCP) sequence corresponds to a hole in a receiver window; and means for omitting the successfully received packet from subsequent BSRs. In some aspects, the apparatus may further include means for determining a data compression scheme is disabled or reset; means for removing a contents of the compressed buffer; and means for generating a subsequent BSR based at least in part on the content size of the uncompressed buffer.

In some aspects, the apparatus may further include means for determining that the uncompressed buffer contains an uncompressed packet; means for identifying a compressed packet in the compressed buffer corresponding to the uncompressed packet; means for determining a compression gain based at least in part on the uncompressed packet and the corresponding compressed packet; and means for generating the BSR based at least in part on the compression gain. In some aspects, determining the compression gain may include determining a size of the uncompressed packet, determine a size of the corresponding compressed packet, compare the size of the uncompressed packet to the size of the corresponding compressed packet. In some aspects, generating the BSR may include scaling the first content size of the uncompressed buffer by the compression gain.

In some aspects, the apparatus may further include means for identifying a subsequent uncompressed packet in the uncompressed buffer; means for identifying a subsequent compressed packet in the compressed buffer corresponding to the subsequent uncompressed packet; means for comparing the subsequent uncompressed packet and the corresponding subsequent compressed packet; and means for adjusting the compression gain based at least in part on the comparison of the subsequent uncompressed packet and the corresponding subsequent compressed packet.

In some aspects, adjusting the compression gain may include determining an average of the compression gain based at least in part on the uncompressed packet, the corresponding compressed packet, the subsequent uncompressed packet, and the corresponding subsequent compressed packet. In some aspects, determining the compression gain may include determining the compression gain based at least in part on a bearer.

In some aspects, determining the compression gain may include determining the compression gain for all bearers with data compression enabled. In some aspects, the bearer comprises all active bearers of a user equipment (UE). In some aspects, the apparatus may further include means for determining a data compression scheme is disabled; and means for assigning the compression gain a predetermined value. In some aspects, the apparatus may further include means for initializing the compression gain at a predetermined value; and means for updating the compression gain based at least in part on the uncompressed packet and the corresponding compressed packet.

In some aspects, an apparatus for communication at a wireless device may include means for determining a content size of an uncompressed buffer; means for generating a BSR based at least in part on the content size of the uncompressed buffer; means for receiving an acknowledgement indicating a successfully received compressed packet; means for removing the compressed packet from the compressed buffer; and means for removing the uncompressed packet from the uncompressed buffer. In some aspects, the receiving the acknowledgement may include receiving a RLC ACK message corresponding to the compressed packet. In some aspects, receiving the acknowledgement may include receiving RLC ACK messages corresponding to previously transmitted packets of a packet data convergence protocol (PDCP) sequence.

In some aspects, an apparatus for communication at a wireless device may include means for receiving a BSR based at least in part on a size of an uncompressed buffer of a UE; means for receiving a compressed packet from the UE; means for determining a compression gain based at least in part on a size of the compressed packet and a size of a corresponding uncompressed packet; means for adjusting the received BSR based at least in part on the compression gain; and means for assigning a grant to the UE based at least in part on the adjusted BSR. In some aspects, the apparatus may further include means for determining a padding size used by the UE to fill a previous grant; and wherein the determining the compression gain is based at least in part on the determined padding size.

In some aspects, adjusting the received buffer status report may include determining a grant size associated with the received BSR, and scaling the grant size by compression gain. In some aspects, the apparatus may further include means for receiving a subsequent compressed packet from the UE; and means for adjusting the compression gain based at least in part on a size of the subsequent compressed packet and a size of a corresponding subsequent uncompressed packet.

In some aspects, adjusting the compression gain may include determining an average of the compression gain based at least in part on the size of the uncompressed packet, the size of the corresponding compressed packet, the size of the subsequent uncompressed packet, and the size of the corresponding subsequent compressed packet. In some aspects, determining the compression gain may include determining the compression gain based at least in part on a bearer. In some aspects, determining the compression gain may include determining the compression gain for all bearers with data compression enabled. In some aspects, the bearer comprises all active bearers of the UE.

In some aspects, the apparatus may further include means for determining a data compression scheme is disabled or reset; and means for assigning the compression gain a predetermined value. In some aspects, the apparatus may further include means for transmitting the compression gain to a base station via a backhaul link. In some aspects, the apparatus may further include means for receiving compression information from the UE; and means for determining the compression gain based at least in part on the compression information.

In some aspects, an apparatus for communication at a wireless device may include a processor; memory in electronic communication with the processor; and instructions stored in the memory. In some aspects, the instructions are executable by the processor to determine a first content size of an uncompressed buffer; determine a second content size of a compressed buffer; and generate a buffer status report (BSR) based at least in part on the first content size of the uncompressed buffer and the second content size of the compressed buffer.

In some aspects, the instructions are executable by the processor to determine whether a packet is uncompressed or compressed based at least in part on a contents of the uncompressed buffer and a contents of the compressed buffer, wherein generating the BSR is based at least in part on an uncompressed service data unit (SDU) size if the packet is uncompressed or on a compressed SDU size if the packet is compressed.

In some aspects, the instructions are executable by the processor to receive an acknowledgement indicating a successfully received packet; remove a compressed copy of the packet from the compressed buffer; and remove an uncompressed copy of the packet from the uncompressed buffer. In some aspects, receiving the acknowledgement (ACK) may include receiving a radio link control (RLC) ACK message corresponding to the successfully received packet. In some aspects, receiving the ACK may include receiving RLC ACK messages corresponding to previously transmitted packets of a packet data convergence protocol (PDCP) sequence.

In some aspects, the instructions are executable by the processor to receive an acknowledgement indicating a successfully received packet; determine that a previously transmitted packet of a packet data convergence protocol (PDCP) sequence corresponds to a hole in a receiver window; and omit the successfully received packet from subsequent BSRs. In some aspects, the instructions are executable by the processor to determine a data compression scheme is disabled or reset; remove a contents of the compressed buffer; and generate a subsequent BSR based at least in part on the content size of the uncompressed buffer.

In some aspects, the instructions are executable by the processor to determine that the uncompressed buffer contains an uncompressed packet; identify a compressed packet in the compressed buffer corresponding to the uncompressed packet; determine a compression gain based at least in part on the uncompressed packet and the corresponding compressed packet; and generate the BSR based at least in part on the compression gain.

In some aspects, determining the compression gain may include determining a size of the uncompressed packet, determine a size of the corresponding compressed packet, compare the size of the uncompressed packet to the size of the corresponding compressed packet. In some aspects, generating the BSR may include scaling the first content size of the uncompressed buffer by the compression gain. In some aspects, the instructions are executable by the processor to identify a subsequent uncompressed packet in the uncompressed buffer; identify a subsequent compressed packet in the compressed buffer corresponding to the subsequent uncompressed packet; compare the subsequent uncompressed packet and the corresponding subsequent compressed packet; and adjust the compression gain based at least in part on the comparison of the subsequent uncompressed packet and the corresponding subsequent compressed packet.

In some aspects, adjusting the compression gain may include determining an average of the compression gain based at least in part on the uncompressed packet, the corresponding compressed packet, the subsequent uncompressed packet, and the corresponding subsequent compressed packet. In some aspects, determining the compression gain may include determining the compression gain based at least in part on a bearer.

In some aspects, determining the compression gain may include determining the compression gain for all bearers with data compression enabled. In some aspects, the bearer may include all active bearers of a user equipment (UE).

In some aspects, the instructions are executable by the processor to determine a data compression scheme is disabled; and assign the compression gain a predetermined value. In some aspects, the instructions are executable by the processor to initialize the compression gain at a predetermined value; and update the compression gain based at least in part on the uncompressed packet and the corresponding compressed packet.

In some aspects, an apparatus for communication at a wireless device may include a processor; memory in electronic communication with the processor; and instructions stored in the memory; wherein the instructions are executable by the processor to determine a content size of an uncompressed buffer; generate a BSR based at least in part on the content size of the uncompressed buffer; receive an acknowledgement indicating a successfully received compressed packet; remove the compressed packet from the compressed buffer; and remove the uncompressed packet from the uncompressed buffer.

In some aspects, receiving the acknowledgement may include receiving a RLC ACK message corresponding to the compressed packet. In some aspects, receiving the acknowledgement may include receiving RLC ACK messages corresponding to previously transmitted packets of a packet data convergence protocol (PDCP) sequence.

In some aspects, an apparatus for communication at a wireless device may include a processor; memory in electronic communication with the processor; and instructions stored in the memory; wherein the instructions are executable by the processor to receive a BSR based at least in part on a size of an uncompressed buffer of a UE; receive a compressed packet from the UE; determine a compression gain based at least in part on a size of the compressed packet and a size of a corresponding uncompressed packet; adjust the received BSR based at least in part on the compression gain; and assign a grant to the UE based at least in part on the adjusted BSR.

In some aspects, the instructions are executable by the processor to determine a padding size used by the UE to fill a previous grant; and wherein the determining the compression gain is based at least in part on the determined padding size. In some aspects, adjusting the received buffer status report may include determining a grant size associated with the received BSR, and scaling the grant size by compression gain. In some aspects, the instructions are executable by the processor to receive a subsequent compressed packet from the UE; and adjust the compression gain based at least in part on a size of the subsequent compressed packet and a size of a corresponding subsequent uncompressed packet.

In some aspects, the instructions are executable by the processor to adjusting the compression gain may include determining an average of the compression gain based at least in part on the size of the uncompressed packet, the size of the corresponding compressed packet, the size of the subsequent uncompressed packet, and the size of the corresponding subsequent compressed packet. In some aspects, determining the compression gain may include determining the compression gain based at least in part on a bearer. In some aspects, determining the compression gain may include determining the compression gain for all bearers with data compression enabled. In some aspects, the bearer may include all active bearers of the UE.

In some aspects, the instructions are executable by the processor to determine a data compression scheme is disabled or reset; and assign the compression gain a predetermined value. In some aspects, the instructions are executable by the processor to transmit the compression gain to a base station via a backhaul link. In some aspects, the instructions are executable by the processor to receive compression information from the UE; and determine the compression gain based at least in part on the compression information.

In some aspects, a non-transitory computer-readable medium storing code for communication at a wireless device, the code may include instructions executable to determine a first content size of an uncompressed buffer; determine a second content size of a compressed buffer; and generate a buffer status report (BSR) based at least in part on the first content size of the uncompressed buffer and the second content size of the compressed buffer.

In some aspects, a non-transitory computer-readable medium storing code for communication at a wireless device, the code may include instructions executable to determine a content size of an uncompressed buffer; generate a BSR based at least in part on the content size of the uncompressed buffer; receive an acknowledgement indicating a successfully received compressed packet; remove the compressed packet from the compressed buffer; and remove the uncompressed packet from the uncompressed buffer.

In some aspects, a non-transitory computer-readable medium storing code for communication at a wireless device, the code may include instructions executable to receive a BSR based at least in part on a size of an uncompressed buffer of a UE; receive a compressed packet from the UE; determine a compression gain based at least in part on a size of the compressed packet and a size of a corresponding uncompressed packet; adjust the received BSR based at least in part on the compression gain; and assign a grant to the UE based at least in part on the adjusted BSR.

In some aspects, a method for wireless communications may include identifying, by a UE, an amount of uncompressed uplink data; identifying, by the UE, an amount of compressed uplink data; and preparing, by the UE, a buffer status report based at least in part on the amount of uncompressed uplink data and the amount of compressed uplink data.

In some aspects, a method may further include multiplying the amount of uncompressed uplink data and an expected compression gain to determine a predicted amount of uplink data; and wherein preparing the buffer status report may further include preparing the buffer status report based at least in part on the predicted amount of uplink data.

In some aspects, a method may further include combining the predicted amount of uplink data and the amount of compressed uplink data to determine a total amount of uplink data; and wherein preparing the buffer status report may further include preparing the buffer status report based at least in part on the total amount of uplink data.

In some aspects, a method may further include identifying a previous compression gain associated with compressing uplink data; and updating, based at least in part on a moving average, the previous compression gain to determine the expected compression gain.

In some aspects, the expected compression gain may correspond to a distinct bearer associated with transmitting compressed uplink data; a distinct flow associated with transmitting the compressed uplink data; a plurality of bearers for which uplink data compression is enabled; or a plurality of bearers associated with the UE.

In some aspects, a method may further include identifying the amount of compressed uplink data based at least in part on a size of compressed packets in a buffer.

In some aspects, a method may further include identifying the amount of uncompressed uplink data based at least in part on a size of uncompressed packets in a buffer.

In some aspects, an apparatus for wireless communications may include one or more processors to identify an amount of uncompressed uplink data; identify an amount of compressed uplink data; and prepare a buffer status report based at least in part on the amount of uncompressed uplink data and the amount of compressed uplink data.

In some aspects, the one or more processors may be further to multiply the amount of uncompressed uplink data and an expected compression gain to determine a predicted amount of uplink data; and wherein the one or more processors, when preparing the buffer status report, may be to prepare the buffer status report based at least in part on the predicted amount of uplink data.

In some aspects, the one or more processors may be further to combine the predicted amount of uplink data and the amount of compressed uplink data to determine a total amount of uplink data; and wherein the one or more processors, when preparing the buffer status report, may be to prepare the buffer status report based at least in part on the total amount of uplink data.

In some aspects, the one or more processors may be further to identify a previous compression gain associated with compressing uplink data; and update, based at least in part on a moving average, the previous compression gain to determine the expected compression gain.

In some aspects, the expected compression gain may correspond to a distinct bearer associated with transmitting compressed uplink data; a distinct flow associated with transmitting the compressed uplink data; a plurality of bearers for which uplink data compression is enabled; or a plurality of bearers associated with the UE.

In some aspects, the one or more processors may be further to identify the amount of compressed uplink data based at least in part on a size of compressed packets in a buffer.

In some aspects, the one or more processors may be further to identify the amount of uncompressed uplink data based at least in part on a size of uncompressed packets in a buffer.

In some aspects, a non-transitory computer-readable medium may store computer-executable code for wireless communications. The one or more instructions may cause one or more processors to identify an amount of uncompressed uplink data; identify an amount of compressed uplink data; and prepare a buffer status report based at least in part on the amount of uncompressed uplink data and the amount of compressed uplink data.

In some aspects, the one or more instructions, when executed by the one or more processors, may further cause the one or more processors to multiply the amount of uncompressed uplink data and an expected compression gain to determine a predicted amount of uplink data; and wherein the one or more instructions, that cause the one or more processors to prepare the buffer status report, may cause the one or more processors to prepare the buffer status report based at least in part on the predicted amount of uplink data.

In some aspects, the one or more instructions, when executed by the one or more processors, may further cause the one or more processors to combine the predicted amount of uplink data and the amount of compressed uplink data to determine a total amount of uplink data; and wherein the one or more instructions, that cause the one or more processors to prepare the buffer status report, may cause the one or more processors to prepare the buffer status report based at least in part on the total amount of uplink data.

In some aspects, the one or more instructions, when executed by the one or more processors, may further cause the one or more processors to identify a previous compression gain associated with compressing uplink data; and update, based at least in part on a moving average, the previous compression gain to determine the expected compression gain.

In some aspects, the expected compression gain may correspond to a distinct bearer associated with transmitting compressed uplink data; a distinct flow associated with transmitting the compressed uplink data; a plurality of bearers for which uplink data compression is enabled; or a plurality of bearers associated with the UE.

In some aspects, the one or more instructions, when executed by the one or more processors, may further cause the one or more processors to identify the amount of compressed uplink data based at least in part on a size of compressed packets in a buffer.

In some aspects, the one or more instructions, when executed by the one or more processors, may further cause the one or more processors to identify the amount of uncompressed uplink data based at least in part on a size of uncompressed packets in a buffer.

In some aspects, an apparatus for wireless communications may include means for identifying an amount of uncompressed uplink data; means for identifying an amount of compressed uplink data; and means for preparing a buffer status report based at least in part on the amount of uncompressed uplink data and the amount of compressed uplink data.

In some aspects, an apparatus may further include means for multiplying the amount of uncompressed uplink data and an expected compression gain to determine a predicted amount of uplink data; and the means for preparing the buffer status report may include means for preparing the buffer status report based at least in part on the predicted amount of uplink data.

In some aspects, an apparatus may further include means for combining the predicted amount of uplink data and the amount of compressed uplink data to determine a total amount of uplink data; and the means for preparing the buffer status report may include means for preparing the buffer status report based at least in part on the total amount of uplink data.

In some aspects, an apparatus may further include means for identifying a previous compression gain associated with compressing uplink data; and means for updating, based at least in part on a moving average, the previous compression gain to determine the expected compression gain.

In some aspects, the expected compression gain may correspond to a distinct bearer associated with transmitting compressed uplink data; a distinct flow associated with transmitting the compressed uplink data; a plurality of bearers for which uplink data compression is enabled; or a plurality of bearers associated with the UE.

In some aspects, an apparatus may further include means for identifying the amount of compressed uplink data based at least in part on a size of compressed packets in a buffer.

In some aspects, an apparatus may further include means for identifying the amount of uncompressed uplink data based at least in part on a size of uncompressed packets in a buffer.

In some aspects, a method for wireless communications may include identifying, at a user equipment (UE), data to be transmitted in a radio bearer in an uplink direction, wherein the radio bearer may correspond to an uplink logical channel; compressing, at the UE, at least a portion of the data to form a compressed portion of data; and determining, by the UE, whether tokens are deducted from a token bucket based at least in part on the compressed portion of data.

In some aspects, deducting tokens, from the token bucket, corresponding to the compressed portion of data may be based at least in part on determining that the tokens are to be deducted from the token bucket based at least in part on the compressed portion of data.

In some aspects, deducting the tokens corresponding to the compressed portion of data may cause a prioritized bit rate, associated with the uplink logical channel, to be satisfied at a media access control layer.

In some aspects, deducting the tokens corresponding to the compressed portion of data may cause a guaranteed bit rate, associated with the uplink logical channel, to be greater than a prioritized bit rate associated with the uplink logical channel.

In some aspects, the uplink logical channel may be a first uplink logical channel, and deducting the tokens corresponding to the compressed portion of data may cause an increase in throughput associated with the first uplink logical channel and a second uplink logical channel, the second uplink logical channel may correspond to a second radio bearer in the uplink direction.

In some aspects, the radio bearer may be a first radio bearer in the uplink direction corresponding to a first uplink logical channel; deducting the tokens corresponding to the compressed portion of data may cause a first bit rate, associated with the first uplink logical channel, to be greater than a bit rate of the first uplink logical channel without data compression; and deducting the tokens corresponding to the compressed portion of data may cause a second bit rate, associated with a second uplink logical channel, to be approximately equal to a bit rate of the second uplink logical channel without data compression, the second uplink logical channel corresponding to a second radio bearer in the uplink direction.

In some aspects, the first uplink logical channel may have a lower priority than the second uplink logical channel. In some aspects, the first uplink logical channel may have a higher priority than the second uplink logical channel.

In some aspects, one or more methods may include deducting tokens from the token bucket corresponding to an uncompressed portion of the data based at least in part on determining that the tokens are not to be deducted from the token bucket based at least in part on the compressed portion of data.

In some aspects, deducting the tokens corresponding to the uncompressed portion of the data may cause a prioritized bit rate, associated with the uplink logical channel, to be satisfied at an application layer.

In some aspects, deducting the tokens corresponding to the uncompressed portion of the data may cause a guaranteed bit rate, associated with the uplink logical channel, to be approximately equal to a prioritized bit rate associated with the uplink logical channel.

In some aspects, the uplink logical channel may be a first uplink logical channel with a first prioritized bit rate; wherein the deducting the tokens corresponding to the uncompressed portion of the data may cause a first bit rate, associated with the first uplink logical channel, to be greater than a bit rate of the first uplink logical channel without data compression; and wherein the deducting the tokens corresponding to the uncompressed portion of the data may cause a second bit rate, associated with a second uplink logical channel, to be approximately equal to a second prioritized bit rate associated with the second uplink logical channel, the first uplink logical channel may have a higher priority than the second uplink logical channel.

In some aspects, the uplink logical channel is a first uplink logical channel; wherein the deducting the tokens corresponding to the uncompressed portion of the data may cause a bit rate, associated with the first uplink logical channel, to be greater than a bit rate of the first uplink logical channel without data compression, the first uplink logical channel having a lower priority than a second uplink logical channel; and wherein the bit rate of the first uplink logical channel without data compression may be less than a prioritized bit rate associated with the first uplink logical channel.

In some aspects, an apparatus for wireless communications may include one or more processors to identify data to be transmitted in a radio bearer in an uplink direction, the radio bearer corresponding to an uplink logical channel; compress at least a portion of the data to form a compressed portion of data; and determine whether tokens are deducted from a token bucket based at least in part on the compressed portion of data.

In some aspects, the one or more processors may be further to deduct tokens, from the token bucket, corresponding to the compressed portion of data based at least in part on determining that the tokens are to be deducted from the token bucket based at least in part on the compressed portion of data.

In some aspects, the one or more processors deducting the tokens corresponding to the compressed portion of data may cause a prioritized bit rate, associated with the uplink logical channel, to be satisfied at a media access control layer.

In some aspects, the one or more processors deducting the tokens corresponding to the compressed portion of data may cause a guaranteed bit rate, associated with the uplink logical channel, to be greater than a prioritized bit rate associated with the uplink logical channel.

In some aspects, the uplink logical channel may be a first uplink logical channel, and the one or more processors deducting the tokens corresponding to the compressed portion of data may cause an increase in throughput associated with the first uplink logical channel and a second uplink logical channel, the second uplink logical channel corresponding to a second radio bearer in the uplink direction.

In some aspects, the radio bearer is a first radio bearer in the uplink direction and the uplink logical channel is a first uplink logical channel; wherein the one or more processors deducting the tokens corresponding to the compressed portion of data may cause a first bit rate, associated with the first uplink logical channel, to be greater than a bit rate of the first uplink logical channel without data compression; and wherein the one or more processors deducting the tokens corresponding to the compressed portion of data may cause a second bit rate, associated with a second uplink logical channel, to be approximately equal to a bit rate of the second uplink logical channel without data compression, the second uplink logical channel corresponding to a second radio bearer in the uplink direction.

In some aspects, the first uplink logical channel may have a lower priority than the second uplink logical channel. In some aspects, the first uplink logical channel may have a higher priority than the second uplink logical channel.

In some aspects, the one or more processors may be further to deduct tokens from the token bucket corresponding to an uncompressed portion of the data based at least in part on determining that the tokens are not to be deducted from the token bucket based at least in part on the compressed portion of data.

In some aspects, the one or more processors deducting the tokens corresponding to the uncompressed portion of the data may cause a prioritized bit rate, associated with the uplink logical channel, to be satisfied at an application layer.

In some aspects, the one or more processors deducting the tokens corresponding to the uncompressed portion of the data may cause a guaranteed bit rate, associated with the uplink logical channel, to be approximately equal to a prioritized bit rate associated with the uplink logical channel.

In some aspects, the uplink logical channel may be a first uplink logical channel with a first prioritized bit rate; wherein the one or more processors deducting the tokens corresponding to the uncompressed portion of the data may cause a first bit rate, associated with the first uplink logical channel, to be greater than a bit rate of the first uplink logical channel without data compression; and wherein the one or more processors deducting the tokens corresponding to the uncompressed portion of the data may cause a second bit rate, associated with a second uplink logical channel, to be approximately equal to a second prioritized bit rate associated with the second uplink logical channel, the first uplink logical channel having a higher priority than the second uplink logical channel.

In some aspects, the uplink logical channel may be a first uplink logical channel; wherein the one or more processors deducting the tokens corresponding to the uncompressed portion of the data may cause a bit rate, associated with the first uplink logical channel, to be greater than a bit rate of the first uplink logical channel without data compression, the first uplink logical channel may have a lower priority than a second uplink logical channel; and wherein the bit rate of the first uplink logical channel without data compression may be less than a prioritized bit rate associated with the first uplink logical channel.

In some aspects, a non-transitory computer-readable medium storing computer-executable code for wireless communications. The code may be executable by a processor to identify data to be transmitted in a radio bearer in an uplink direction, the radio bearer corresponding to an uplink logical channel; compress at least a portion of the data to form a compressed portion of data; and determine whether tokens are deducted from a token bucket based at least in part on the compressed portion of data.

In some aspects, the one or more instructions, when executed by the one or more processors, may further cause the one or more processors to deduct tokens, from the token bucket, corresponding to the compressed portion of data based at least in part on determining that the tokens are to be deducted from the token bucket based at least in part on the compressed portion of data.

In some aspects, the one or more instructions deducting the tokens corresponding to the compressed portion of data may cause a prioritized bit rate, associated with the uplink logical channel, to be satisfied at a media access control layer.

In some aspects, the one or more instructions deducting the tokens corresponding to the compressed portion of data may cause a guaranteed bit rate, associated with the uplink logical channel, to be greater than a prioritized bit rate associated with the uplink logical channel.

In some aspects, the uplink logical channel may be a first uplink logical channel, and the one or more instructions deducting the tokens corresponding to the compressed portion of data may cause an increase in throughput associated with the first uplink logical channel and a second uplink logical channel, the second uplink logical channel corresponding to a second radio bearer in the uplink direction.

In some aspects, the radio bearer may be a first radio bearer in the uplink direction and the uplink logical channel may be a first uplink logical channel; wherein the one or more instructions deducting the tokens corresponding to the compressed portion of data may cause a first bit rate, associated with the first uplink logical channel, to be greater than a bit rate of the first uplink logical channel without data compression; and wherein the one or more instructions deducting the tokens corresponding to the compressed portion of data may cause a second bit rate, associated with a second uplink logical channel, to be approximately equal to a bit rate of the second uplink logical channel without data compression, the second uplink logical channel corresponding to a second radio bearer in the uplink direction.

In some aspects, the first uplink logical channel may have a lower priority than the second uplink logical channel. In some aspects, the first uplink logical channel may have a higher priority than the second uplink logical channel.

In some aspects, the one or more instructions, when executed by the one or more processors, may further cause the one or more processors to deduct tokens from the token bucket corresponding to an uncompressed portion of the data based at least in part on determining that the tokens are not to be deducted from the token bucket based at least in part on the compressed portion of data.

In some aspects, the one or more instructions deducting the tokens corresponding to the uncompressed portion of the data may cause a prioritized bit rate, associated with the uplink logical channel, to be satisfied at an application layer.

In some aspects, the one or more instructions deducting the tokens corresponding to the uncompressed portion of the data may cause a guaranteed bit rate, associated with the uplink logical channel, to be approximately equal to a prioritized bit rate associated with the uplink logical channel.

In some aspects, the uplink logical channel may be a first uplink logical channel with a first prioritized bit rate; wherein the one or more instructions deducting the tokens corresponding to the uncompressed portion of the data may cause a first bit rate, associated with the first uplink logical channel, to be greater than a bit rate of the first uplink logical channel without data compression; and wherein the one or more instructions deducting the tokens corresponding to the uncompressed portion of the data may cause a second bit rate, associated with a second uplink logical channel, to be approximately equal to a second prioritized bit rate associated with the second uplink logical channel, the first uplink logical channel having a higher priority than the second uplink logical channel.

In some aspects, the uplink logical channel may be a first uplink logical channel; wherein the one or more instructions deducting the tokens corresponding to the uncompressed portion of the data may cause a bit rate, associated with the first uplink logical channel, to be greater than a bit rate of the first uplink logical channel without data compression, the first uplink logical channel having a lower priority than a second uplink logical channel; and wherein the bit rate of the first uplink logical channel without data compression may be less than a prioritized bit rate associated with the first uplink logical channel.

In some aspects, an apparatus for wireless communications may include means for identifying data to be transmitted in a radio bearer in an uplink direction, the radio bearer corresponding to an uplink logical channel; means for compressing at least a portion of the data to form a compressed portion of data; and means for determining whether tokens are deducted from a token bucket based at least in part on the compressed portion of data.

In some aspects, an apparatus may further include means for deducting tokens, from the token bucket, corresponding to the compressed portion of data based at least in part on determining that the tokens are to be deducted from the token bucket based at least in part on the compressed portion of data.

In some aspects, the means for deducting the tokens corresponding to the compressed portion of data may cause a prioritized bit rate, associated with the uplink logical channel, to be satisfied at a media access control layer.

In some aspects, the means for deducting the tokens corresponding to the compressed portion of data may cause a guaranteed bit rate, associated with the uplink logical channel, to be greater than a prioritized bit rate associated with the uplink logical channel.

In some aspects, the uplink logical channel may be a first uplink logical channel, and the means for deducting the tokens corresponding to the compressed portion of data may cause an increase in throughput associated with the first uplink logical channel and a second uplink logical channel, the second uplink logical channel corresponding to a second radio bearer in the uplink direction.

In some aspects, the radio bearer may be a first radio bearer in the uplink direction and the uplink logical channel may be a first uplink logical channel; wherein the means for deducting the tokens corresponding to the compressed portion of data may cause a first bit rate, associated with the first uplink logical channel, to be greater than a bit rate of the first uplink logical channel without data compression; and wherein the means for deducting the tokens corresponding to the compressed portion of data may cause a second bit rate, associated with a second uplink logical channel, to be approximately equal to a bit rate of the second uplink logical channel without data compression, the second uplink logical channel corresponding to a second radio bearer in the uplink direction.

In some aspects, the first uplink logical channel may have a lower priority than the second uplink logical channel. In some aspects, the first uplink logical channel may have a higher priority than the second uplink logical channel.

In some aspects, an apparatus may further include means for deducting tokens from the token bucket corresponding to an uncompressed portion of the data based at least in part on determining that the tokens are not to be deducted from the token bucket based at least in part on the compressed portion of data.

In some aspects, the means for deducting the tokens corresponding to the uncompressed portion of the data may cause a prioritized bit rate, associated with the uplink logical channel, to be satisfied at an application layer.

In some aspects, the means for deducting the tokens corresponding to the uncompressed portion of the data may cause a guaranteed bit rate, associated with the uplink logical channel, to be approximately equal to a prioritized bit rate associated with the uplink logical channel.

In some aspects, the uplink logical channel may be a first uplink logical channel with a first prioritized bit rate; wherein the means for deducting the tokens corresponding to the uncompressed portion of the data may cause a first bit rate, associated with the first uplink logical channel, to be greater than a bit rate of the first uplink logical channel without data compression; and the means for deducting the tokens corresponding to the uncompressed portion of the data may cause a second bit rate, associated with a second uplink logical channel, to be approximately equal to a second prioritized bit rate associated with the second uplink logical channel, the first logical channel having a higher priority than the second uplink logical channel.

In some aspects, the uplink logical channel may be a first uplink logical channel; wherein the means for deducting the tokens corresponding to the uncompressed portion of the data may cause a bit rate, associated with the first uplink logical channel, to be greater than a bit rate of the first uplink logical channel without data compression, the first logical channel having a lower priority than a second uplink logical channel; and the bit rate of the first uplink logical channel without data compression may be less than a prioritized bit rate associated with the first uplink logical channel.

In some aspects, a method for wireless communications may include determining, by a UE, whether an amount of resources allocated for an uplink transmission grant is greater than an amount of resources needed to transmit compressed uplink data for uplink transmission; determining, by the UE, whether to fill a remaining amount of resources of the uplink transmission grant with uncompressed uplink data; and selectively transmitting, by the UE, the uncompressed uplink data based at least in part on the determination of whether to fill the remaining amount of resources of the uplink transmission grant with the uncompressed uplink data.

In some aspects, determining whether the amount of resources allocated for the uplink transmission grant is greater than the amount of resources needed to transmit the compressed uplink data may include subtracting an amount of the compressed uplink data from the amount of resources allocated for the uplink transmission grant to determine the remaining amount of resources of the uplink transmission grant.

In some aspects, a method may further include calculating a predicted amount of uplink data based at least in part on an amount of the uncompressed uplink data and an expected compression gain; determining that the amount of the uncompressed uplink data is greater than the remaining amount of resources of the uplink transmission grant plus the predicted amount of uplink data; and wherein selectively transmitting the uncompressed uplink data may include waiting to transmit the uncompressed uplink data in a future uplink transmission grant based at least in part on determining that the amount of the uncompressed uplink data is greater than the remaining amount of resources of the uplink transmission grant plus the predicted amount of uplink data.

In some aspects, a method may further include identifying a previous compression gain associated with compressing uplink data; and updating, based at least in part on a moving average, the previous compression gain to determine the expected compression gain.

In some aspects, the expected compression gain may correspond to a distinct bearer associated with transmitting compressed uplink data; a distinct flow associated with transmitting the compressed uplink data; a plurality of bearers for which data compression is enabled; or a plurality of bearers associated with the UE.

In some aspects, a method may further include calculating a predicted amount of uplink data based at least in part on an amount of the uncompressed uplink data and an expected compression gain; determining that the amount of the uncompressed uplink data is greater than the remaining amount of resources of the uplink transmission grant plus the predicted amount of uplink data; and wherein selectively transmitting the uncompressed uplink data may include filling the remaining amount of resources of the uplink transmission grant with padding data, or filling the remaining amount of resources of the uplink transmission grant with data associated with a different logical channel than a logical channel associated with the compressed uplink data.

In some aspects, a method may further include storing information that identifies the remaining amount of resources of the uplink transmission grant for use in association with determining whether the uncompressed uplink data is to be transmitted in a future uplink transmission grant.

In some aspects, a method may further include calculating a predicted amount of uplink data based at least in part on an amount of the uncompressed uplink data and an expected compression gain; determining that the amount of the uncompressed uplink data is not greater than the remaining amount of resources of the uplink transmission grant plus the predicted amount of uplink data; and wherein selectively transmitting the uncompressed uplink data may include filling the remaining amount of resources of the uplink transmission grant with the uncompressed uplink data.

In some aspects, filling the remaining amount of resources may include segmenting a packet of the uncompressed uplink data into a first segment and a second segment, and transmitting the first segment, without transmitting the second segment, to fill the remaining amount of resources of the uplink transmission grant.

In some aspects, an apparatus for wireless communications, may include one or more processors to determine whether an amount of resources allocated for an uplink transmission grant is greater than an amount of resources needed to transmit compressed uplink data for uplink transmission; determine whether to fill a remaining amount of resources of the uplink transmission grant with uncompressed uplink data; and selectively transmit the uncompressed uplink data based at least in part on the determination of whether to fill the remaining amount of resources of the uplink transmission grant with the uncompressed uplink data.

In some aspects, the one or more processors, when determining whether the amount of resources allocated for the uplink transmission grant is greater than the amount of resources needed to transmit the compressed uplink data, subtract an amount of the compressed uplink data from the amount of resources allocated for the uplink transmission grant to determine the remaining amount of resources of the uplink transmission grant.

In some aspects, the one or more processors may further calculate a predicted amount of uplink data based at least in part on an amount of the uncompressed uplink data and an expected compression gain; determine that the amount of the uncompressed uplink data is greater than the remaining amount of resources of the uplink transmission grant plus the predicted amount of uplink data; and where the one or more processors, when selectively transmitting the uncompressed uplink data, may wait to transmit the uncompressed uplink data in a future uplink transmission grant based at least in part on determining that the amount of the uncompressed uplink data is greater than the remaining amount of resources of the uplink transmission grant plus the predicted amount of uplink data.

In some aspects, the one or more processors may further identify a previous compression gain associated with compressing uplink data; and update, based at least in part on a moving average, the previous compression gain to determine the expected compression gain.

In some aspects, the expected compression gain may correspond to a distinct bearer associated with transmitting compressed uplink data; a distinct flow associated with transmitting the compressed uplink data; a plurality of bearers for which data compression is enabled; or a plurality of bearers associated with the UE.

In some aspects, the one or more processors may further calculate a predicted amount of uplink data based at least in part on an amount of the uncompressed uplink data and an expected compression gain; determine that the amount of the uncompressed uplink data is greater than the remaining amount of resources of the uplink transmission grant plus the predicted amount of uplink data; and wherein the one or more processors, when selectively transmitting the uncompressed uplink data, fill the remaining amount of resources of the uplink transmission grant with padding data, or fill the remaining amount of resources of the uplink transmission grant with data associated with a different logical channel than a logical channel associated with the compressed uplink data.

In some aspects, the one or more processors may further store information that identifies the remaining amount of resources of the uplink transmission grant for use in association with determining whether the uncompressed uplink data is to be transmitted in a future uplink transmission grant.

In some aspects, the one or more processors may further calculate a predicted amount of uplink data based at least in part on an amount of the uncompressed uplink data and an expected compression gain; determine that the amount of the uncompressed uplink data is not greater than the remaining amount of resources of the uplink transmission grant plus the predicted amount of uplink data; and wherein the one or more processors, when selectively transmitting the uncompressed uplink data, fill the remaining amount of resources of the uplink transmission grant with the uncompressed uplink data.

In some aspects, the one or more processors, when filling the remaining amount of resources, may segment a packet of the uncompressed uplink data into a first segment and a second segment, and transmit the first segment, without transmitting the second segment, to fill the remaining amount of resources of the uplink transmission grant.

In some aspects, a non-transitory computer-readable medium may store computer-executable code for wireless communications. The one or more instructions may cause one or more processors to determine whether an amount of resources allocated for an uplink transmission grant is greater than an amount of resources needed to transmit compressed uplink data for uplink transmission; determine whether to fill a remaining amount of resources of the uplink transmission grant with uncompressed uplink data; and selectively transmit the uncompressed uplink data based at least in part on the determination of whether to fill the remaining amount of resources of the uplink transmission grant with the uncompressed uplink data.

In some aspects, the one or more instructions, that cause the one or more processors to determine whether the amount of resources allocated for the uplink transmission grant is greater than the amount of resources needed to transmit the compressed uplink data, may cause the one or more processors to subtract an amount of the compressed uplink data from the amount of resources allocated for the uplink transmission grant to determine the remaining amount of resources of the uplink transmission grant.

In some aspects, the one or more instructions, when executed by the one or more processors, may further cause the one or more processors to calculate a predicted amount of uplink data based at least in part on an amount of the uncompressed uplink data and an expected compression gain; determine that the amount of the uncompressed uplink data is greater than the remaining amount of resources of the uplink transmission grant plus the predicted amount of uplink data; and wherein the one or more instructions, that cause the one or more processors to selectively transmit the uncompressed uplink data, may cause the one or more processors to wait to transmit the uncompressed uplink data in a future uplink transmission grant based at least in part on determining that the amount of the uncompressed uplink data is greater than the remaining amount of resources of the uplink transmission grant plus the predicted amount of uplink data.

In some aspects, the one or more instructions, when executed by the one or more processors, may further cause the one or more processors to determine a previous compression gain associated with compressing uplink data; and update, based at least in part on a moving average, the previous compression gain to determine the expected compression gain.

In some aspects, the expected compression gain may correspond to a distinct bearer associated with transmitting compressed uplink data; a distinct flow associated with transmitting the compressed uplink data; a plurality of bearers for which data compression is enabled; or a plurality of bearers associated with the UE.

In some aspects, the one or more instructions, when executed by the one or more processors, may further cause the one or more processors to calculate a predicted amount of uplink data based at least in part on an amount of the uncompressed uplink data and an expected compression gain; determine that the amount of the uncompressed uplink data is greater than the remaining amount of resources of the uplink transmission grant plus the predicted amount of uplink data; and wherein the one or more instructions, that cause the one or more processors to selectively transmit the uncompressed uplink data, may cause the one or more processors to fill the remaining amount of resources of the uplink transmission grant with padding data, or fill the remaining amount of resources of the uplink transmission grant with data from associated with a different logical channel than a logical channel associated with the compressed uplink data.

In some aspects, the one or more instructions, when executed by the one or more processors, may further cause the one or more processors to store information that identifies the remaining amount of resources of the uplink transmission grant for use in association with determining whether the uncompressed uplink data is to be transmitted in a future uplink transmission grant.

In some aspects, the one or more instructions, when executed by the one or more processors, may further cause the one or more processors to calculate a predicted amount of uplink data based at least in part on an amount of the uncompressed uplink data and an expected compression gain; determine that the amount of the uncompressed uplink data is not greater than the remaining amount of resources of the uplink transmission grant plus the predicted amount of uplink data; and wherein the one or more instructions, that cause the one or more processors to selectively transmit the uncompressed uplink data, may cause the one or more processors to fill the remaining amount of resources of the uplink transmission grant with the uncompressed uplink data.

In some aspects, the one or more instructions, that cause the one or more processors to fill the remaining amount of resources, may further cause the one or more processors to segment a packet of the uncompressed uplink data into a first segment and a second segment, and transmit the first segment, without transmitting the second segment, to fill the remaining amount of resources of the uplink transmission grant.

In some aspects, an apparatus for wireless communications may include means for determining whether an amount of resources allocated for an uplink transmission grant is greater than an amount of resources needed to transmit compressed uplink data for uplink transmission; means for determining whether to fill a remaining amount of resources of the uplink transmission grant with uncompressed uplink data; and means for selectively transmitting the uncompressed uplink data based at least in part on the determination of whether to fill the remaining amount of resources of the uplink transmission grant with the uncompressed uplink data.

In some aspects, the means for determining whether the amount of resources allocated for the uplink transmission grant is greater than the amount of resources needed to transmit the compressed uplink data may include means for subtracting an amount of the compressed uplink data from the amount of resources allocated for the uplink transmission grant to determine the remaining amount of resources of the uplink transmission grant.

In some aspects, an apparatus may further include means for calculating a predicted amount of uplink data based at least in part on an amount of the uncompressed uplink data and an expected compression gain; means for determining that the amount of the uncompressed uplink data is greater than the remaining amount of resources of the uplink transmission grant plus the predicted amount of uplink data; and wherein the means for selectively transmitting the uncompressed uplink data may include means for waiting to transmit the uncompressed uplink data in a future uplink transmission grant based at least in part on determining that the amount of the uncompressed uplink data is greater than the remaining amount of resources of the uplink transmission grant plus the predicted amount of uplink data.

In some aspects, an apparatus may further include means for determining a previous compression gain associated with compressing uplink data; and means for updating, based at least in part on a moving average, the previous compression gain to determine the expected compression gain.

In some aspects, the expected compression gain may correspond to a distinct bearer associated with transmitting compressed uplink data; a distinct flow associated with transmitting the compressed uplink data; a plurality of bearers for which data compression is enabled; or a plurality of bearers associated with the apparatus.

In some aspects, an apparatus may further include means for calculating a predicted amount of uplink data based at least in part on an amount of the uncompressed uplink data and an expected compression gain; means for determining that the amount of the uncompressed uplink data is greater than the remaining amount of resources of the uplink transmission grant plus the predicted amount of uplink data; and wherein the means for selectively transmitting the uncompressed uplink data may include means for filling the remaining amount of resources of the uplink transmission grant with padding data, or means for filling the remaining amount of resources of the uplink transmission grant with data from associated with a different logical channel than a logical channel associated with the compressed uplink data.

In some aspects, an apparatus may further include means for storing information that identifies the remaining amount of resources of the uplink transmission grant for use in association with determining whether the uncompressed uplink data is to be transmitted in a future uplink transmission grant.

In some aspects, an apparatus may further include means for calculating a predicted amount of uplink data based at least in part on an amount of the uncompressed uplink data and an expected compression gain; means for determining that the amount of the uncompressed uplink data is not greater than the remaining amount of resources of the uplink transmission grant plus the predicted amount of uplink data; and wherein the means for selectively transmitting the uncompressed uplink data may include means for filling the remaining amount of resources of the uplink transmission grant with the uncompressed uplink data.

In some aspects, the means for filling the remaining amount of resources may include means for segmenting a packet of the uncompressed uplink data into a first segment and a second segment, and means for transmitting the first segment, without transmitting the second segment, to fill the remaining amount of resources of the uplink transmission grant.

Aspects, for example, may include a method, apparatus, system, computer program product, non-transitory computer-readable medium, and user equipment as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Buffer status reports (BSRs) may be based on or adjusted for packets compressed utilizing data compression scheme such as an evolved data compression scheme (eDCS). A content size of an uncompressed buffer and a content size of a compressed buffer of a user equipment (UE) may each be used to determine BSR. The BSR may be transmitted to a base station, which may assign a resource grant to the UE based on the BSR. BSRs or grants, or both, may be calculated in manner that accounts for the compressed size of packets pending to be transmitted by the UE, as well as packets that have already been compressed or uncompressed packets that will be sent. Generating BSR and corresponding grants based on both compressed and uncompressed packets may help maximize resources within a system by more closely tailoring resource grants to the actual size of UE's uplink transmissions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1A:
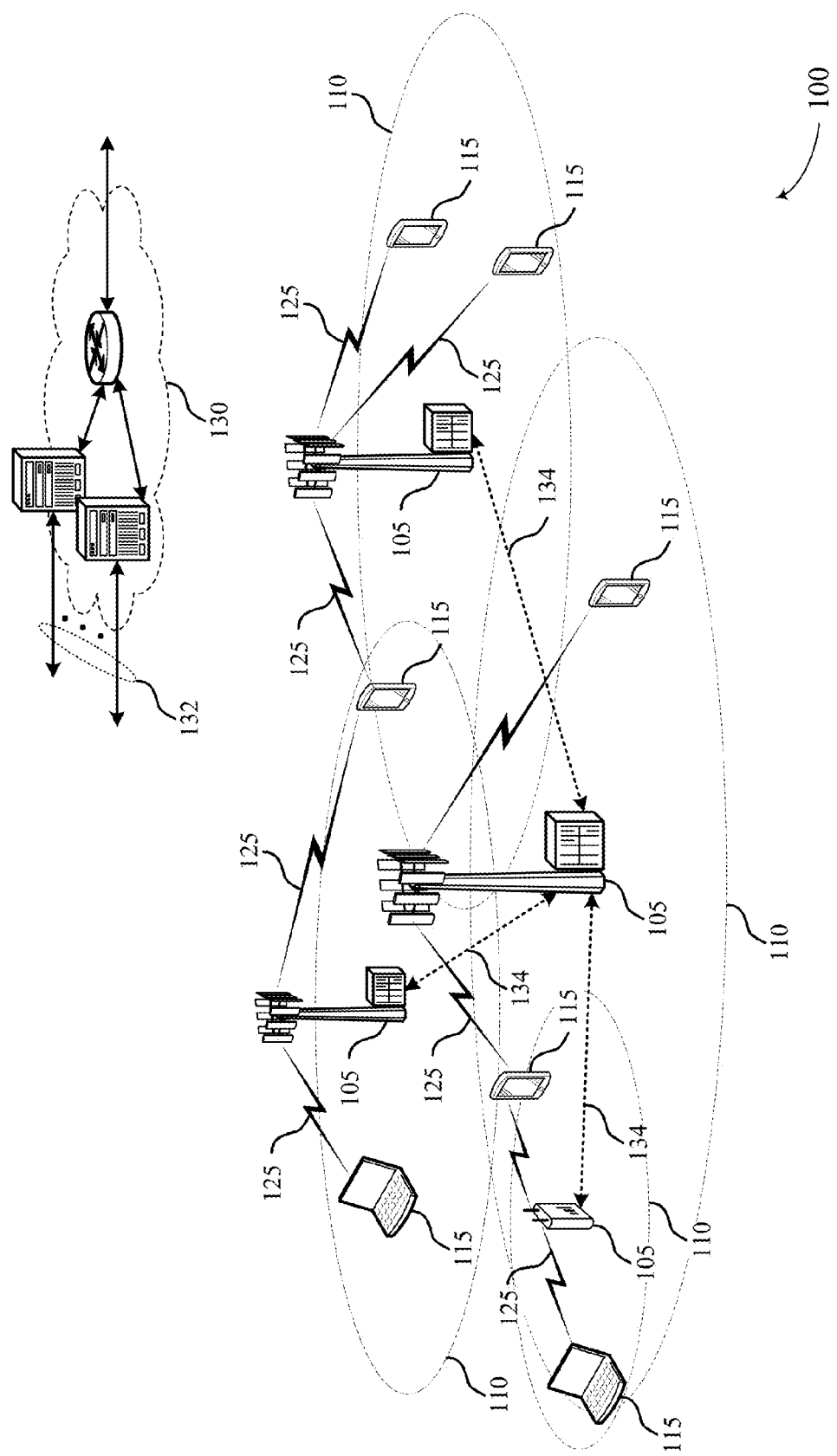
FIG. 1A illustrates an example of a wireless communications system for buffer status reports in an evolved data compression scheme in accordance with various aspects of the present disclosure.

FIG. 1A illustrates an example of a wireless communications system 100 in accordance with various aspects of the present disclosure. The wireless communications system 100 includes at least one base station 105, at least one UE 115, and a core network 130. The core network 130 may provide user authentication, access authorization, tracking, internet protocol (IP) connectivity, and other access, routing, or mobility functions. The base station 105 interfaces with the core network 130 through backhaul links 132 (e.g., S1, etc.). The base station 105 may perform radio configuration and scheduling for communication with the at least one UE 115, or may operate under the control of a base station controller (not shown). In various examples, base station 105 may communicate, either directly or indirectly (e.g., through core network 130), with another base station 105 over backhaul links 134 (e.g., X1, etc.), which may be wired or wireless communication links.

The base station 105 may wirelessly communicate with at least one UE 115 via one or more base station antennas. Each base station 105 may provide communication coverage for a respective geographic coverage area 110. In some examples, base station 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations (e.g., base station 105) of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be, for example, used to describe the base station 105, while the term UE may be, for example, used to describe the UE 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may, for example, cover a relatively large geographic area (e.g., several kilometers in radius) and may allow unrestricted access by at least one UE 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by at least one UE 115 with service subscriptions with the network provider. A femto cell may also cover a small geographic area (e.g., a home) and may provide restricted access by at least one UE 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The at least one UE 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each of the communication links 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some examples of the wireless communications system 100, base station 105 or UE 115 may include multiple antennas for employing antenna diversity schemes to improve communication quality and reliability between at least one base station 105 and at least one UE 115. Additionally or alternatively, base station 105 or UE 115 may employ multiple-input multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A media access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and at least one base station 105. The RRC protocol layer may also be used for core network 130 support of radio bearers for the user plane data. At the physical (PHY) layer, the transport channels may be mapped to physical channels.

Within wireless communications system 100 the RLC layer may connect higher layers (e.g., RRC and packet data convergence protocol (PDCP)) to the lower layers (e.g., the MAC layer). An RLC entity in a base station 105 or a UE 115 may ensure that transmission packets are organized into appropriately sized blocks (corresponding to the MAC layer transport block size). If an incoming data packet (i.e., a PDCP or RRC service data unit (SDU)) is too big for transmission, the RLC layer may segment it into several smaller RLC protocol data units (PDUs). If the incoming packets are too small, the RLC layer may concatenate several of them into a single, larger RLC PDU. Each RLC PDU may include a header including information about how to reassemble the data.

The RLC layer may also ensure that packets are reliably transmitted. The transmitter may keep a buffer of indexed RLC PDUs, and continue retransmission of each PDU until it receives the corresponding acknowledgement (ACK). In some cases, the transmitter may send a Poll Request to determine which PDUs have been received and the receiver may respond with a Status Report. Unlike the MAC layer HARQ, RLC automatic repeat request (ARQ) may not include a forward error correction function. An RLC entity may operate in one of three modes. In acknowledged mode (AM), unacknowledged mode (UM) and TM. In AM, the RLC entity may perform segmentation/concatenation and ARQ. This mode may be appropriate for delay tolerant or error sensitive transmissions. In UM, the RLC entity may perform segmentation/concatenation but not ARQ. This may be appropriate for delay sensitive or error tolerant traffic (e.g., voice over Long Term evolution (VoLTE)). transparent mode (TM) only performs data buffering, and does not include either concatenation/segmentation or ARQ. TM may be used primarily for sending broadcast control information (e.g., the master information block (MIB) and system information block (SIBs)), paging messages, and RRC connection messages. Some transmissions may be sent without RLC (e.g., a random access channel (RACH) preamble and response).

In some cases, the wireless communications system 100 may use data compression techniques to reduce the amount of resources it takes to transmit information. One such technique is the evolved data compression scheme (eDCS), which may include performing compression of packet headers and payloads based on prior packets sent. The compression may be applied for different traffic types and may be dynamically engaged to perform no compression, header only compression, or both header and payload compression. eDCS may be implemented in the Packet Data Convergence Protocol (PDCP) layer in a UE 115 and eNB 150. eDCS may allow for compression of the headers and payload in the PDCP layers and other higher layers. eDCS may allow the wireless communications system 100 to have an increased system capacity by accommodating higher bandwidth and an increased number of UEs 115. eDCS may also allow each UE 115 to receive and transmit date at a higher rate.

A UE 115 may use a buffer status report (BSR) in order to communicate the amount of data that is pending for transmission over the channel to an eNB 150. With eDCS, the pending data may include uncompressed packets, compressed packets, or a combination of compressed and uncompressed packets. The BSR may be based on a UE's RLC PDUs. The BSR may account for packets that have not been delivered to lower layers for a first transmission attempt to an base station 105. In case of RLC fragmentation, the BSR may account for fragments that have not yet been transmitted. The BSR may also account for packets that attempted transmission but resulted in a non-acknowledgement (NACK) RLC message, and are pending re-transmission.

A base station 105 may receive a BSR from a UE 115. The base station 105 may use the received BSR to determine a grant size and a grant assignment frequency for the UE 115. The grant size may be based on a size of uncompressed packets, compressed packets, or a combination of compressed and uncompressed packets pending transmission in the UE 115. The base station 105 may then transmit the grant to the UE 115, and the UE 115 may proceed with transmitting one or more compressed packets or uncompressed packets.

In some cases, a UE 115 may undergo handover from one a source base station to a target base station. In these cases, the BSR information may not be transferred between base stations 105. Instead, the UE 115 may transmit a new BSR to the target base station after handover is complete.

With reference to the Wi-Fi network of the wireless communications system 100, the wireless local area network (WLAN) access points 135, 135-A may wirelessly communicate with the WLAN stations 140, 140-A via one or more WLAN access point antennas, over one or more communication links 145. In some examples, the WLAN access points 135, 135-A may communicate with the WLAN stations 140, 140-A using one or more Wi-Fi communication standards, such as an Institute of Electrical and Electronics (IEEE) Standard 802.11 (e.g., IEEE Standard 802.11a, IEEE Standard 802.11n, or IEEE Standard 802.11 ac).

In some examples, WLAN stations 140, 140-A may be a cellular phone, a personal digital assistant (PDA), a wireless communication device, a handheld device, a tablet computer, a laptop computer, or the like. In some examples, an apparatus may include aspects of both a UE 115, 115-A and WLAN stations 140, 140-A, and such an apparatus may communicate with at least one base station 105, 105-A using a first radio access technology (RAT) (e.g., a cellular RAT or multiple cellular RATs), and communicate with one or more WLAN access points 135, 135-A using a second RAT (e.g., a Wi-Fi RAT or multiple Wi-Fi RATs).

In some examples, at least one base station 105, 105-A and at least one UE 115, 115-A may communicate over a licensed radio frequency spectrum band and/or an unlicensed radio frequency spectrum band, whereas the WLAN access points 135, 135-A and WLAN stations 140, 140-A may communicate over the unlicensed radio frequency spectrum band. The unlicensed radio frequency spectrum band may therefore be shared by the base stations 105, 105-A, the UEs 115, 115-A, the WLAN access points 135, 135-A, and/or the WLAN stations 140, 140-A.

The number and arrangement of components shown in FIG. 1A are provided as an example. In practice, wireless communications system 100 may include additional devices, fewer devices, different devices, or differently arranged devices than those shown in FIG. 1A. Additionally, or alternatively, a set of devices (e.g., one or more devices) of wireless communications system 100 may perform one or more functions described as being performed by another set of devices of wireless communications system 100.

Figure 1B:
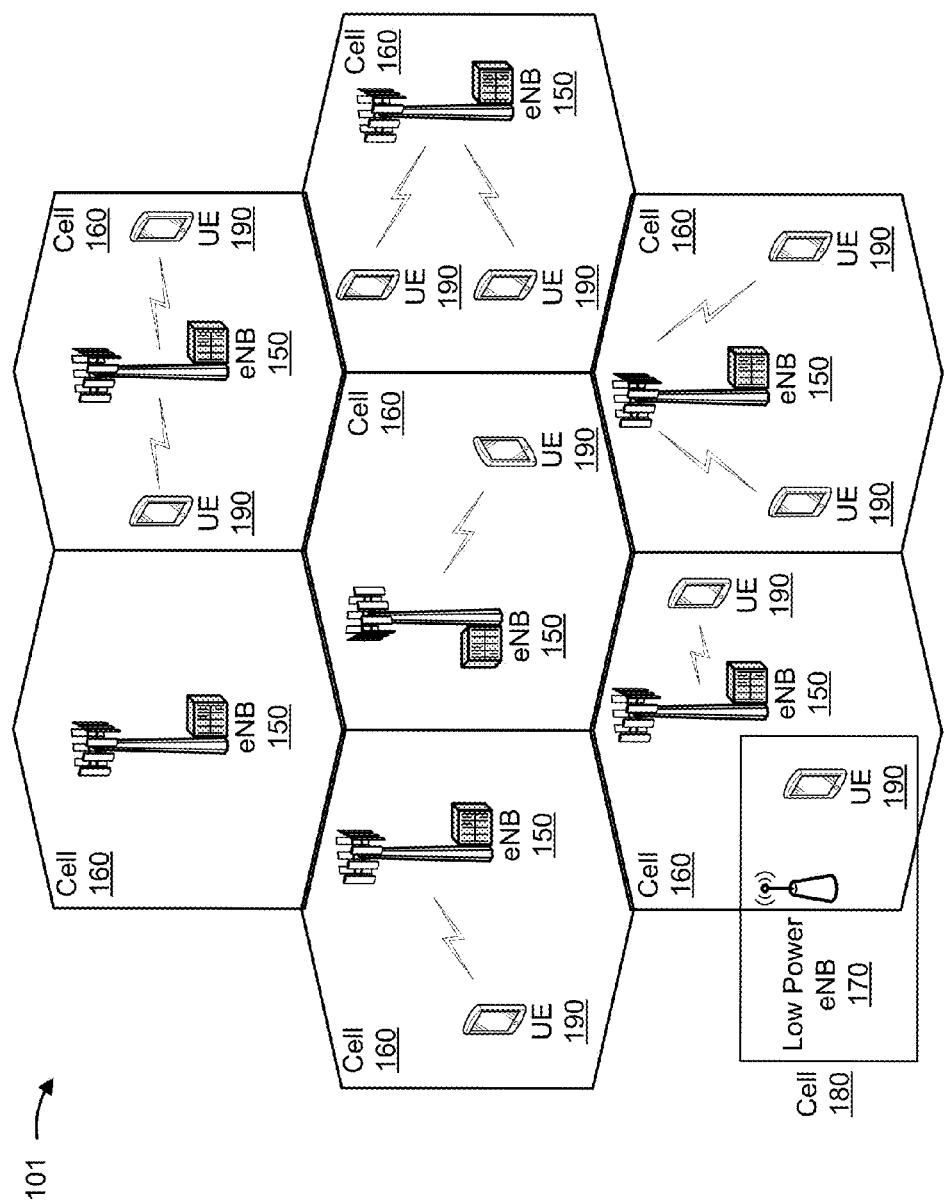
FIG. 1B illustrates an example access network in an LTE network architecture, in accordance with various aspects of the present disclosure.

FIG. 1B illustrates an example access network 101 in an LTE network architecture, in accordance with various aspects of the present disclosure. As shown, access network 101 may include at least one eNB 150 that serves a corresponding set of cellular regions (cells) 160, at least one low power eNB 170 that serves a corresponding at least one cell 180, and at least one UE 190.

Each eNB 150 may be assigned to a respective cell 160 and may be configured to provide an access point to a RAN. For example, eNB 150 may provide an access point for UE 190 to a radio access network (RAN) (e.g., eNB 150 may correspond to base station 105, shown in FIG. 1A). UE 190 may correspond to UE 115, shown in FIG. 1A. FIG. 1B does not illustrate a centralized controller for example access network 101, but access network 101 may use a centralized controller in some aspects. Each eNB 150 may perform radio related functions including radio bearer control, admission control, mobility control, scheduling, security, and network connectivity.

As shown in FIG. 1B, at least one low power eNB 170 may serve at least one cell 180, which may overlap with at least one cell 160 served by at least one eNB 150. The low power eNB 170 may correspond to base station 105, shown in FIG. 1A. A low power eNB 170 may be referred to as a remote radio head (RRH). The low power eNB 170 may include a femto cell eNB (e.g., home eNB (HeNB)), a pico cell eNB, a micro cell eNB, or the like.

A modulation and multiple access scheme employed by access network 101 may vary depending on the distinct telecommunications standard being deployed. In LTE applications, orthogonal frequency-division multiplexing (OFDM) is used on the downlink (DL) and SC-FDMA is used on the uplink (UL) to support both frequency division duplexing (FDD) and time division duplexing (TDD). The various concepts presented herein may be well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing Wideband CDMA (WCDMA) and other variants of CDMA (e.g., such as TD-SCDMA, GSM employing TDMA, E-UTRA, or the like), UMB, IEEE 802.11 (Wi-Fi), IEEE 802.16 (WiMAX), IEEE 802.20, Flash-OFDM employing OFDMA, or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The number and arrangement of devices and cells shown in FIG. 1B are provided as an example. In practice, there may be additional devices and/or cells, fewer devices and/or cells, different devices and/or cells, or differently arranged devices and/or cells than those shown in FIG. 1B. Furthermore, two or more devices shown in FIG. 1B may be implemented within a single device, or a single device shown in FIG. 1B may be implemented as multiple, distributed devices. Additionally, or alternatively, a set of devices (e.g., one or more devices) shown in FIG. 1B may perform one or more functions described as being performed by another set of devices shown in FIG. 1B.

Figure 2:
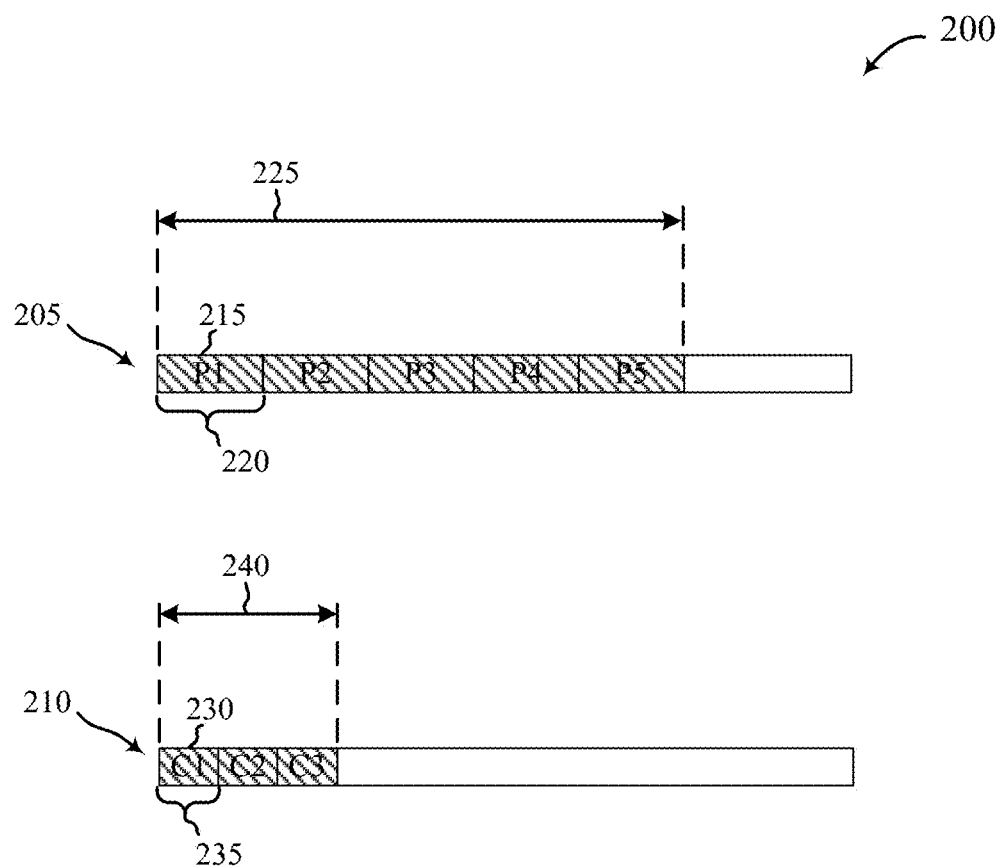
FIG. 2 illustrates an example of packet buffers in an evolved data compression scheme in accordance with various aspects of the present disclosure.

FIG. 2 illustrates an example of packet buffers 200 in an evolved data compression scheme (eDCS) in accordance with various aspects of the present disclosure. The packet buffers 200 may be included in a UE, such as UE 115 described above with reference to FIG. 1A, among others.

A UE may maintain two different packet buffers for outbound packets, an uncompressed buffer 205 and a compressed buffer 210. The uncompressed buffer 205 may contain at least one uncompressed packet 215. Each uncompressed packet 215 may have an uncompressed size 220. The contents of the uncompressed buffer 205 (e.g., uncompressed packet 215) may be associated with an uncompressed contents size 225. The compressed buffer 210 may include at least one compressed packet 230 corresponding to at least one uncompressed packet 215. Each of compressed packets 230 may have a compressed size 235. The contents of the compressed buffer 210 (e.g., compressed packets 230) may be associated with an compressed contents size 240.

The uncompressed buffer 205 may contain at least one uncompressed packet 215 that is/are received from an upper layer and that have not been delivered to the MAC layer for a first transmission. For RLC acknowledgement mode (AM) bearers, an uncompressed packet 215 in the uncompressed buffer 205 may be removed from the uncompressed buffer 205 when the uncompressed packet 215 is acknowledged by a receiver, such as an eNB 150 described above with reference to FIG. 1A, among others. The uncompressed packet 215 may be considered acknowledged if the uncompressed packet 215 itself is RLC acknowledged by the receiver. An uncompressed packet 215 may also be considered acknowledged if packets (compressed or uncompressed) corresponding to all the previous PDCP sequence numbers are RLC acknowledged by the receiver.

In some cases, an uncompressed packet 215 may be considered acknowledged only based on a RLC acknowledgement for that uncompressed packet 215. In these cases, removing the uncompressed packet 215 from the uncompressed buffer 205 without considering all the previous PDCP sequence numbers to be acknowledged may cause unrecoverable packet loss if the synchronization between the transmitter and the receiver is lost and there are holes in the RLC window that have not been propagated to the receiver.

For RLC unacknowledged mode (UM) bearers, the uncompressed packet 215 may be removed from the uncompressed buffer 205 when one or more compressed packets 230 corresponding to the uncompressed packet 215 is transmitted to the receiver (e.g., eNB 150). Alternatively, for both RLC AM and RLC UM bearers, the uncompressed packet 215 may be removed from the uncompressed buffer 205 when the uncompressed packet 215 is compressed into the compressed buffer 210. Removing the uncompressed packet 215 from the uncompressed buffer 205 upon compression may reduce the memory requirements for eDCS. However, removing the uncompressed packet 215 from the uncompressed buffer 205 upon compression may cause unrecoverable packet loss (even for RLC AM bearers) if the synchronization between the transmitter and the receiver is lost, and there are holes in the RLC window that have not been propagated to the receiver.

The compressed packets 230 in the compressed buffer 210 may each have been generated from an uncompressed packet 215 in the uncompressed buffer 205, and may correspond to an uncompressed packet 215 in the uncompressed buffer 205. The compression algorithm may provide different compression gains depending on the traffic characteristics. Due to the processing cost of packet compression, the compression of the at least one uncompressed packet 215 may be performed offline. The compressed buffer 210 may be used by the UE as a separate location to store the compressed packets 230 prior to receiving grants to send the packets (compressed or uncompressed). By the time a grant is received or by the time the grant is available to be used (e.g., four transmission time intervals (TTIs) after the grant reception), more uncompressed packets 215 may be received from the upper layers and may be compressed into the compressed buffer 210.

When a UE evaluates the contents of the packet buffers 200 for generating a BSR, the compressed buffer 210 may contain compressed packets 230 corresponding to only a fraction of the uncompressed packets 215 in the uncompressed buffer 205. In these cases, the UE may overestimate the BSR if the UE only uses the uncompressed contents size 225. BSR overestimation may lead to padding, which may affect eNB scheduling behavior in assigning further grants to the UE. Alternatively, if the UE uses only the compressed contents size 240, the UE may underestimate the BSR. BSR underestimation may result in the UE requesting extra grants from the eNB, which may cause extra bandwidth overhead to send extra BSRs and delays in transmission while the UE waits for extra grants from the eNB. Due to the variability in the compression gain caused by different traffic characteristics, a fixed BSR adjustment for the compressed contents size 240 may not be effective. Therefore, with eDCS, the BSR evaluation may be based on a combination of the uncompressed contents size 225 and the compressed contents size 240.

While the above description describes the packet buffers 200 as being in a UE, it should be understood that the packet buffers 200 be in any transmitting device, such as a base station or eNB. Similarly, it should be understood that any transmitting device may generate the BSR.

Figure 3:
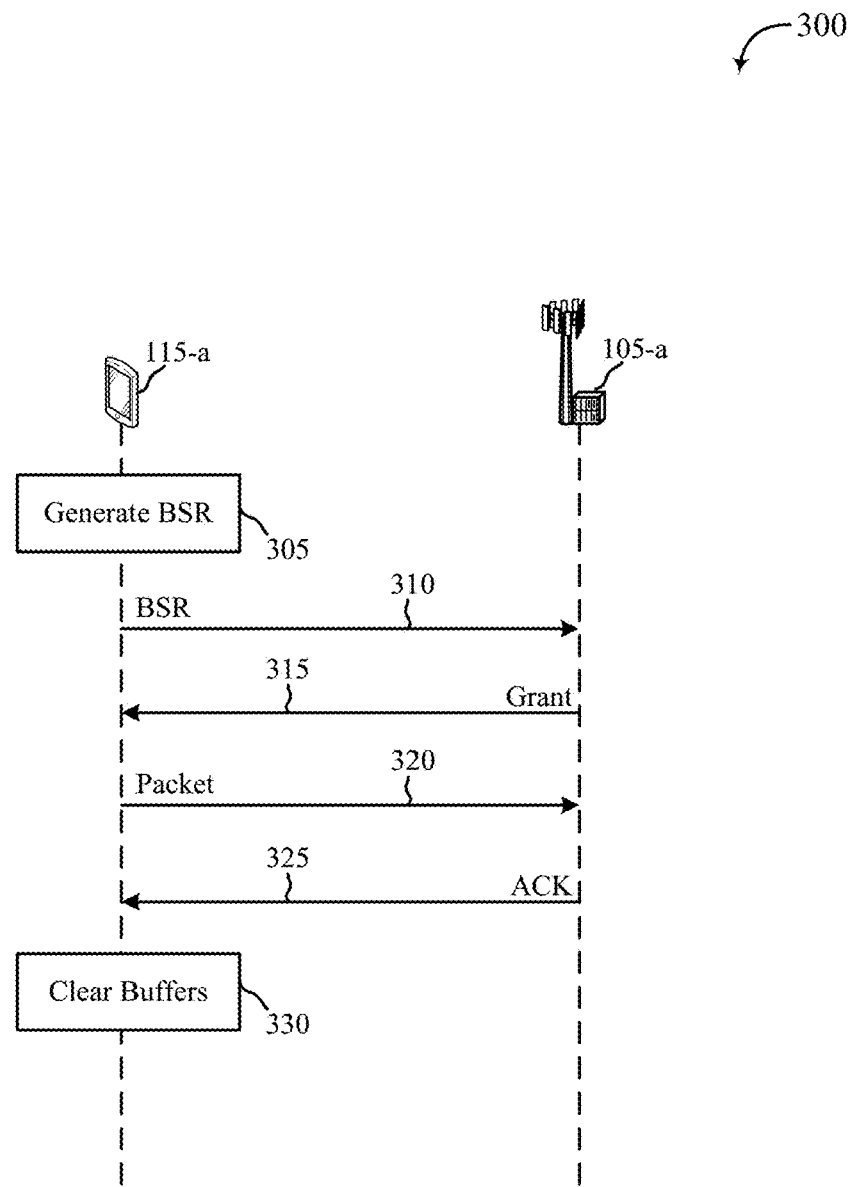
FIG. 3 illustrates an example of a process flow for buffer status reports in an evolved data compression scheme in accordance with various aspects of the present disclosure.

FIG. 3 illustrates an example of a process flow 300 for buffer status reports (BSRs) in an evolved data compression scheme (eDCS) in accordance with various aspects of the present disclosure. Process flow 300 may include a UE 115-a, which may be an example of a UE 115 described above with reference to FIG. 1A, among others. Process flow 300 may also include a base station 105-a, which may be an example of a base station 105 described above with reference to FIG. 1A, among others.

At step 305, the UE 115-a may generate a BSR. The BSR may be based on a combination of compressed and uncompressed buffer contents. If the compressed buffer includes compressed packets, then a compressed service data unit (SDU) size may be used in determining the BSR. In this case, the BSR may not account for an uncompressed copy of a compressed packet in the uncompressed buffer. If the uncompressed buffer includes packets that are not compressed, then an uncompressed SDU size may be used in determining the BSR. The BSR may then be transmitted to the base station 105-a at step 310.

The base station 105-a may use the BSR to determine a grant size and a grant assignment frequency for the UE 115-a. At step 310, the base station 105-a may transmit the grant information to the UE 115-a.

Based on the grant information, the UE 115-a transmit one or more packets to the base station 105-a at step 320. The transmitted packets may include compressed packets, uncompressed packets, or a combination of compressed and uncompressed packets. At step 325, the base station 105-a may send an acknowledgement (ACK) for each received packet.

If a packet (compressed or uncompressed) is successfully acknowledged by the base station 105-a, the compressed and uncompressed copies of the packet may be removed from the corresponding buffers at step 330. A packet may be considered acknowledged if the packet itself is RLC acknowledged by the base station 105-a. A packet may also be considered acknowledged if packets corresponding to all the previous PDCP sequence numbers are RLC acknowledged by the base station 105-a.

The UE 115-a or the base station 105-a may account for packets that have been RLC acknowledged but not removed from the corresponding buffers due to holes in the receiver window. Subsequent BSRs may omit the RLC acknowledged packets that have not been removed due to holes from the subsequent BSR evaluations.

If eDCS compression is disabled or reset, the BSR may be re-evaluated and a new BSR may be transmitted to the base station 105-a. If the compressed buffer of the UE 115-a is empty, then the BSR may be based only on the uncompressed contents size.

In some cases, at step 305, the UE 115-a may generate the BSR based on a prediction of the compressed size of the packets in the uncompressed buffer. The UE 115-a may calculate an expected compression gain by comparing the size of the corresponding uncompressed and compressed packets. In these cases, the BSR may be based on the uncompressed contents size multiplied by the expected compression gain.

The UE 115-a may update the expected compression gain using information from subsequent packet compressions. The compression gain may be updated using a moving average formula on a per packet basis. The compression gain (CG) may be set to predetermined value at initiation of eDCS. For example, the compression gain may be set to a value of one when eDCS is initiated. The initial CG may then be updated as follows:

$$CG_{new} = \alpha \, CG_{old} + (1-\alpha)\frac{\text{current packet compressed size}}{\text{current packet uncompressed size}}, \quad \text{(eq. 1)}$$

$$0 \le \alpha \le 1$$

The compression gain may be calculated based on different packet groups. For example, the compression gain may be calculated per bearer or per flow. Alternatively, one compression gain may calculated for all bearers with eDCS enabled. Alternatively, one compression gain may calculated for all the active bearers in the UE 115-a.

If eDCS is disabled or reset, the compression gain may be reset to the initial predetermined value (e.g., CG=1). If the UE 115-a undergoes handover to a target eNB, the compression gain may also be reset to the initial predetermined value (e.g., CG=1). When the compression gain is reset to a value of one, the resulting BSR transmitted to the target eNB may reflect the total uncompressed contents size of the uncompressed buffer.

Alternatively, when the UE 115-a undergoes handover to a target eNB, the compression gain may be initialized based on the current contents sizes of the uncompressed and compressed buffers as follows:

$$CG_{new} = \frac{\text{compressed contents size}}{\text{uncompressed contents size}} \times \frac{N_u}{N_c}, \quad \text{(eq. 2)}$$

where $N_c$ is the number of packets in the compressed buffer and $N_u$ is the number of packets in the uncompressed buffer. The compression gain may then be updated on a per packet basis according to equation 1.

While the above description describes a UE generating a BSR and transmitting packets to a base station, it should be understood that the techniques may apply to any transmitting device transmitting packets to any receiving device.

Figure 4:
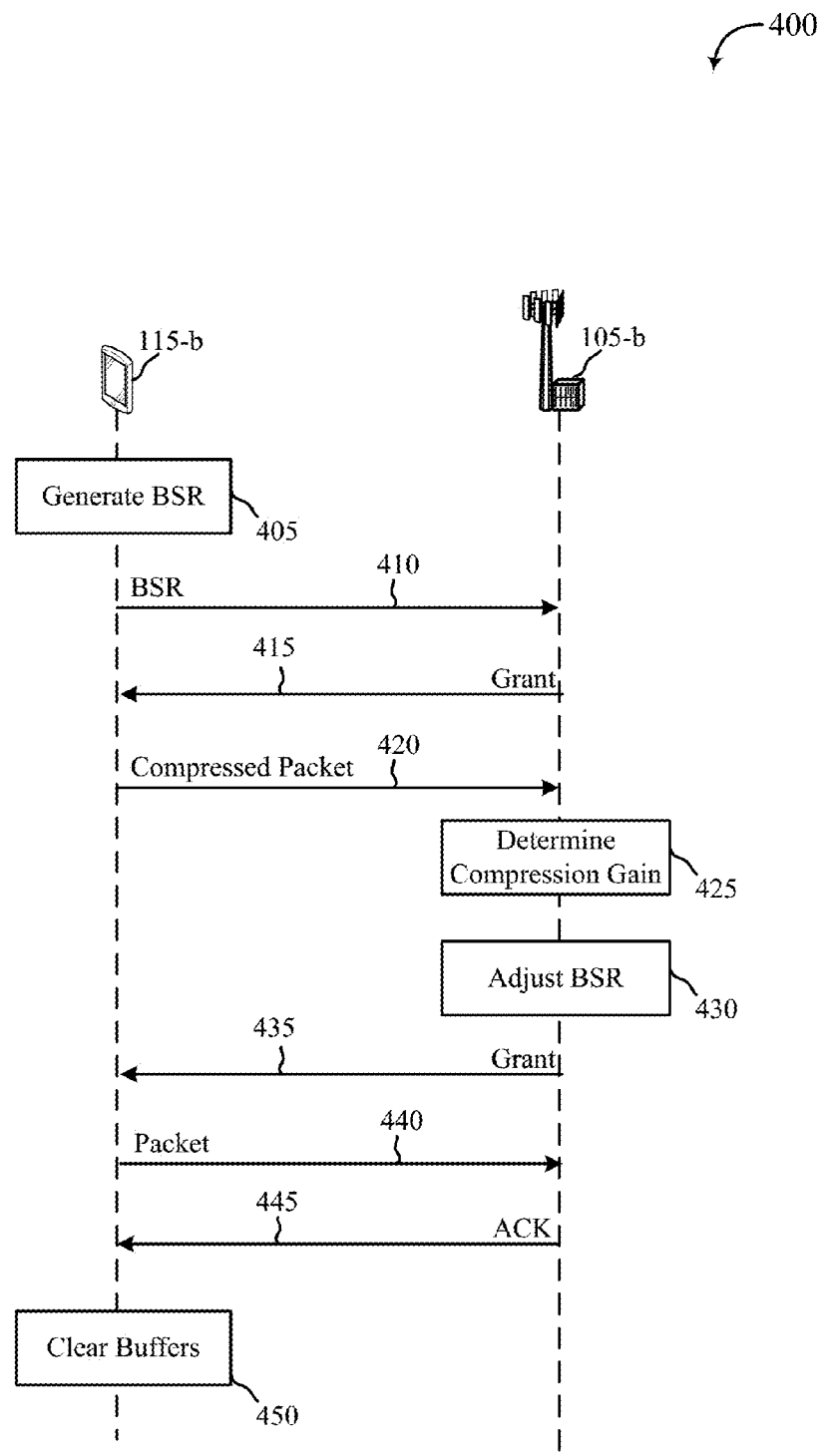
FIG. 4 illustrates an example of another process flow for buffer status reports in an evolved data compression scheme in accordance with various aspects of the present disclosure.

FIG. 4 illustrates an example of another process flow 400 for buffer status reports (BSRs) in an evolved data compression scheme (eDCS) in accordance with various aspects of the present disclosure. Process flow 400 may include a UE 115-b, which may be an example of a UE 115 described above with reference to FIG. 1A, among others. Process flow 400 may also include a base station 105-b, which may be an example of a base station 105 described above with reference to FIG. 1A, among others.

At step 405, the UE 115-b may generate a BSR. The BSR may be based on only the uncompressed buffer contents. The UE 115-b may then send the BSR to the base station 105-b at step 410. The base station 105-b may determine initial grants based on the BSR, and transmit the initial grants to the UE at step 415. The initial grants may not correctly account for the compressed buffer contents, as the BSR was based only on the uncompressed buffer contents.

At step 415, the UE 115-b may send one or more compressed packets to the base station 105-b in response to the initial grants. The base station 105-b may then determine an estimated compression gain at step 425 by comparing the size of uncompressed packets corresponding to the received compressed packets. The base station 105-*b* may also consider the padding size used by the UE to fill up the initial grants. The base station 105-*a* may continue to update the estimated compression gain using information from subsequent compressed or uncompressed packets that are received. The compression gain (CG) may be updated using a moving average formula on a per packet basis using equation 1. The compression gain used by the base station 105-*b* may be initialized with a predetermined value (e.g., CG=1) when eDCS is initiated.

In some examples, the base station 105-*b* may calculate the compression gain based on different packet groups. For example, the compression gain may be calculated per bearer or per flow. Alternatively, one compression gain may calculated for all bearers with eDCS enabled. Alternatively, one compression gain may calculated for all the active bearers in the UE 115-*b*.

If eDCS is disabled or reset, the compression gain may be reset to an initial predetermined value (e.g., CG=1). If the base station 105-*b* is a target eNB in a handover procedure, the compression gain may also be reset to the initial predetermined value (e.g., CG=1). Alternatively, the base station 105-*b* may receive a compression gain from the source eNB over an X2 interface and may use the received compression gain as the initial value. In other examples, the UE 115-*b* may transmit compression gain information to the base station 105-*b*, and the base station 105-*b* initialize the compression gain to a value based on the compression gain information received from the UE 115-*b*. Once the compression gain is initialized, the estimated compression gain may then be updated on a per packet basis according to equation 1.

At step 430, the base station 105-*b* may adjusts the BSR based on the estimated compression gain. For example, the base station 105-*b* may adjust the BSR by multiplying an original grant size by the estimated compression gain. The base station 105-*b* may then assign updated grants to the UE 115-*b* at step 435 based on the adjusted BSR.

Based on the updated grant information, the UE 115-*b* transmit one or more additional packets to the base station 105-*b* at step 440. The additional packets may include compressed packets, uncompressed packets, or a combination of compressed and uncompressed packets. At step 445, the base station 105-*b* may send an acknowledgement (ACK) for each received packet.

If a packet (compressed or uncompressed) is successfully acknowledged by the base station 105-*b*, the compressed and uncompressed copies of the packet may be removed from the corresponding buffers at step 450. A packet may be considered acknowledged if the packet itself is RLC acknowledged by the base station 105-*b*. A packet may also be considered acknowledged if packets corresponding to all the previous PDCP sequence numbers are RLC acknowledged by the base station 105-*b*.

The UE 115-*b* or the eNB 150-*b* may account for packets that have been RLC acknowledged but not removed from the corresponding buffers due to holes in the receiver window. Subsequent BSRs, either from the UE 115-*b*, or as adjusted by the base station 105-*b*, may omit the RLC acknowledged packets that have not been removed due to holes.

While the above description describes a UE generating a BSR and transmitting packets to a base station, it should be understood that the techniques may apply to any transmitting device transmitting packets to any receiving device.

Figure 5:
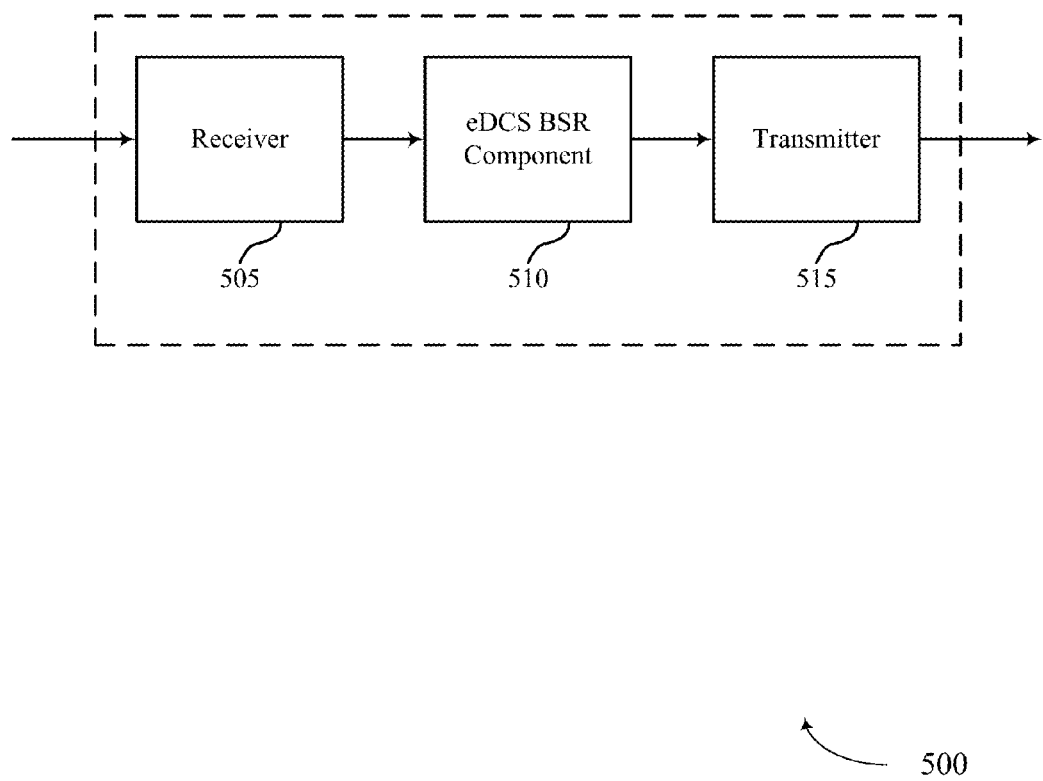
FIG. 5 shows a block diagram of a user equipment (UE) configured for buffer status reports in an evolved data compression scheme in accordance with various aspects of the present disclosure.

FIG. 5 shows a block diagram of a wireless device 500 configured for buffer status reports (BSRs) in an evolved data compression scheme (eDCS) in accordance with various aspects of the present disclosure. Wireless device 500 may be an example of aspects of a UE 115 described with reference to FIG. 1, 3, or 4. Wireless device 500 may include a receiver 505, an eDCS BSR component 510, or a transmitter 515. Wireless device 500 may also include a processor. Each of these components may be in communication with each other.

The receiver 505 may receive information such as packets, user data, or control information associated with various information channels (e.g., control channels, data channels, and information related to buffer status reports in an evolved data compression scheme, etc.). Information may be passed on to the eDCS BSR component 510, and to other components of wireless device 500.

The eDCS BSR component 510 may determine a first content size of an uncompressed buffer, determine a second content size of a compressed buffer, and generate a BSR based at least in part on the first content size of the uncompressed buffer and the second content size of the compressed buffer.

The transmitter 515 may transmit signals received from other components of wireless device 500. In some examples, the transmitter 515 may be collocated with the receiver 505 in a transceiver component. The transmitter 515 may include a single antenna, or it may include a plurality of antennas.

Figure 6:
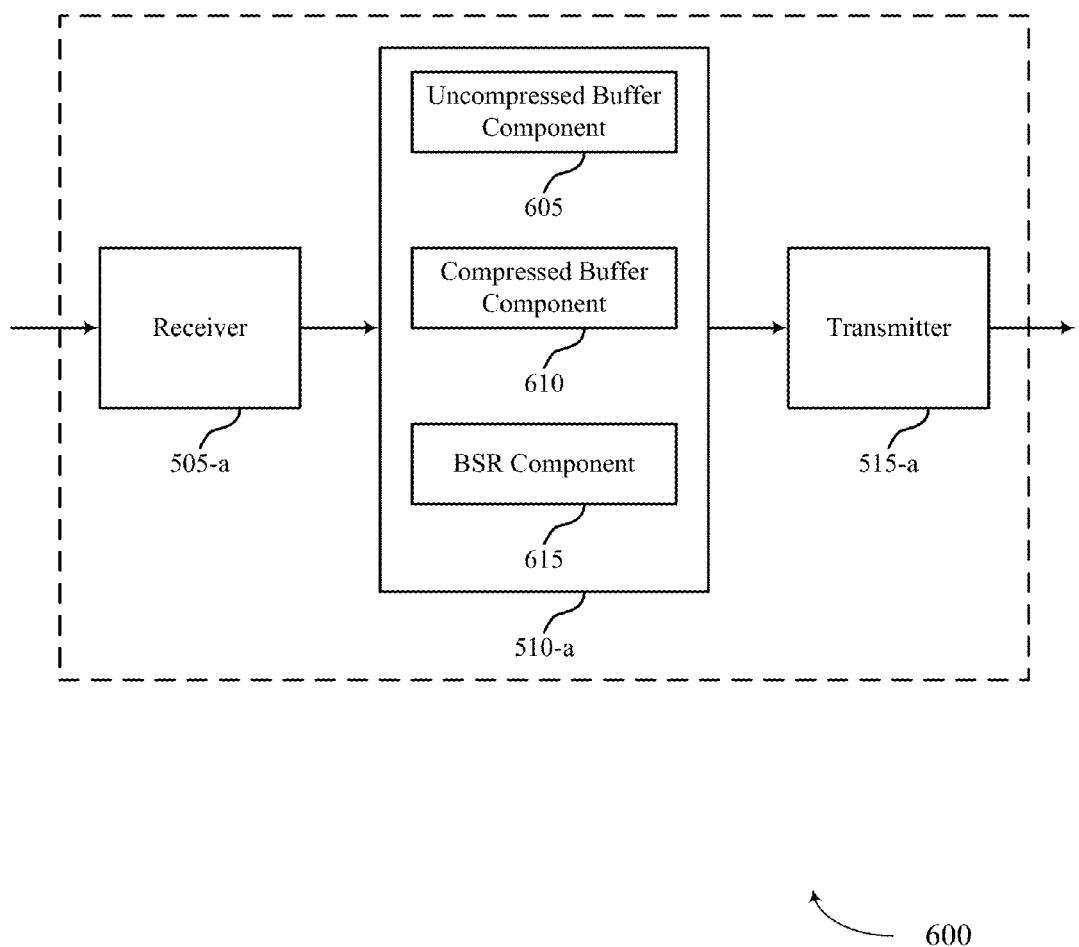
FIG. 6 shows a block diagram of a UE configured for buffer status reports in an evolved data compression scheme in accordance with various aspects of the present disclosure.

FIG. 6 shows a block diagram of a wireless device 600 for buffer status reports (BSRs) in an evolved data compression scheme (eDCS) in accordance with various aspects of the present disclosure. Wireless device 600 may be an example of aspects of a wireless device 500 or a UE 115 described with reference to FIG. 1 or 3-5. Wireless device 600 may include a receiver 505-*a*, an eDCS BSR component 510-*a*, or a transmitter 515-*a*. Wireless device 600 may also include a processor. Each of these components may be in communication with each other. The eDCS BSR component 510-*a* may also include an uncompressed buffer component 605, a compressed buffer component 610, and a BSR component 615.

The receiver 505-*a* may receive information which may be passed on to eDCS BSR component 510-*a*. The eDCS BSR component 510-*a* may perform the operations described above with reference to FIG. 5. The transmitter 515-*a* may transmit signals received from other components of wireless device 600.

The uncompressed buffer component 605 may determine a first content size of an uncompressed buffer as described above with reference to FIGS. 2-4. The uncompressed buffer component 605 may also determine a content size of an uncompressed buffer.

The compressed buffer component 610 may determine a second content size of a compressed buffer as described above with reference to FIGS. 2-4.

The BSR component 615 may generate a BSR based at least in part on the first content size of the uncompressed buffer and the second content size of the compressed buffer as described above with reference to FIGS. 2-4. The BSR component 615 may also generate a subsequent BSR based at least in part on the content size of the uncompressed buffer. In some examples, generating the BSR may include scaling the first content size of the uncompressed buffer by the compression gain. The BSR component 615 may also generate a BSR based at least in part on the content size of the uncompressed buffer.

Figure 7:
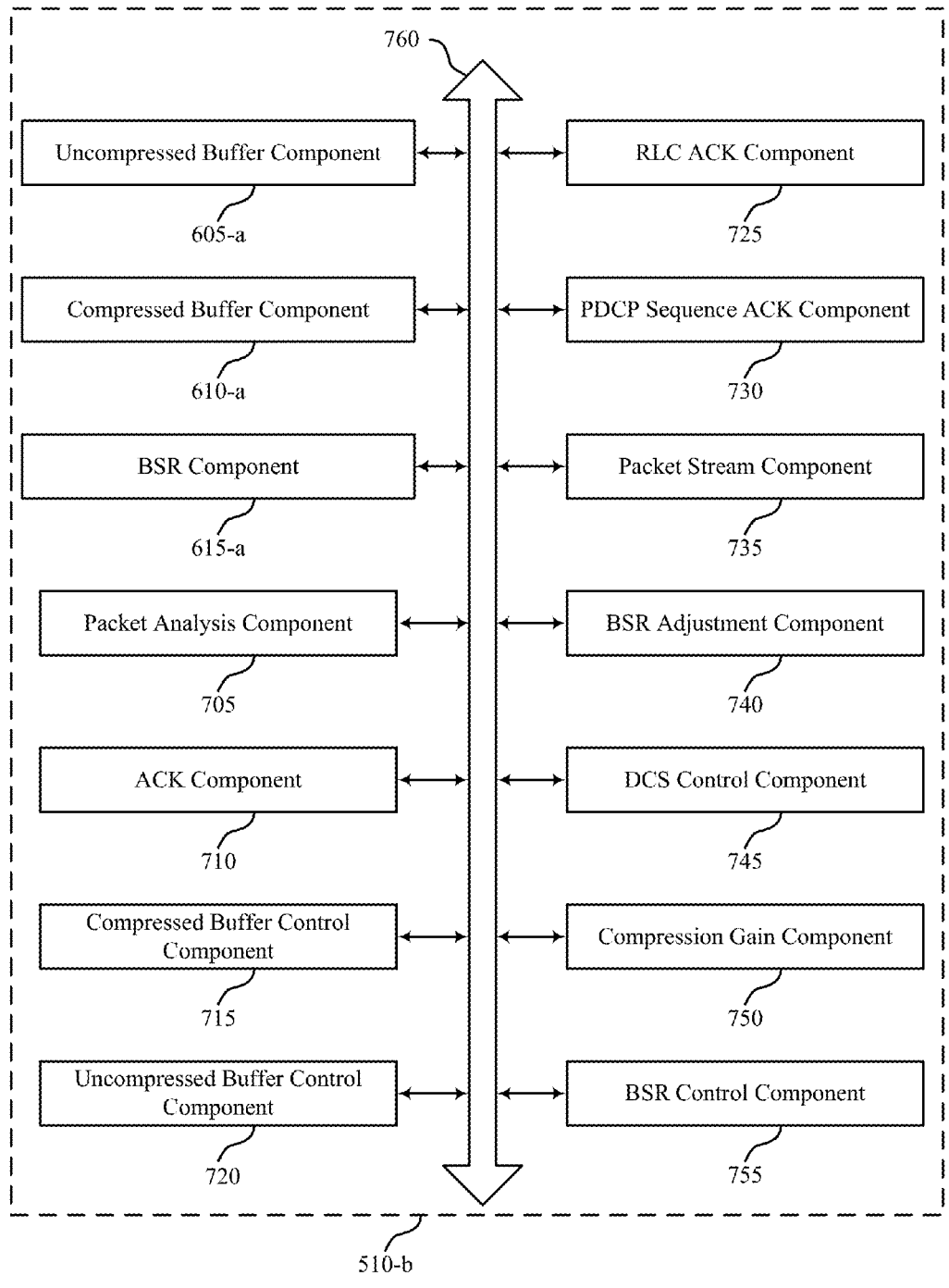
FIG. 7 shows a block diagram of an eDCS buffer status report (BSR) component configured for buffer status reports in an evolved data compression scheme in accordance with various aspects of the present disclosure.

FIG. 7 shows a block diagram 700 of an eDCS BSR component 510-*b* which may be a component of a wireless device 500 or a wireless device 600 for buffer status reports (BSRs) in an evolved data compression scheme (eDCS) in accordance with various aspects of the present disclosure. The eDCS BSR component 510-*b* may be an example of aspects of an eDCS BSR component 510 described with reference to FIGS. 5-6. The eDCS BSR component 510-*b* may include an uncompressed buffer component 605-*a*, a compressed buffer component 610-*a*, and a BSR component 615-*a*. Each of these components may perform the functions described above with reference to FIG. 6. The eDCS BSR component 510-*b* may also include a packet analysis component 705, an ACK component 710, a compressed buffer control component 715, an uncompressed buffer control component 720, a RLC ACK component 725, a PDCP sequence ACK component 730, a packet stream component 735, a BSR adjustment component 740, a DCS control component 745, a compression gain component 750, and a BSR control component 755.

The packet analysis component 705 may determine whether a packet is uncompressed or compressed based at least in part on a contents of the uncompressed buffer and a contents of the compressed buffer. In some examples, the BSR may be generated based at least in part on an uncompressed SDU size if the packet is uncompressed or on a compressed SDU size if the packet is compressed as described above with reference to FIGS. 2-3. The packet analysis component 705 may also compare the subsequent uncompressed packet and the corresponding subsequent compressed packet.

The ACK component 710 may receive an acknowledgement indicating a successfully received packet as described above with reference to FIGS. 2-4. The ACK component 710 may also receive an acknowledgement indicating a successfully received compressed packet.

The compressed buffer control component 715 may remove a compressed copy of the packet from the compressed buffer as described above with reference to FIGS. 2-4. The compressed buffer control component 715 may also remove a contents of the compressed buffer. The compressed buffer control component 715 may also identify a compressed packet in the compressed buffer corresponding to the uncompressed packet. The compressed buffer control component 715 may also identify a subsequent compressed packet in the compressed buffer corresponding to the subsequent uncompressed packet. The compressed buffer control component 715 may also remove the compressed packet from the compressed buffer.

The uncompressed buffer control component 720 may remove an uncompressed copy of the packet from the uncompressed buffer as described above with reference to FIGS. 2-4. The uncompressed buffer control component 720 may also determine that the uncompressed buffer contains an uncompressed packet. The uncompressed buffer control component 720 may also identify a subsequent uncompressed packet in the uncompressed buffer. The uncompressed buffer control component 720 may also remove the uncompressed packet from the uncompressed buffer.

The RLC ACK component 725 may be configured such that receiving the ACK may include receiving a RLC ACK message corresponding to the transmitted packet as described above with reference to FIGS. 2-4. In some examples, the receiving the acknowledgement comprises receiving a RLC ACK message corresponding to the compressed packet.

The PDCP sequence ACK component 730 may be configured such that receiving the ACK may include receiving RLC ACK messages corresponding to previously transmitted packets of a packet data convergence protocol (PDCP) sequence as described above with reference to FIGS. 2-4. In some examples, the receiving the acknowledgement comprises receiving RLC ACK messages corresponding to previously transmitted packets of a packet data convergence protocol (PDCP) sequence.

The packet stream component 735 may determine that a previously transmitted packet of a packet data convergence protocol (PDCP) sequence corresponds to a hole in a receiver window as described above with reference to FIGS. 2-4. In some cases, the BSR adjustment component 740 may omit the transmitted packet from subsequent BSRs as described above with reference to FIGS. 2-4.

The DCS control component 745 may determine a data compression scheme is disabled or reset as described above with reference to FIGS. 2-4. The DCS control component 745 may also determine a data compression scheme has been disabled or reset.

The compression gain component 750 may determine a compression gain based at least in part on the uncompressed packet and the corresponding compressed packet as described above with reference to FIGS. 2-4. In some examples, determining the compression gain may include determining a size of the uncompressed packet, determining a size of the corresponding compressed packet, and comparing the size of the uncompressed packet to the size of the corresponding compressed packet. The compression gain component 750 may also adjust the compression gain based at least in part on the comparison of the subsequent uncompressed packet and the corresponding subsequent compressed packet. In Adjusting the compression gain may, for instance, include determining an average of the compression gain based at least in part on the uncompressed packet, the corresponding compressed packet, the subsequent uncompressed packet, and the corresponding subsequent compressed packet.

In some examples, determining the compression gain may include determining the compression gain based at least in part on a bearer. In some examples, determining the compression gain may include determining the compression gain for all bearers with data compression enabled. The bearers may include all active bearers of a UE. The compression gain component 750 may also assign the compression gain a predetermined value. The compression gain component 750 may also initialize the compression gain at a predetermined value. Additionally or alternatively, The BSR control component 755 may generate the BSR based at least in part on the compression gain as described above with reference to FIGS. 2-4.

A communications bus 760 may allow each of the components of eDCS BSR component 510-*c* to communicate, directly or indirectly, with one another. The components of wireless device 500, wireless device 600, or eDCS BSR component 510-*b* may each, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 8:
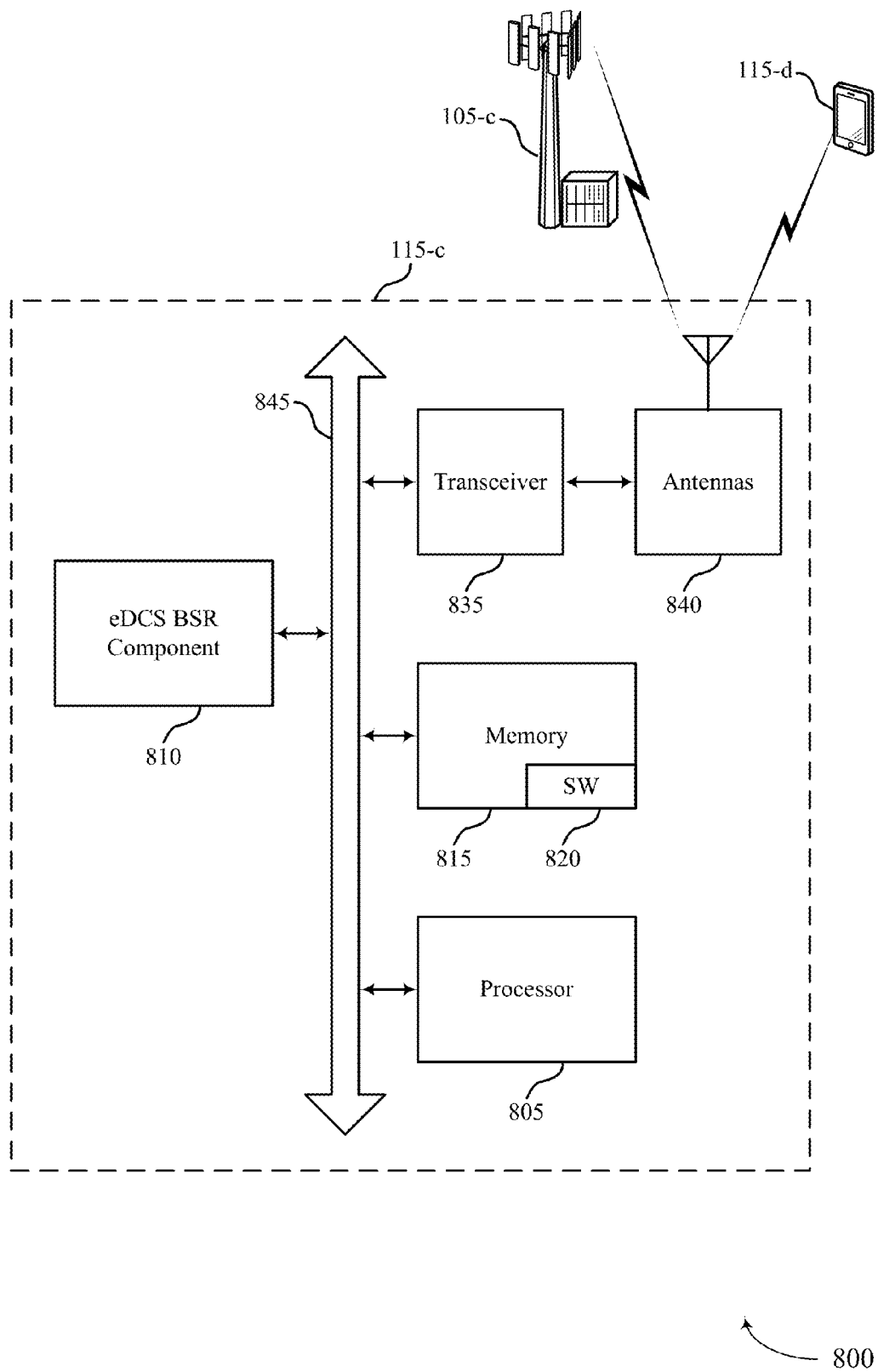
FIG. 8 illustrates a block diagram of a system including a UE configured for buffer status reports in an evolved data compression scheme in accordance with various aspects of the present disclosure.

FIG. 8 shows a diagram of a system 800 including a UE 115 configured for buffer status reports in an evolved data compression scheme in accordance with various aspects of the present disclosure. System 800 may include UE 115-c, which may be an example of a wireless device 500, a wireless device 600, or a UE 115 described above with reference to FIG. 1 or 3-7. UE 115-c may include an eDCS BSR component 810, which may be an example of an eDCS BSR component 510 described with reference to FIGS. 5-7. UE 115-c may also include a Default 825. UE 115-c may also include components for bi-directional voice and data communications including components for transmitting communications and components for receiving communications. For example, UE 115-c may communicate bi-directionally with base station 105-c or UE 115-d UE 115-c may also include a processor component 805, and memory 815 (including software (SW) 820), a transceiver component 835, and one or more antenna(s) 840, each of which may communicate, directly or indirectly, with one another (e.g., via buses 845). The transceiver component 835 may communicate bi-directionally, via the antenna(s) 840 or wired or wireless links, with one or more networks, as described above. For example, the transceiver component 835 may communicate bi-directionally with a base station 105 or another UE 115. The transceiver component 835 may include a modem to modulate the packets and provide the modulated packets to the antenna(s) 840 for transmission, and to demodulate packets received from the antenna(s) 840. While UE 115-c may include a single antenna 840, UE 115-c may also have at least one single antenna 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor component 805 to perform various functions described herein (e.g., buffer status reports in an evolved data compression scheme, etc.). Alternatively, the computer-executable software/firmware code 820 may not be directly executable by the processor component 805 but cause a computer (e.g., when compiled and executed) to perform functions described herein. The processor component 805 may include an intelligent hardware device, (e.g., a central processing unit (CPU), a microcontroller, an ASIC, etc.).

Figure 9:
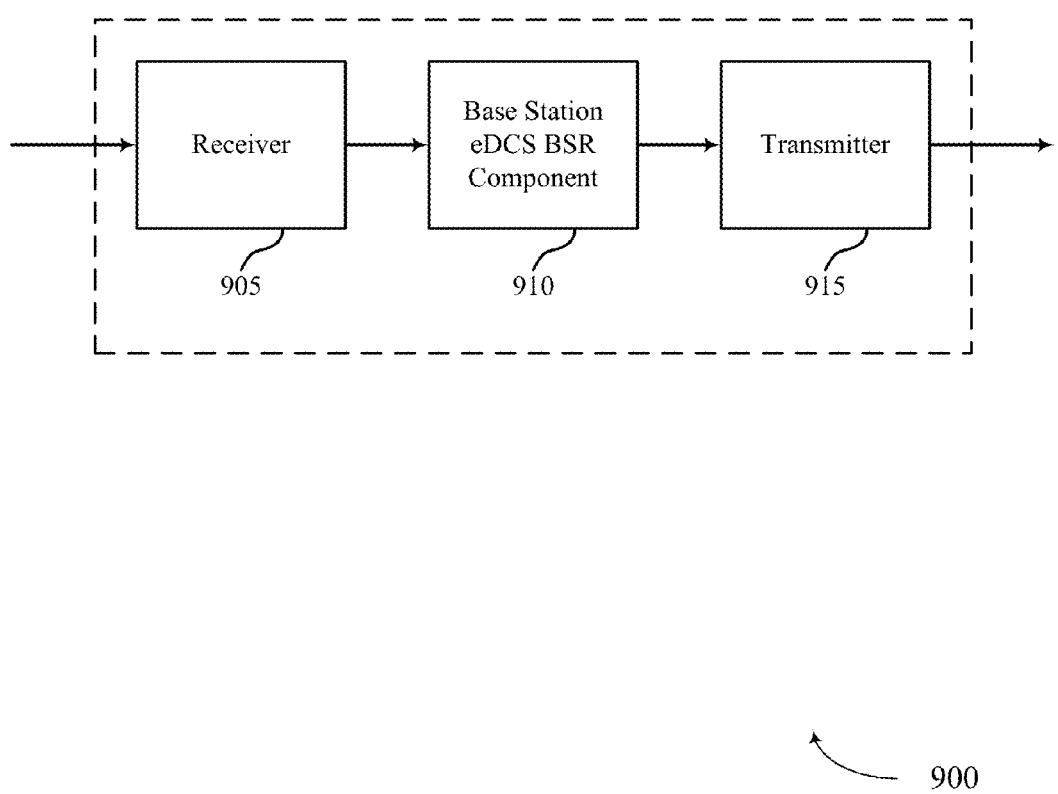
FIG. 9 shows a block diagram of a base station configured for buffer status reports in an evolved data compression scheme in accordance with various aspects of the present disclosure.

FIG. 9 shows a block diagram of a wireless device 900 configured for buffer status reports in an evolved data compression scheme in accordance with various aspects of the present disclosure. Wireless device 900 may be an example of aspects of a base station 105 described with reference to FIG. 1 or 3-8. Wireless device 900 may include a receiver 905, a base station eDCS BSR component 910, or a transmitter 915. Wireless device 900 may also include a processor. Each of these components may be in communication with each other.

The receiver 905 may receive information such as packets, user data, or control information associated with various information channels (e.g., control channels, data channels, and information related to buffer status reports in an evolved data compression scheme, etc.). Information may be passed on to the base station eDCS BSR component 910, and to other components of wireless device 900. In some examples, the receiver 905 may receive a compressed packet from the UE. In some examples, the receiver 905 may receive compression information from the UE.

The base station eDCS BSR component 910 may receive a BSR based at least in part on a size of an uncompressed buffer of a UE, receive a compressed packet from the UE, determine a compression gain based at least in part on a size of the compressed packet and a size of a corresponding uncompressed packet, adjust the received BSR based at least in part on the compression gain, and assign a grant to the UE based at least in part on the adjusted BSR.

The transmitter 915 may transmit signals received from other components of wireless device 900. In some examples, the transmitter 915 may be collocated with the receiver 905 in a transceiver component. The transmitter 915 may include a single antenna, or it may include a plurality of antennas.

Figure 10:
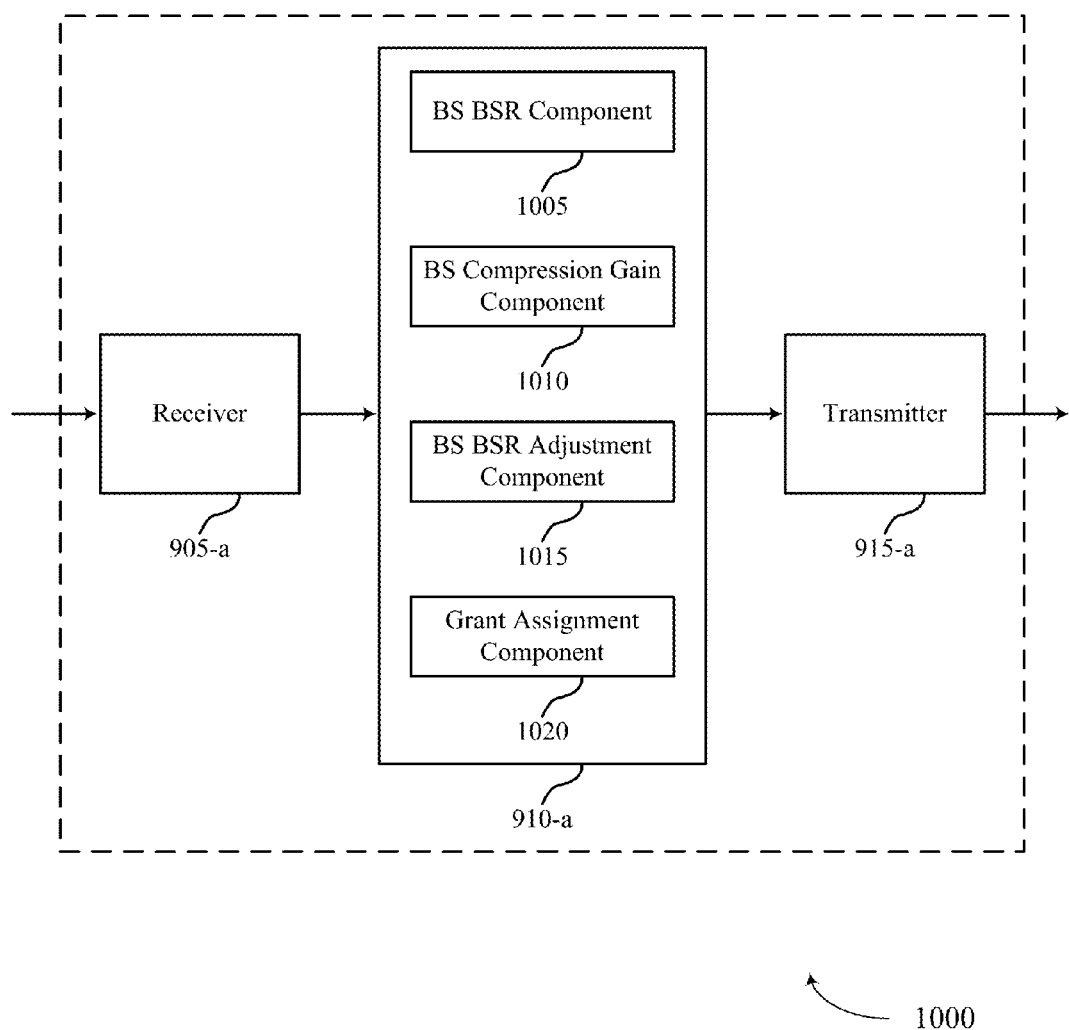
FIG. 10 shows a block diagram of a base station eDCS BSR component configured for buffer status reports in an evolved data compression scheme in accordance with various aspects of the present disclosure.

FIG. 10 shows a block diagram of a wireless device 1000 for buffer status reports in an evolved data compression scheme in accordance with various aspects of the present disclosure. Wireless device 1000 may be an example of aspects of a wireless device 900 or a base station 105 described with reference to FIG. 1 or 3-9. Wireless device 1000 may include a receiver 905-a, a base station eDCS BSR component 910-a, or a transmitter 915-a. Wireless device 1000 may also include a processor. Each of these components may be in communication with each other. The base station eDCS BSR component 910-a may also include a BS BSR component 1005, a BS compression gain component 1010, a BS BSR adjustment component 1015, and a grant assignment component 1020.

The receiver 905-a may receive information which may be passed on to base station eDCS BSR component 910-a. The base station eDCS BSR component 910-a may perform the operations described above with reference to FIG. 9. The transmitter 915-a may transmit signals received from other components of wireless device 1000.

The BS BSR component 1005 may receive a BSR based at least in part on a size of an uncompressed buffer of a UE as described above with reference to FIGS. 2-4.

The BS compression gain component 1010 may determine a compression gain based at least in part on a size of the compressed packet and a size of a corresponding uncompressed packet as described above with reference to FIGS. 2-4.

The BS BSR adjustment component 1015 may adjust the received BSR based at least in part on the compression gain as described above with reference to FIGS. 2-4.

The grant assignment component 1020 may assign a grant to the UE based at least in part on the adjusted BSR as described above with reference to FIGS. 2-4.

Figure 11:
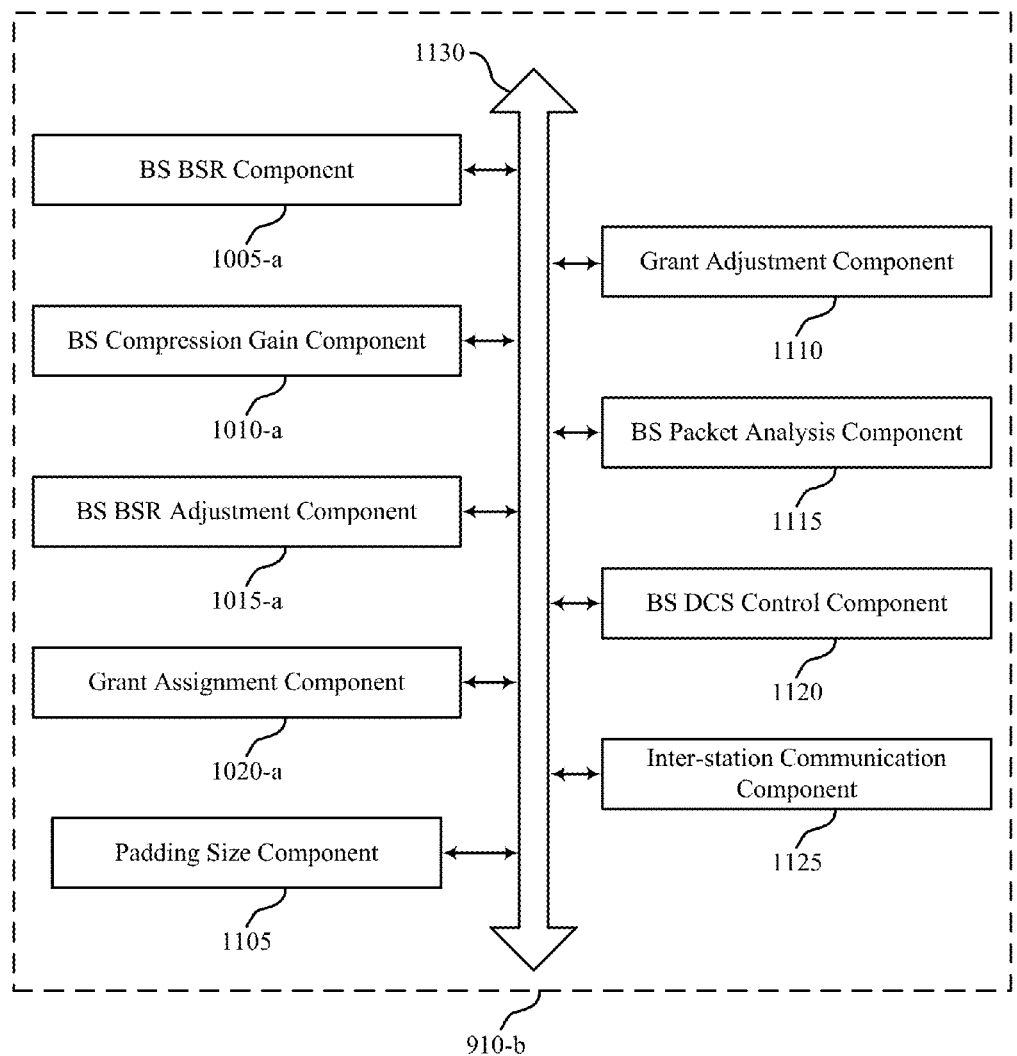
FIG. 11 shows a block diagram of a base station configured for buffer status reports in an evolved data compression scheme in accordance with various aspects of the present disclosure.

FIG. 11 shows a block diagram 1100 of a base station eDCS BSR component 910-b which may be a component of a wireless device 900 or a wireless device 1000 for buffer status reports in an evolved data compression scheme in accordance with various aspects of the present disclosure. The base station eDCS BSR component 910-b may be an example of aspects of a base station eDCS BSR component 910 described with reference to FIGS. 9-10. The base station eDCS BSR component 910-b may include a BS BSR component 1005-a, a BS compression gain component 1010-a, a BS BSR adjustment component 1015-a, and a grant assignment component 1020-a. Each of these components may perform the functions described above with reference to FIG. 10. The base station eDCS BSR component 910-b may also include a padding size component 1105, a grant adjustment component 1110, a BS packet analysis component 1115, a BS DCS control component 1120, and an inter-station communication component 1125.

The padding size component 1105 may determine a padding size used by the UE to fill a previous grant as described above with reference to FIGS. 2-4. In some cases, the grant adjustment component 1110 may be configured such that adjusting the received buffer status report may include determining a grant size associated with the received BSR, and scaling the grant size by compression gain as described above with reference to FIGS. 2-4.

The BS packet analysis component 1115 may receive a subsequent compressed packet from the UE as described above with reference to FIGS. 2-4. While, in some examples, The BS DCS control component 1120 may determine a data compression scheme is disabled or reset as described above with reference to FIGS. 2-4. Additionally or alternatively, the inter-station communication component 1125 may transmit the compression gain to a base station via a backhaul link as described above with reference to FIGS. 2-4.

A communications bus 1130 may allow each of the components of base station eDCS BSR component to communicate, directly or indirectly, with one another. The components of wireless device 900, wireless device 1000, or base station eDCS BSR component 910-*b* may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 12:
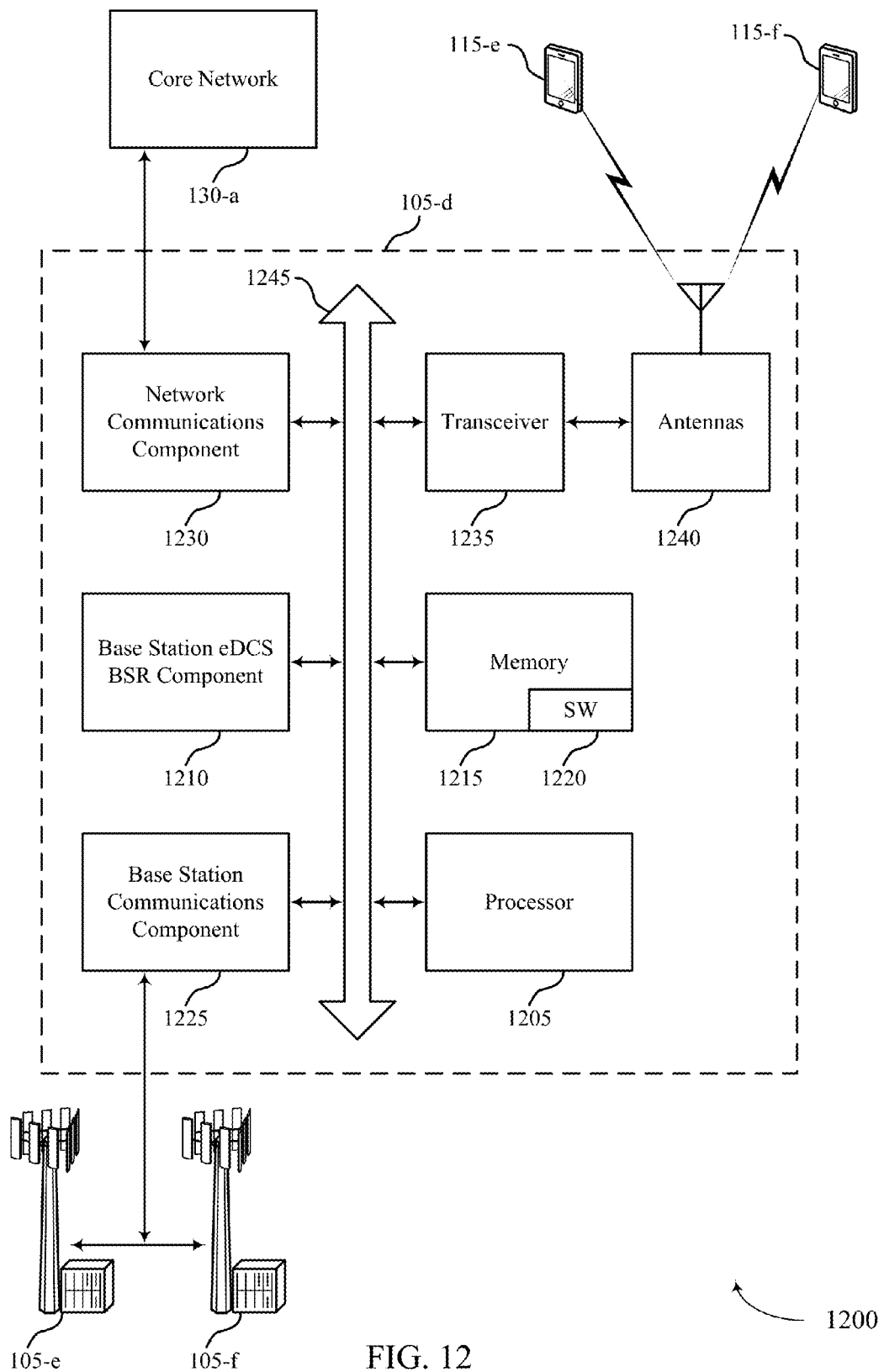
FIG. 12 illustrates a block diagram of a system including a base station configured for buffer status reports in an evolved data compression scheme in accordance with various aspects of the present disclosure.

FIG. 12 shows a diagram of a system 1200 including a base station 105 configured for buffer status reports in an evolved data compression scheme in accordance with various aspects of the present disclosure. System 1200 may include base station 105-*d*, which may be an example of a wireless device 900, a wireless device 1000, or a base station 105 described above with reference to FIGS. 1, 2 and 9-11. Base Station 105-*d* may include a base station eDCS BSR component 1210, which may be an example of a base station eDCS BSR component 910 described with reference to FIGS. 9-11. Base Station 105-*d* may also include components for bi-directional voice and data communications including components for transmitting communications and components for receiving communications. For example, base station 105-*d* may communicate bi-directionally with UE 115-*e* or UE 115-*f*.

In some cases, base station 105-*d* may have one or more wired backhaul links Base station 105-*d* may have a wired backhaul link (e.g., S1 interface, etc.) to the core network 130. Base station 105-*d* may also communicate with at least one other base station 105, such as base station 105-*e* and base station 105-*f* via inter-base station backhaul links (e.g., an X2 interface). Each of base station 105 may communicate with at least one UE 115 using the same or different wireless communications technologies. In some cases, base station 105-*d* may communicate with other base stations such as 105-*e* or 105-*f* utilizing base station communications component 1225. In some examples, base station communications component 1225 may provide an X2 interface within an LTE/LTE-A wireless communication network technology to provide communication between some of the base stations 105. In some examples, base station 105-*d* may communicate with other base stations through core network 130. In some cases, base station 105-*d* may communicate with the core network 130 through network communications component 1230.

The base station 105-*d* may include a processor component 1205, memory 1215 (including software (SW) 1220), transceiver components 1235, and antenna(s) 1240, which each may be in communication, directly or indirectly, with one another (e.g., over bus system 1245). The transceiver components 1235 may be configured to communicate bi-directionally, via the antenna(s) 1240, with the UEs 115, which may be multi-mode devices. The transceiver components 1235 (or other components of the base station 105-*d*) may also be configured to communicate bi-directionally, via the antennas 1240, with one or more other base stations (not shown). The transceiver components 1235 may include a modem configured to modulate the packets and provide the modulated packets to the antennas 1240 for transmission, and to demodulate packets received from the antennas 1240. The base station 105-*d* may include multiple transceiver components 1235, each with one or more associated antennas 1240.

The memory 1215 may include RAM and ROM. The memory 1215 may also store computer-readable, computer-executable software code 1220 containing instructions that are configured to, when executed, cause the processor component 1210 to perform various functions described herein (e.g., buffer status reports in an evolved data compression scheme, selecting coverage enhancement techniques, call processing, database management, message routing, etc.). Alternatively, the computer-executable software code 1220 may not be directly executable by the processor component 1205 but be configured to cause the computer, e.g., when compiled and executed, to perform functions described herein. The processor component 1205 may include an intelligent hardware device, e.g., a CPU, a microcontroller, an ASIC, etc. The processor component 1205 may include various special purpose processors such as encoders, queue processing components, base band processors, radio head controllers, digital signal processor (DSPs), and the like.

The base station communications component 1225 may manage communications with at least one other base station 105. The communications management component may include a controller or scheduler for controlling communications with UEs 115 in cooperation with at least one other base station 105. For example, the base station communications component 1225 may coordinate scheduling for transmissions to at least one UE 115 for various interference mitigation techniques such as beamforming or joint transmission.

Figure 13:
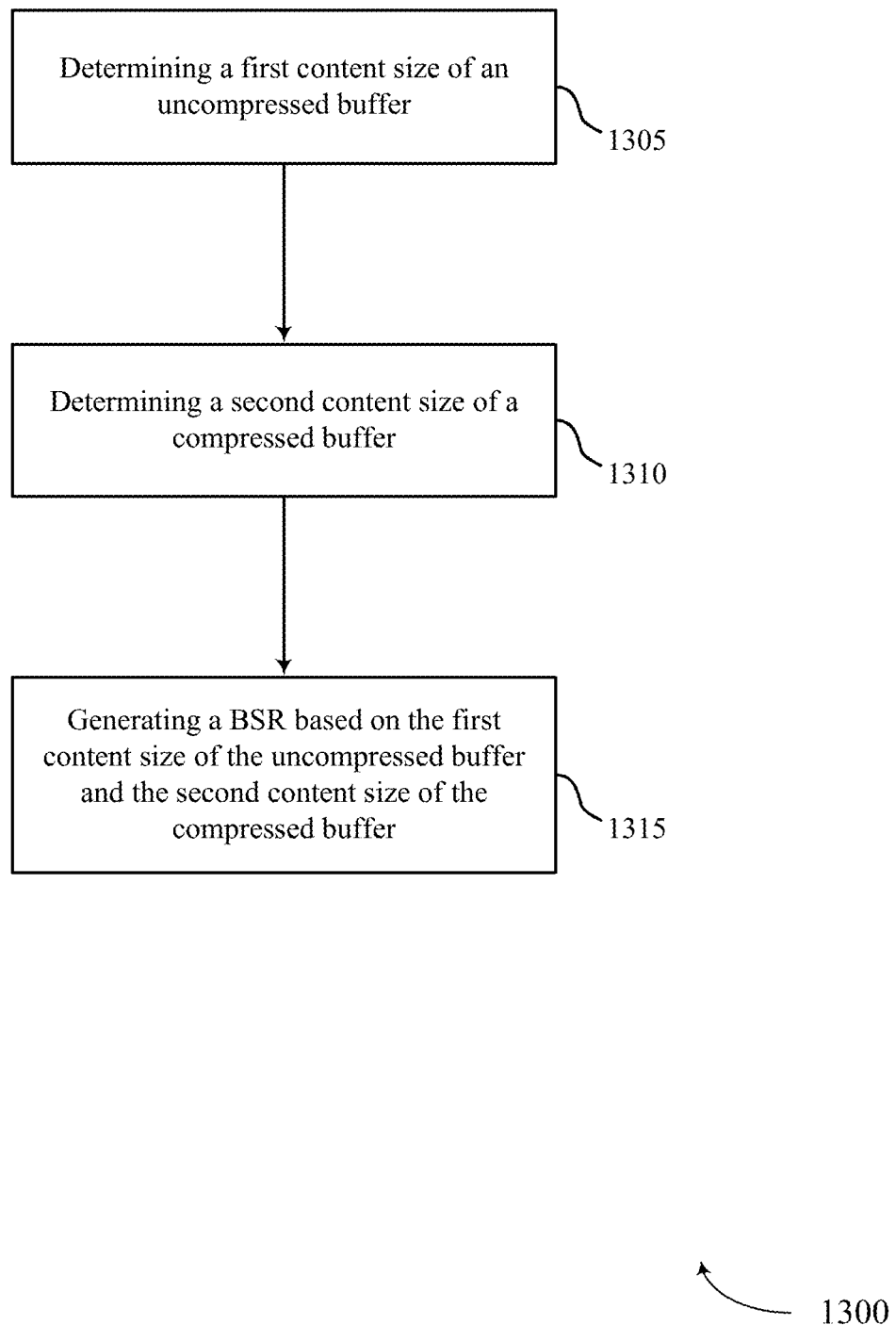
FIG. 13 shows a flowchart illustrating a method for buffer status reports in an evolved data compression scheme in accordance with various aspects of the present disclosure.

FIG. 13 shows a flowchart illustrating a method 1300 for buffer status reports (BSR) in an evolved data compression scheme (eDCS) in accordance with various aspects of the present disclosure. The operations of method 1300 may be implemented by a UE 115 or its components as described with reference to FIGS. 1-12. For example, the operations of method 1300 may be performed by the eDCS BSR component 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may determine a first content size of an uncompressed buffer as described above with reference to FIGS. 2-4. In some examples, the operations of block 1305 may be performed by the uncompressed buffer component 605 as described above with reference to FIG. 6.

At block 1310, the UE 115 may determine a second content size of a compressed buffer as described above with reference to FIGS. 2-4. In some examples, the operations of block 1310 may be performed by the compressed buffer component 610 as described above with reference to FIG. 6.

At block 1315, the UE 115 may generate a BSR based at least in part on the first content size of the uncompressed buffer and the second content size of the compressed buffer as described above with reference to FIGS. 2-4. In some examples, the operations of block 1315 may be performed by the BSR component 615 as described above with reference to FIG. 6.

Figure 14:
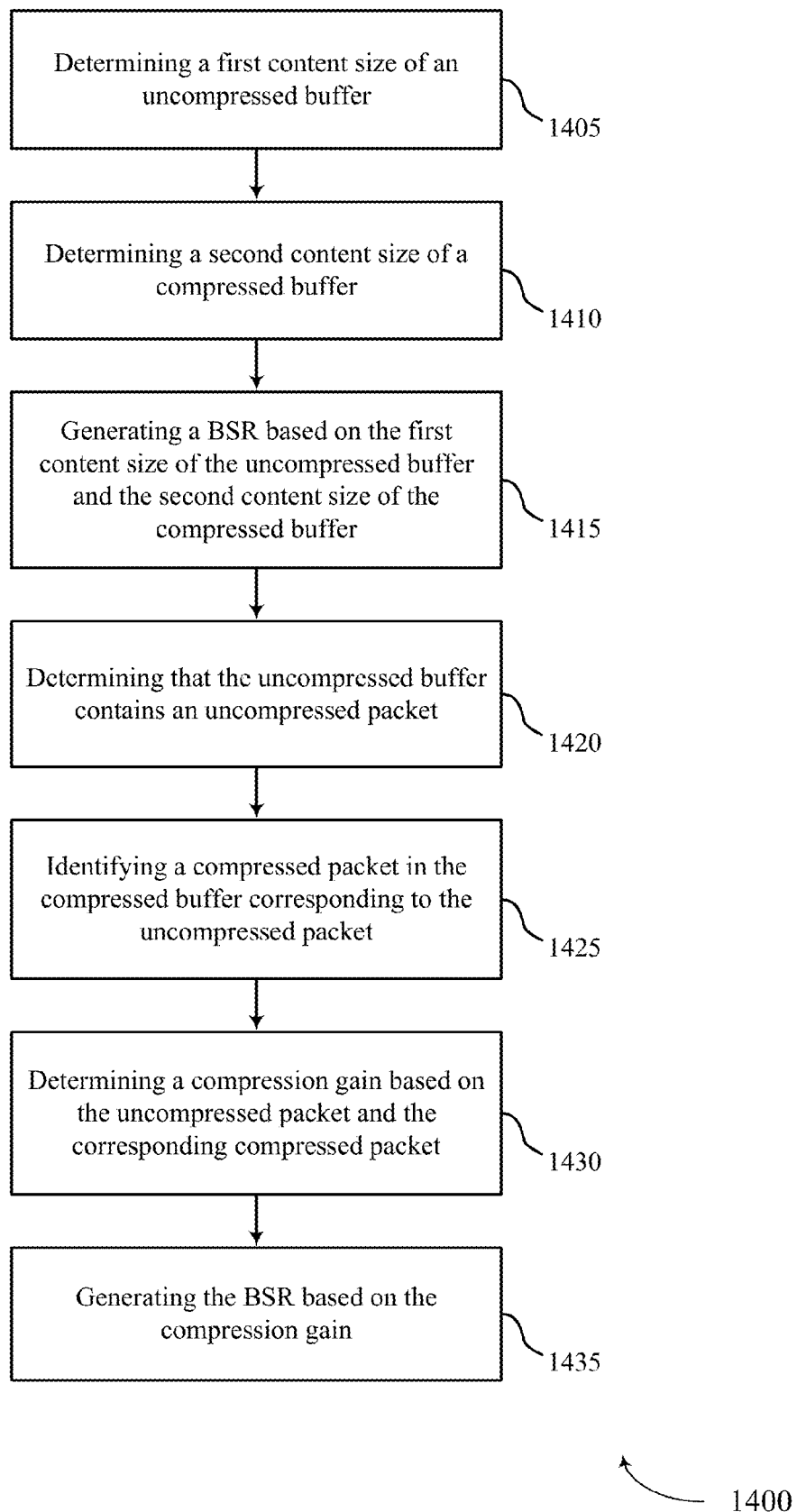
FIG. 14 shows a flowchart illustrating a method for buffer status reports in an evolved data compression scheme in accordance with various aspects of the present disclosure.

FIG. 14 shows a flowchart illustrating a method 1400 for buffer status reports (BSR) in an evolved data compression scheme (eDCS) in accordance with various aspects of the present disclosure. The operations of method 1400 may be implemented by a UE 115 or its components as described with reference to FIGS. 1-12. For example, the operations of method 1400 may be performed by the eDCS BSR component 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, the UE 115 may determine a first content size of an uncompressed buffer as described above with reference to FIGS. 2-4. In some examples, the operations of block 1405 may be performed by the uncompressed buffer component 605 as described above with reference to FIG. 6.

At block 1410, the UE 115 may determine a second content size of a compressed buffer as described above with reference to FIGS. 2-4. In some examples, the operations of block 1410 may be performed by the compressed buffer component 610 as described above with reference to FIG. 6.

At block 1415, the UE 115 may generate a BSR based at least in part on the first content size of the uncompressed buffer and the second content size of the compressed buffer as described above with reference to FIGS. 2-4. In some examples, the operations of block 1415 may be performed by the BSR component 615 as described above with reference to FIG. 6.

At block 1420, the UE 115 may determine that the uncompressed buffer contains an uncompressed packet as described above with reference to FIGS. 2-4. In some examples, the operations of block 1420 may be performed by the uncompressed buffer control component 720 as described above with reference to FIG. 7.

At block 1425, the UE 115 may identify a compressed packet in the compressed buffer corresponding to the uncompressed packet as described above with reference to FIGS. 2-4. In some examples, the operations of block 1425 may be performed by the compressed buffer control component 715 as described above with reference to FIG. 7.

At block 1430, the UE 115 may determine a compression gain based at least in part on the uncompressed packet and the corresponding compressed packet as described above with reference to FIGS. 2-4. In some examples, the operations of block 1430 may be performed by the compression gain component 750 as described above with reference to FIG. 7.

At block 1435, the UE 115 may generate the BSR based at least in part on the compression gain as described above with reference to FIGS. 2-4. In some examples, the operations of block 1435 may be performed by the BSR control component 755 as described above with reference to FIG. 7.

Figure 15:
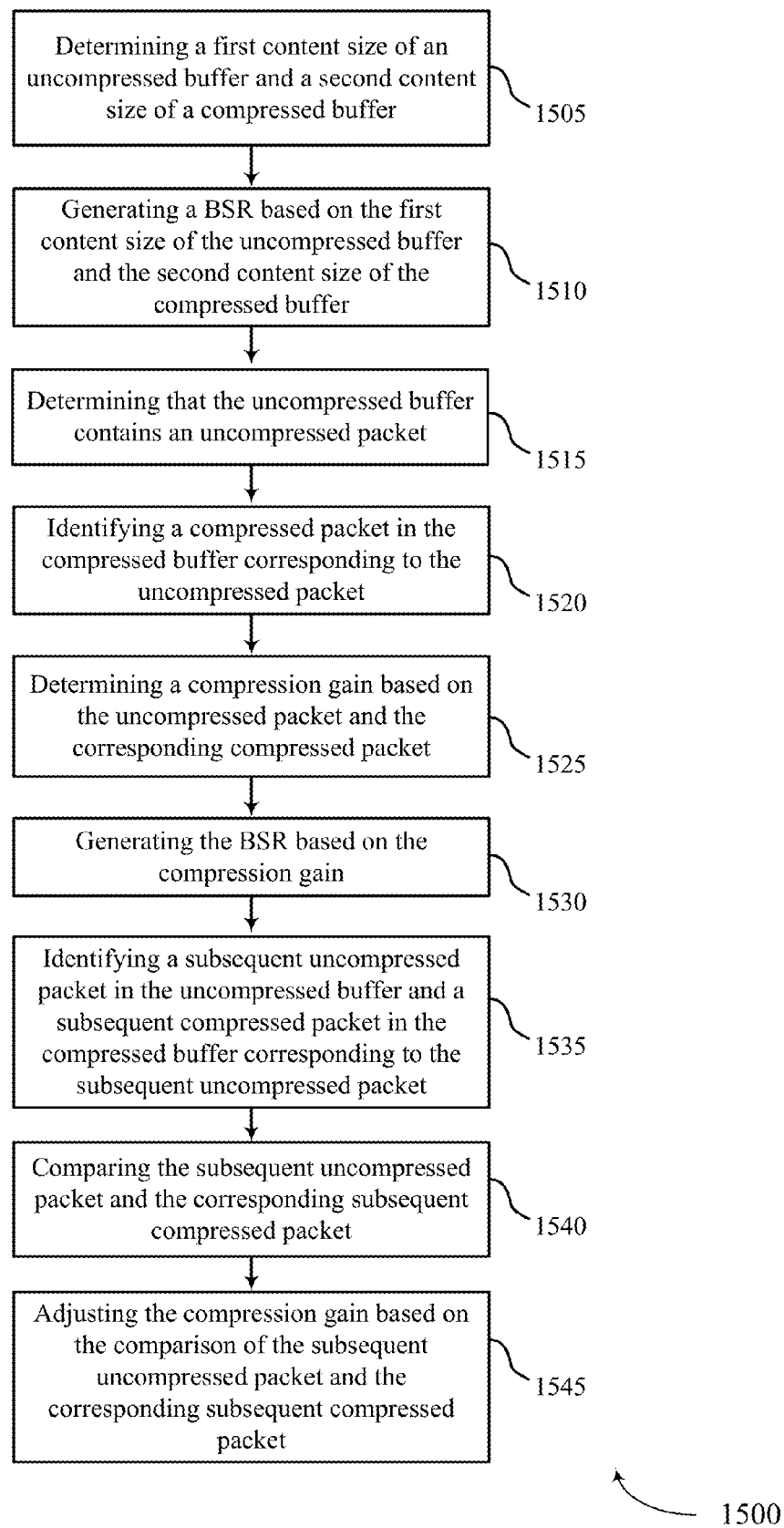
FIG. 15 shows a flowchart illustrating a method for buffer status reports in an evolved data compression scheme in accordance with various aspects of the present disclosure.

FIG. 15 shows a flowchart illustrating a method 1500 for buffer status reports (BSR) in an evolved data compression scheme (eDCS) in accordance with various aspects of the present disclosure. The operations of method 1500 may be implemented by a UE 115 or its components as described with reference to FIGS. 1-12. For example, the operations of method 1500 may be performed by the eDCS BSR component 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300, and 1400 of FIGS. 13-14, among others.

At block 1505, the UE 115 may determine a first content size of an uncompressed buffer and a second content size of a compressed buffer as described above with reference to FIGS. 2-4. In some examples, the operations of block 1505 may be performed by the uncompressed buffer component 605 and the compressed buffer component 610 as described above with reference to FIG. 6.

At block 1510, the UE 115 may generate a BSR based at least in part on the first content size of the uncompressed buffer and the second content size of the compressed buffer as described above with reference to FIGS. 2-4. In some examples, the operations of block 1510 may be performed by the BSR component 615 as described above with reference to FIG. 6.

At block 1515, the UE 115 may determine that the uncompressed buffer contains an uncompressed packet as described above with reference to FIGS. 2-4. In some examples, the operations of block 1515 may be performed by the uncompressed buffer control component 720 as described above with reference to FIG. 7.

At block 1520, the UE 115 may identify a compressed packet in the compressed buffer corresponding to the uncompressed packet as described above with reference to FIGS. 2-4. In some examples, the operations of block 1520 may be performed by the compressed buffer control component 715 as described above with reference to FIG. 7.

At block 1525, the UE 115 may determine a compression gain based at least in part on the uncompressed packet and the corresponding compressed packet as described above with reference to FIGS. 2-4. In some examples, the operations of block 1525 may be performed by the compression gain component 750 as described above with reference to FIG. 7.

At block 1530, the UE 115 may generate the BSR based at least in part on the compression gain as described above with reference to FIGS. 2-4. In some examples, the operations of block 1530 may be performed by the BSR control component 755 as described above with reference to FIG. 7.

At block 1535, the UE 115 may identify a subsequent uncompressed packet in the uncompressed buffer and a subsequent compressed packet in the compressed buffer corresponding to the subsequent uncompressed packet as described above with reference to FIGS. 2-4. In some examples, the operations of block 1535 may be performed by the compressed buffer control component 715 and the uncompressed buffer control component 720 as described above with reference to FIG. 7.

At block 1540, the UE 115 may compare the subsequent uncompressed packet and the corresponding subsequent compressed packet as described above with reference to FIGS. 2-4. In some examples, the operations of block 1540 may be performed by the packet analysis component 705 as described above with reference to FIG. 7.

At block 1545, the UE 115 may adjust the compression gain based at least in part on the comparison of the subsequent uncompressed packet and the corresponding subsequent compressed packet as described above with reference to FIGS. 2-4. In some examples, the operations of block 1545 may be performed by the compression gain component 750 as described above with reference to FIG. 7.

Figure 16:
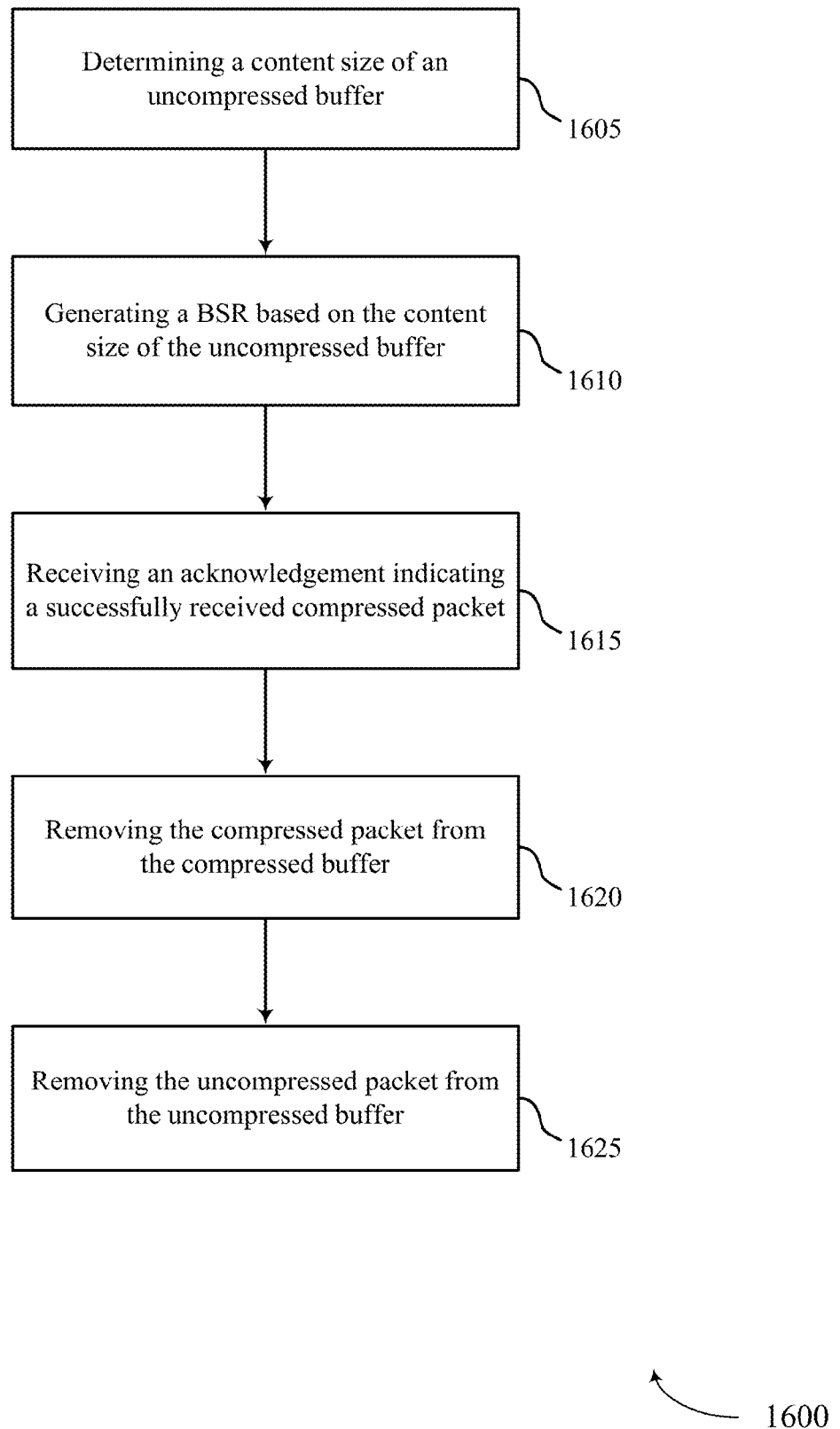
FIG. 16 shows a flowchart illustrating a method for buffer status reports in an evolved data compression scheme in accordance with various aspects of the present disclosure.

FIG. 16 shows a flowchart illustrating a method 1600 for buffer status reports (BSR) in an evolved data compression scheme (eDCS) in accordance with various aspects of the present disclosure. The operations of method 1600 may be implemented by a UE 115 or its components as described with reference to FIGS. 1-12. For example, the operations of method 1600 may be performed by the eDCS BSR component 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1300, 1400, and 1500 of FIGS. 13-15, among others.

At block 1605, the UE 115 may determine a content size of an uncompressed buffer as described above with reference to FIGS. 2-4. In some examples, the operations of block 1605 may be performed by the uncompressed buffer component 605 as described above with reference to FIG. 6.

At block 1610, the UE 115 may generate a BSR based at least in part on the content size of the uncompressed buffer as described above with reference to FIGS. 2-4. In some examples, the operations of block 1610 may be performed by the BSR component 615 as described above with reference to FIG. 6.

At block 1615, the UE 115 may receive an acknowledgement indicating a successfully received compressed packet as described above with reference to FIGS. 2-4. In some examples, the operations of block 1615 may be performed by the ACK component 710 as described above with reference to FIG. 7.

At block 1620, the UE 115 may remove the compressed packet from the compressed buffer as described above with reference to FIGS. 2-4. In some examples, the operations of block 1620 may be performed by the compressed buffer control component 715 as described above with reference to FIG. 7.

At block 1625, the UE 115 may remove the uncompressed packet from the uncompressed buffer as described above with reference to FIGS. 2-4. In some examples, the operations of block 1625 may be performed by the uncompressed buffer control component 720 as described above with reference to FIG. 7.

Figure 17:
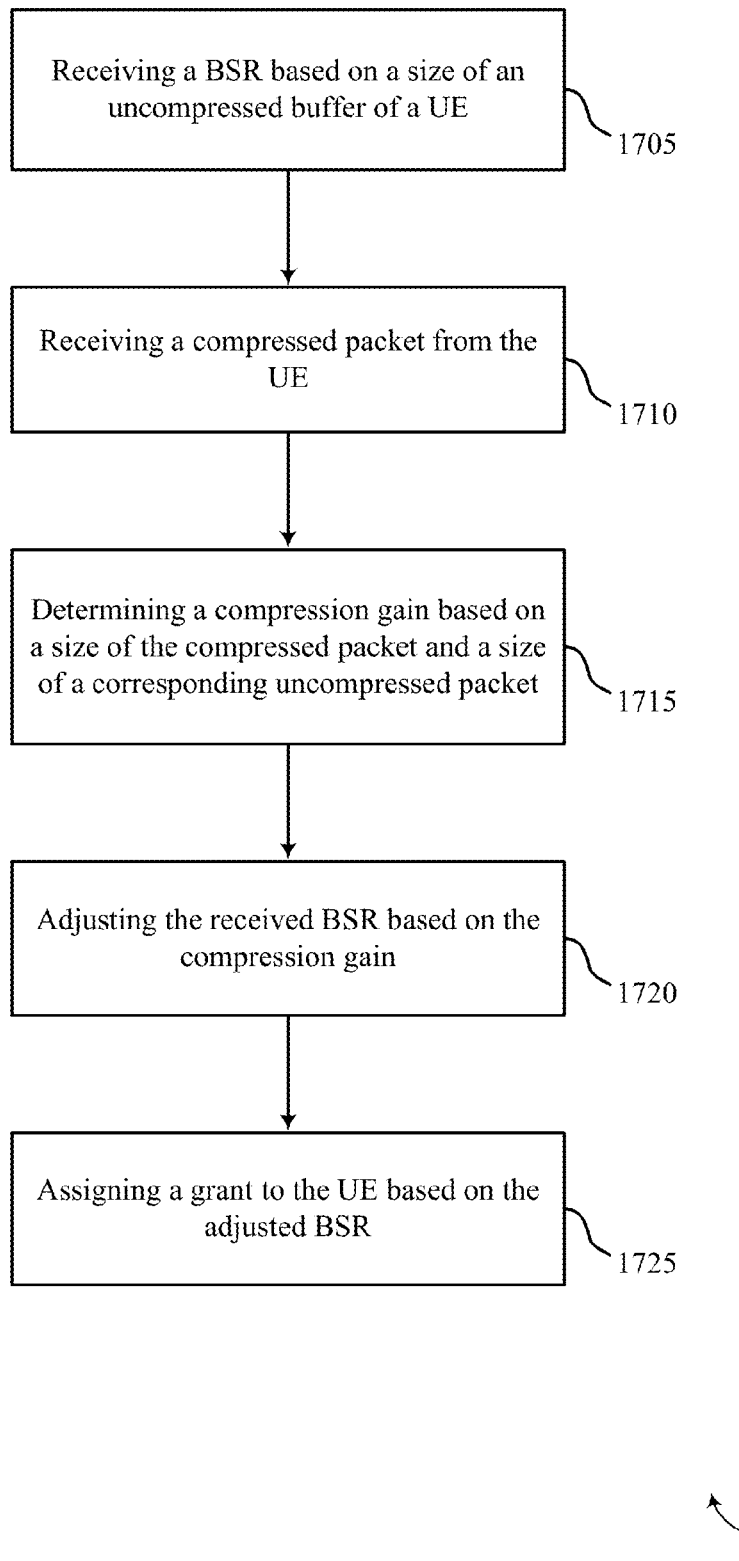
FIG. 17 shows a flowchart illustrating a method for buffer status reports in an evolved data compression scheme in accordance with various aspects of the present disclosure.

FIG. 17 shows a flowchart illustrating a method 1700 for buffer status reports (BSR) in an evolved data compression scheme (eDCS) in accordance with various aspects of the present disclosure. The operations of method 1700 may be implemented by a base station 105 or its components as described with reference to FIGS. 1-12. For example, the operations of method 1700 may be performed by the base station eDCS BSR component 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1700 may also incorporate aspects of methods 1300, 1400, 1500, 1600, and 2000 of FIGS. 13-16 and 20, among others.

At block 1705, the base station 105 may receive a BSR based at least in part on a size of an uncompressed buffer of a UE as described above with reference to FIGS. 2-4. In some examples, the operations of block 1705 may be performed by the BS BSR component 1005 as described above with reference to FIG. 1A, among others.

At block 1710, the base station 105 may receive a compressed packet from the UE as described above with reference to FIGS. 2-4. In some examples, the operations of block 1710 may be performed by the receiver 905 as described above with reference to FIG. 9.

At block 1715, the base station 105 may determine a compression gain based at least in part on a size of the compressed packet and a size of a corresponding uncompressed packet as described above with reference to FIGS. 2-4. In some examples, the operations of block 1715 may be performed by the BS compression gain component 1010 as described above with reference to FIG. 1A, among others.

At block 1720, the base station 105 may adjust the received BSR based at least in part on the compression gain as described above with reference to FIGS. 2-4. In some examples, the operations of block 1720 may be performed by the BS BSR adjustment component 1015 as described above with reference to FIG. 1A, among others.

At block 1725, the base station 105 may assign a grant to the UE based at least in part on the adjusted BSR as described above with reference to FIGS. 2-4. In some examples, the operations of block 1725 may be performed by the grant assignment component 1020 as described above with reference to FIG. 1A, among others.

Figure 18:
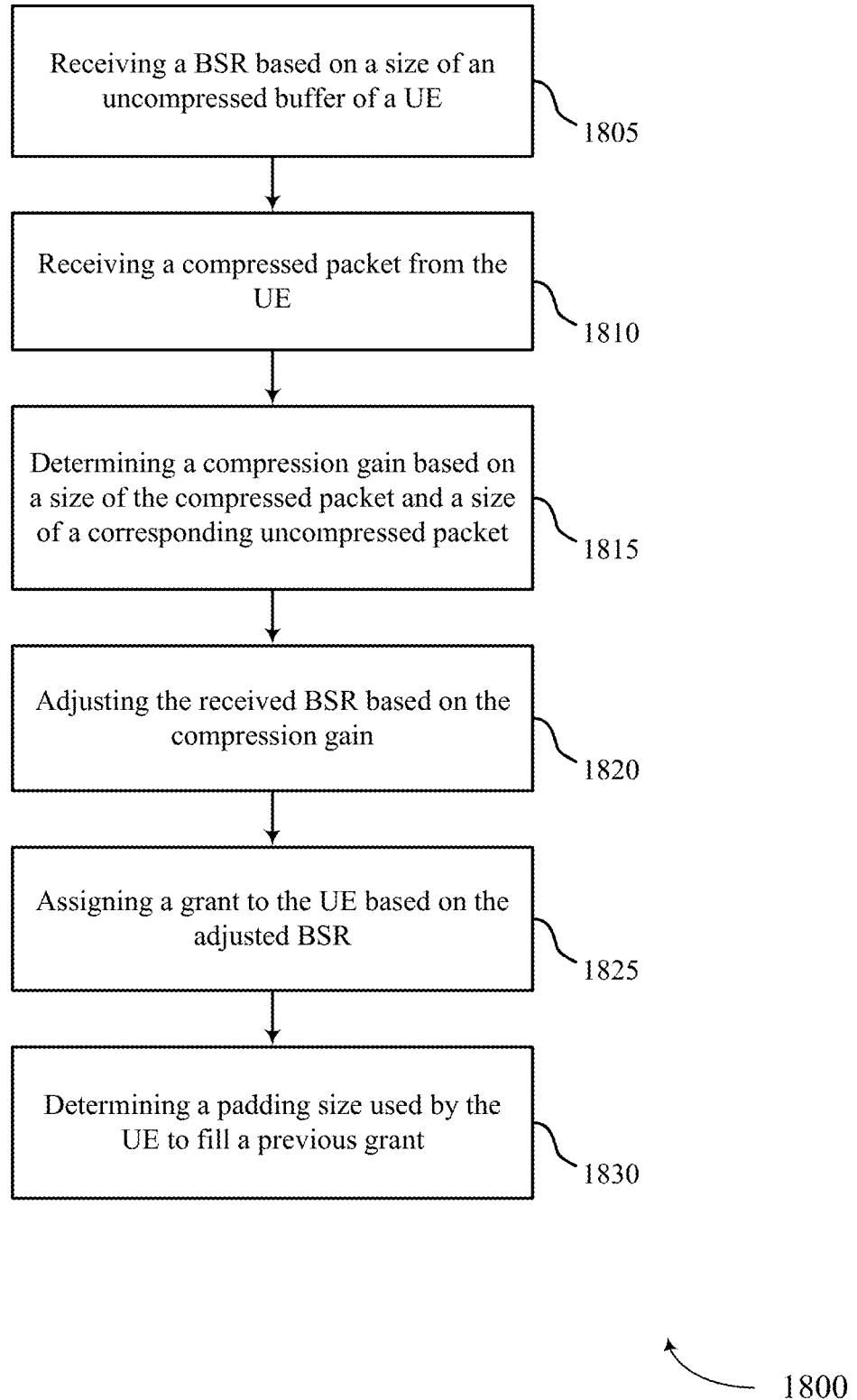
FIG. 18 shows a flowchart illustrating a method for buffer status reports in an evolved data compression scheme in accordance with various aspects of the present disclosure.

FIG. 18 shows a flowchart illustrating a method 1800 for buffer status reports (BSR) in an evolved data compression scheme (eDCS) in accordance with various aspects of the present disclosure. The operations of method 1800 may be implemented by a base station 105 or its components as described with reference to FIGS. 1-12. For example, the operations of method 1800 may be performed by the base station eDCS BSR component 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1800 may also incorporate aspects of methods 1300, 1400, 1500, 1600, 1700, and 2000 of FIGS. 13-17 and 20, among others.

At block 1805, the base station 105 may receive a BSR based at least in part on a size of an uncompressed buffer of a UE as described above with reference to FIGS. 2-4. In some examples, the operations of block 1805 may be performed by the BS BSR component 1005 as described above with reference to FIG. 1A, among others.

At block 1810, the base station 105 may receive a compressed packet from the UE as described above with reference to FIGS. 2-4. In some examples, the operations of block 1810 may be performed by the receiver 905 as described above with reference to FIG. 9.

At block 1815, the base station 105 may determine a compression gain based at least in part on a size of the compressed packet and a size of a corresponding uncompressed packet as described above with reference to FIGS. 2-4. In some examples, the operations of block 1815 may be performed by the BS compression gain component 1010 as described above with reference to FIG. 1A, among others.

At block 1820, the base station 105 may adjust the received BSR based at least in part on the compression gain as described above with reference to FIGS. 2-4. In some examples, the operations of block 1820 may be performed by the BS BSR adjustment component 1015 as described above with reference to FIG. 1A, among others.

At block 1825, the base station 105 may assign a grant to the UE based at least in part on the adjusted BSR as described above with reference to FIGS. 2-4. In some examples, the operations of block 1825 may be performed by the grant assignment component 1020 as described above with reference to FIG. 1A, among others.

At block 1830, the base station 105 may determine a padding size used by the UE to fill a previous grant as described above with reference to FIGS. 2-4. In some examples, the operations of block 1830 may be performed by the padding size component 1105 as described above with reference to FIG. 1A, among others.

Thus, methods 1300, 1400, 1500, 1600, 1700, 1800, and 2000, among others, may provide for buffer status reports in an evolved data compression scheme. It should be noted that methods 1300, 1400, 1500, 1600, 1700, 1800 and 2000, among others, describe possible implementations, and that the operations and the steps may be rearranged or otherwise modified such that other implementations are possible. In some examples, aspects from two or more of the methods 1300, 1400, 1500, 1600, 1700, 1800, and 2000, among others, may be combined.

Figure 19:
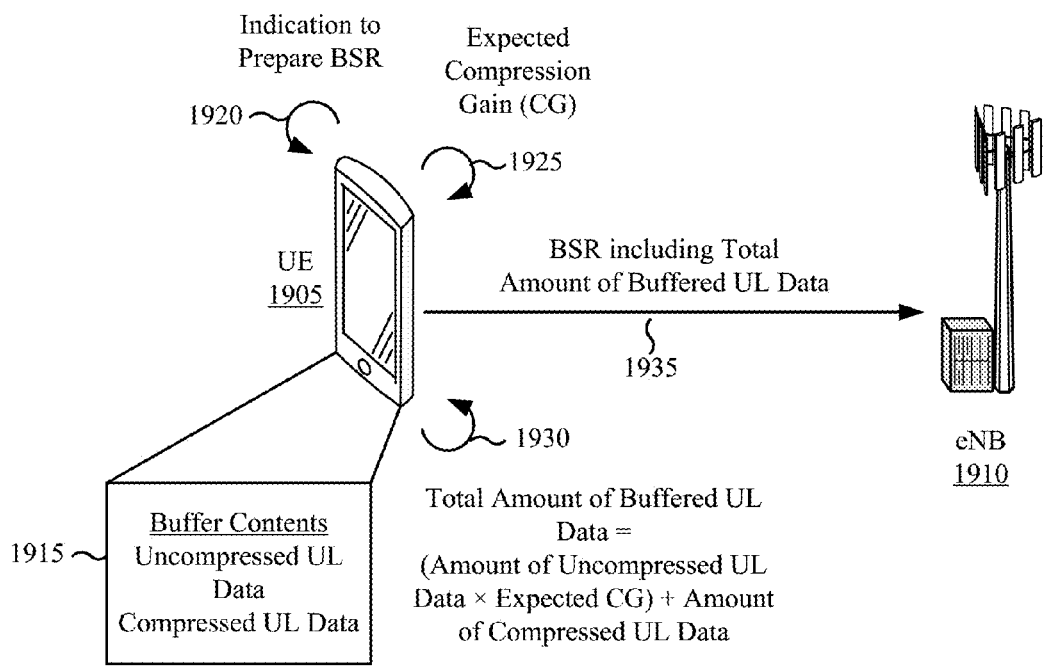
FIG. 19 is a diagram illustrating an example of preparing a buffer status report based at least in part on an amount of uncompressed uplink data and an amount of compressed uplink data, in accordance with various aspects of the present disclosure.

FIG. 19 is a diagram illustrating an example 1900 of preparing a buffer status report based at least in part on an amount of uncompressed uplink data and an amount of compressed uplink data, in accordance with various aspects of the present disclosure.

Performing uplink data compression (UDC) on the uplink data may affect a performance of one or more MAC layer functions performed by the UE (e.g., as compared to performance of the one or more MAC layer functions without performing UDC). For example, performing UDC on the uplink data may affect an execution of a token algorithm (e.g., associated with carrying out logical channel prioritization), preparation of a buffer status report (BSR), and/or transmission of data for uplink transmission based at least in part on an uplink transmission grant.

A BSR may include a report, provided by the UE, that identifies an amount of uplink data queued for uplink transmission by the UE. However, the UE may receive an indication to provide the BSR before the UE has performed UDC on a portion of the uplink data (e.g., such that the UE stores compressed uplink data and uncompressed uplink data). As such, when preparing the BSR, the UE may be unable to accurately determine the amount of uplink data queued for transmission (e.g., since the uncompressed uplink data has yet to be compressed). Therefore, the UE may need to determine a total amount of uplink data, to be included in the BSR, that identifies the amount of uplink data to be transmitted after UDC is performed on the uncompressed uplink data, even though UDC has yet to be performed.

For the purposes of FIG. 19, UE 1905 is configured to perform UDC on uplink data to be transmitted via a radio bearer in the uplink direction to eNB 1910. UE 1905 may correspond to a UE described in connection with one or more other figures of the present disclosure. Similarly, eNB 1910 may correspond to an eNB described in connection with one or more other figures of the present disclosure.

As shown in FIG. 19, UE 1905 may include one or more uplink buffers associated with transmitting uplink data to eNB 1910. As shown, the one or more uplink buffers may include uncompressed uplink data and compressed uplink data. As shown in FIG. 19, UE 1905 may receive an indication to prepare a BSR that includes information that identifies an amount of uplink data pending in the one or more uplink buffers of UE 1905.

As shown in FIG. 19, UE 1905 may determine an expected compression gain associated with determining a predicted amount of uplink data upon which the BSR is to be prepared. The predicted amount of uplink data may include a predicted amount of uplink data that will result from performing UDC on the uncompressed uplink data in the one or more uplink buffers. The expected compression gain may include a factor by which an amount of the uncompressed uplink data may be expected to reduce when performing UDC on the uncompressed uplink data.

As shown in FIG. 19, UE 1905 may determine a total amount of uplink data to be identified in the BSR. The total amount of uplink data may be based at least in part on an amount of the compressed uplink data and the amount of the uncompressed uplink data. As shown, UE 1905 may determine the total amount of uplink data based at least in part on multiplying the amount of the uncompressed uplink data by the expected compression gain to determine the predicted amount of uplink data and/or the predicted amount of buffer, and adding the predicted amount of uplink data and/or the predicted amount of buffer to the amount of the compressed uplink data.

As shown in FIG. 19, the UE may prepare the BSR including information that identifies the total amount of uplink data and/or the total amount of buffer, and may transmit the BSR to eNB 1910. In this way, UE 1905 may generate a BSR that identifies a total amount of uplink data and/or the total amount of buffer determined based at least in part on an amount of compressed uplink data and an amount of uncompressed uplink data. As such, future performance of UDC on the uplink data may be reflected in the BSR provided by UE 1905. This causes the UE to provide a more accurate BSR as compared to a BSR that identifies the amount of compressed uplink data only, the amount of the compressed uplink data and the amount of the uncompressed uplink data, or the like.

As indicated above, FIG. 19 is provided as an example. Other examples are possible and may differ from what was described in connection with FIG. 19.

Figure 20:
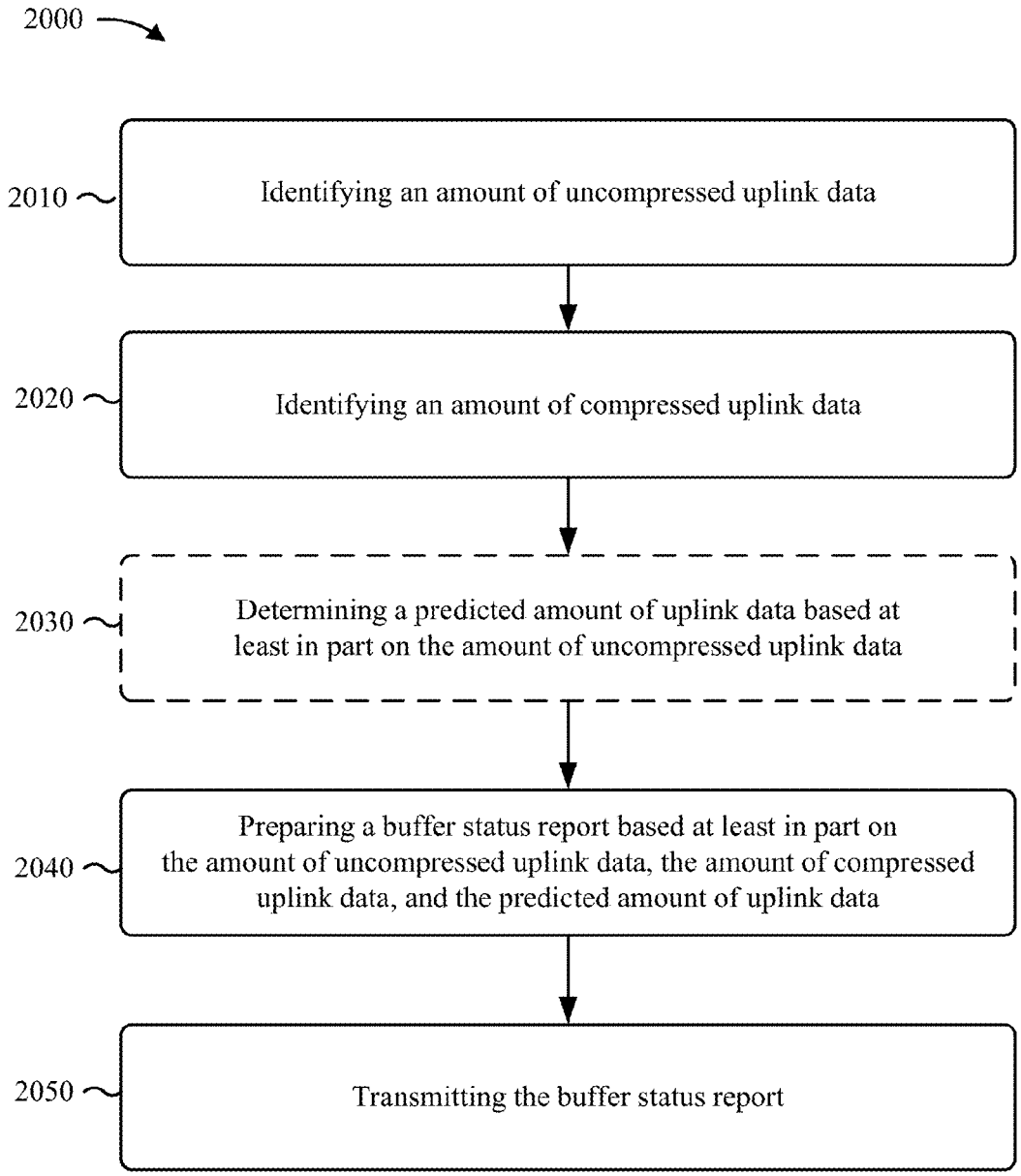
FIG. 20 is a flow diagram of an example method relating to an example shown in FIG. 19, in accordance with various aspects of the present disclosure.

FIG. 20 is a flow diagram of an example method 2000 relating to example 1900 shown in FIG. 19, in accordance with various aspects of the present disclosure. In some aspects, one or more process blocks of FIG. 20 may be performed by one or more UEs described herein. The UE described in associated with example method 2000 may correspond to a UE described in connection with one or more other figures of the present disclosure. In some aspects, one or more process blocks of FIG. 20 may be performed by another device or a plurality of devices separate from or including a UE.

As shown in FIG. 20, method 2000 may include identifying an amount of uncompressed uplink data (block 2010). For example, a UE may identify an amount of uncompressed uplink data to be transmitted by the UE. In some aspects, the uncompressed uplink data may include data, to be transmitted by the UE via a radio bearer in the uplink direction, upon which UDC has yet to be performed. For example, the uncompressed uplink data may include packets comprising data to be transmitted via the radio bearer in the uplink direction.

In some aspects, the UE may identify the amount of uncompressed uplink data when the UE receives an indication to prepare a BSR. The BSR may include a report, provided by the UE to a network device (e.g., an eNB), that includes information that identifies an amount of uplink data pending in an uplink buffer of the UE. For example, the UE may receive the indication to prepare the BSR when uplink data for a logical channel (e.g., corresponding to a radio bearer in the uplink direction) becomes available for transmission in a PDCP layer, upon expiration of a BSR timer, or the like.

In some aspects, upon receiving the indication to prepare the BSR, the UE may identify the amount of uncompressed uplink data. For example, the UE may identify the amount of uncompressed uplink data by inspecting uncompressed uplink data packets, included in an uplink buffer associated with the logical channel, to determine an amount (e.g., a number of bytes) of the uncompressed uplink data.

As further shown in FIG. 20, method 2000 may include identifying an amount of compressed uplink data (block 2020). For example, the UE may identify an amount of compressed uplink data. In some aspects, the compressed uplink data may include data, to be transmitted by the UE via the radio bearer in the uplink direction, upon which UDC has been performed. For example, the compressed uplink data may include compressed packets comprising data to be transmitted via the radio bearer in the uplink direction.

In some aspects, the UE may identify the amount of compressed uplink data when the UE receives the indication to prepare the BSR, as described above. In some aspects, upon receiving the indication to prepare the BSR, the UE may identify the amount of compressed uplink data. For example, the UE may identify the amount of compressed uplink data by inspecting compressed uplink data packets, included in the uplink buffer, to determine an amount (e.g., a number of bytes) of the compressed uplink data.

As further shown in FIG. 20, method 2000 may include determining a predicted amount of uplink data based at least in part on the amount of uncompressed uplink data (block 2030). For example, the UE may determine a predicted amount of uplink data based at least in part on the amount of uncompressed uplink data. In some aspects, the UE may determine the predicted amount of uplink data after the UE identifies the amount of uncompressed uplink data.

The predicted amount of uplink data may include a predicted amount of uplink data that will result from performing UDC on the uncompressed uplink data. In some aspects, the UE may determine the predicted amount of uplink data based at least in part on an expected compression gain associated with the performing UDC.

The expected compression gain may include a factor by which the amount of uncompressed uplink data may be expected to reduce when performing UDC on the uncompressed uplink data, such as a percentage (e.g., 30%, 50%, etc.), a fraction (e.g., one-quarter, one eighth, etc.), or the like. In some aspects, the expected compression gain may correspond to one or more radio bearers associated with the UE. For example, the expected compression gain may correspond to a single radio bearer (or a corresponding logical channel) associated with transmitting the uplink data (e.g., each radio bearer may be associated with a different expected compression gain). As another example, the expected compression gain may correspond to a plurality of bearers, associated with the UE, for which UDC is enabled. As an additional example, the expected compression gain may correspond to all radio bearers associated with the UE. Additionally, or alternatively, the expected compression gain may correspond to a distinct flow associated with transmitting the uplink data.

In some aspects, the UE may determine the expected compression gain based at least in part on information stored by the UE. For example, the UE may store information that identifies the expected compression gain to be used for one or more radio bearers and/or one or more logical channels associated with the UE. In some aspects, the UE may update the expected compression gain based at least in part on a moving average of the expected compression gain. For example, the UE may store or have access to information that identifies a previous expected compression gain (e.g., an expected compression gain determined at an earlier time). Here, the UE may perform UDC on the uncompressed uplink data, and may determine the compression gain associated with performing UDC. In this example, the UE may update the expected compression gain based at least in part on a moving average formula that includes the previous expected compression gain and the compression gain associated with performing UDC.

In some aspects, the UE may determine the predicted amount of uplink data based at least in part on the amount of the uncompressed uplink data and the expected compression gain. For example, the UE may multiply the amount of uncompressed uplink data by the expected compression gain to determine the predicted amount of uplink data.

As further shown in FIG. 20, method 2000 may include preparing a buffer status report based at least in part on the amount of uncompressed uplink data, the amount of compressed uplink data, and the predicted amount of uplink data (block 2040). For example, the UE may prepare the BSR based at least in part on the amount of uncompressed uplink data and the amount of compressed uplink data. In some aspects, the UE may prepare the BSR based at least in part on the predicted amount of uplink data and the amount of compressed uplink data.

In some aspects, the UE may prepare the BSR after the UE identifies the amount of uncompressed uplink data, the amount of compressed uplink data, and/or the predicted amount of uplink data. Additionally, or alternatively, the UE may prepare the BSR based at least in part on receiving the indication to prepare the BSR, as described above.

In some aspects, the UE may prepare the BSR based at least in part on the predicted amount of uplink data (e.g., such that the BSR includes information that identifies the predicted amount of uplink data). Additionally, or alternatively, the UE may determine a total amount of uplink data based at least in part on the predicted amount of uplink data and the amount of the compressed uplink data. The total amount of uplink data may identify an amount of uplink data that is to be included in the BSR. For example, the UE may determine the total amount of uplink data by adding the predicted amount of uplink data and the amount of compressed uplink data. Here, the UE may prepare the BSR based at least in part on the total amount of uplink data (e.g., such that the BSR identifies the determined total amount of uplink data and/or the total amount of buffer).

In this way, the UE may prepare a BSR based at least in part on the amount of compressed uplink data, as well as the amount of uncompressed uplink data. As such, the BSR prepared by the UE may more accurately identify the amount of data to be transmitted by the UE (e.g., as compared to a BSR that identifies the amount of the compressed uplink data only, a BSR that identifies the amount of compressed uplink data and the amount of uncompressed uplink data, etc.).

As further shown in FIG. 20, method 2000 may include transmitting the BSR (block 2040). For example, the UE may transmit the BSR prepared by the UE. In some aspects, the UE may transmit the BSR after the UE prepares the BSR. In some aspects, the UE may transmit the BSR to an eNB (e.g., an eNB described in connection with one or more other figures of the present disclosure).

Although FIG. 20 shows example blocks of method 2000, in some aspects, method 2000 may include additional blocks, fewer blocks, different blocks, or differently arranged blocks than those depicted in FIG. 10. Additionally, or alternatively, two or more of the blocks of method 2000 may be performed in parallel.

Figure 21:
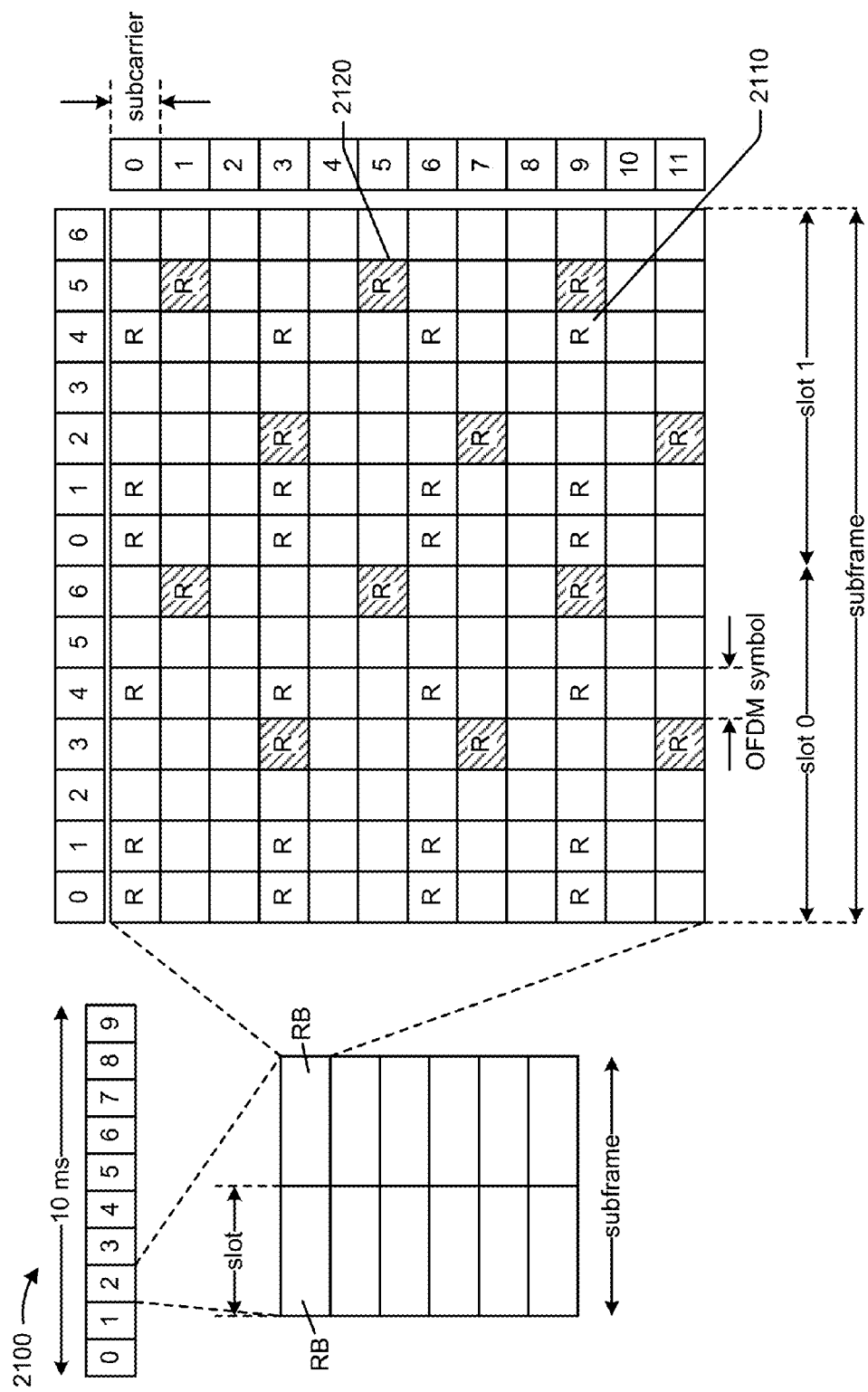
FIG. 21 is a diagram illustrating an example of a downlink (DL) frame structure in LTE, in accordance with various aspects of the present disclosure.

FIG. 21 is a diagram illustrating an example 2100 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 2110 and R 2120, include DL reference signals (DL-RS). The DL-RS include Cell-specific RS (CRS) (also sometimes called common RS) 2110 and UE-specific RS (UE-RS) 2120. UE-RS 2120 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry some system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in some portions of the system bandwidth. The eNB may send the PDSCH to specific UEs in some portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only some combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 21 is provided as an example. Other examples are possible and may differ from what was described above in connection with FIG. 21.

Figure 22:
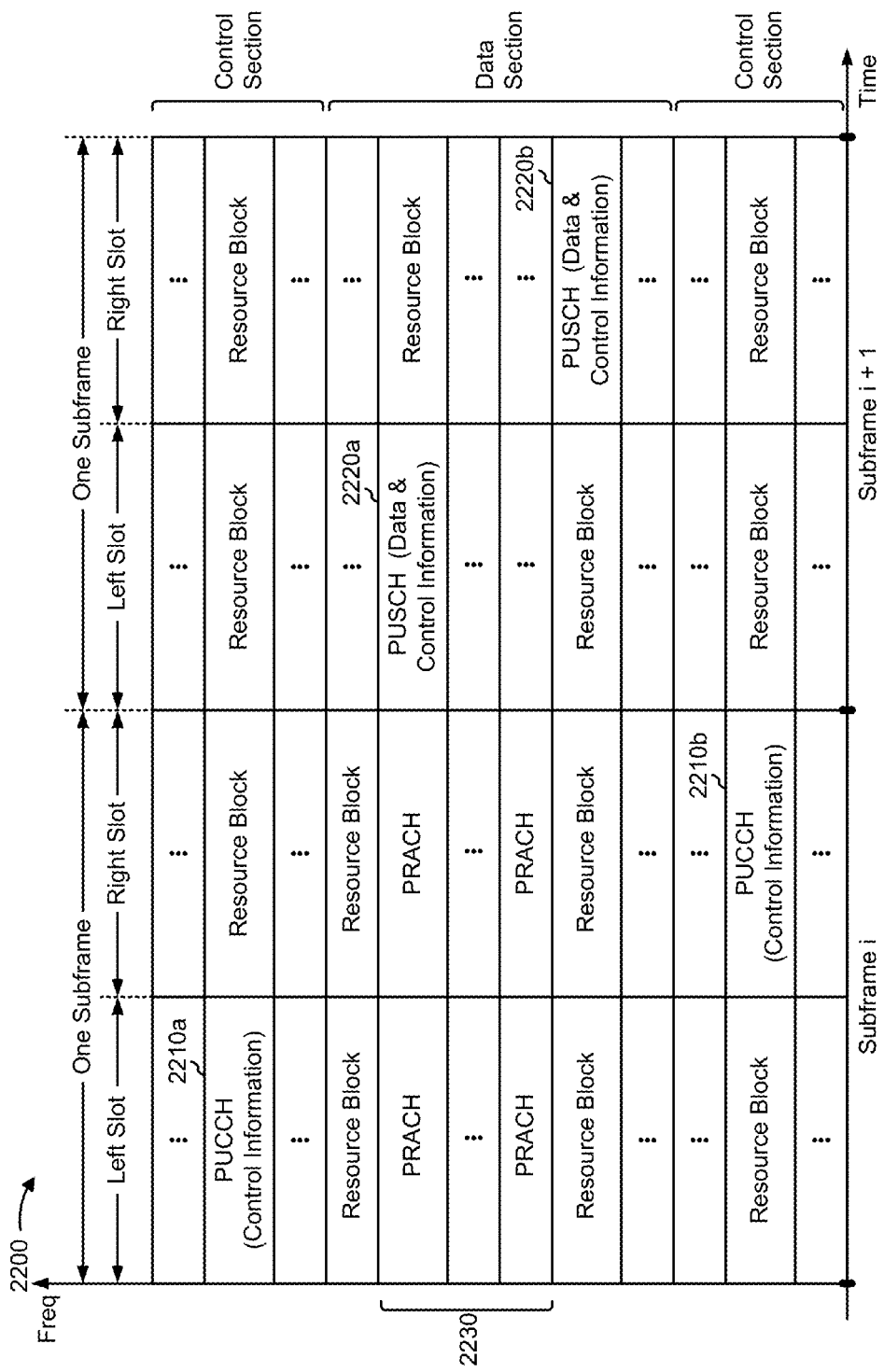
FIG. 22 is a diagram illustrating an example of an uplink (UL) frame structure in LTE, in accordance with various aspects of the present disclosure.

FIG. 22 is a diagram illustrating an example 2200 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 2210a, 2210b in the control section to transmit control information to an eNB. The UE may also be assigned resource blocks 2220a, 2220b in the data section to transmit data to the eNB. The UE may transmit control information in a physical UL control channel (PUCCH) on the assigned resource blocks in the control section. In some aspects, the UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 2230. The PRACH 2230 carries a random sequence and cannot carry any UL data/signaling. Each random access preamble occupies a bandwidth corresponding to six consecutive resource blocks. The starting frequency is specified by the network. That is, the transmission of the random access preamble is restricted to some time and frequency resources. There is no frequency hopping for the PRACH. The PRACH attempt is carried in a single subframe (e.g., of 1 ms) or in a sequence of few contiguous subframes.

As indicated above, FIG. 22 is provided as an example. Other examples are possible and may differ from what was described above in connection with FIG. 22.

Figure 23:
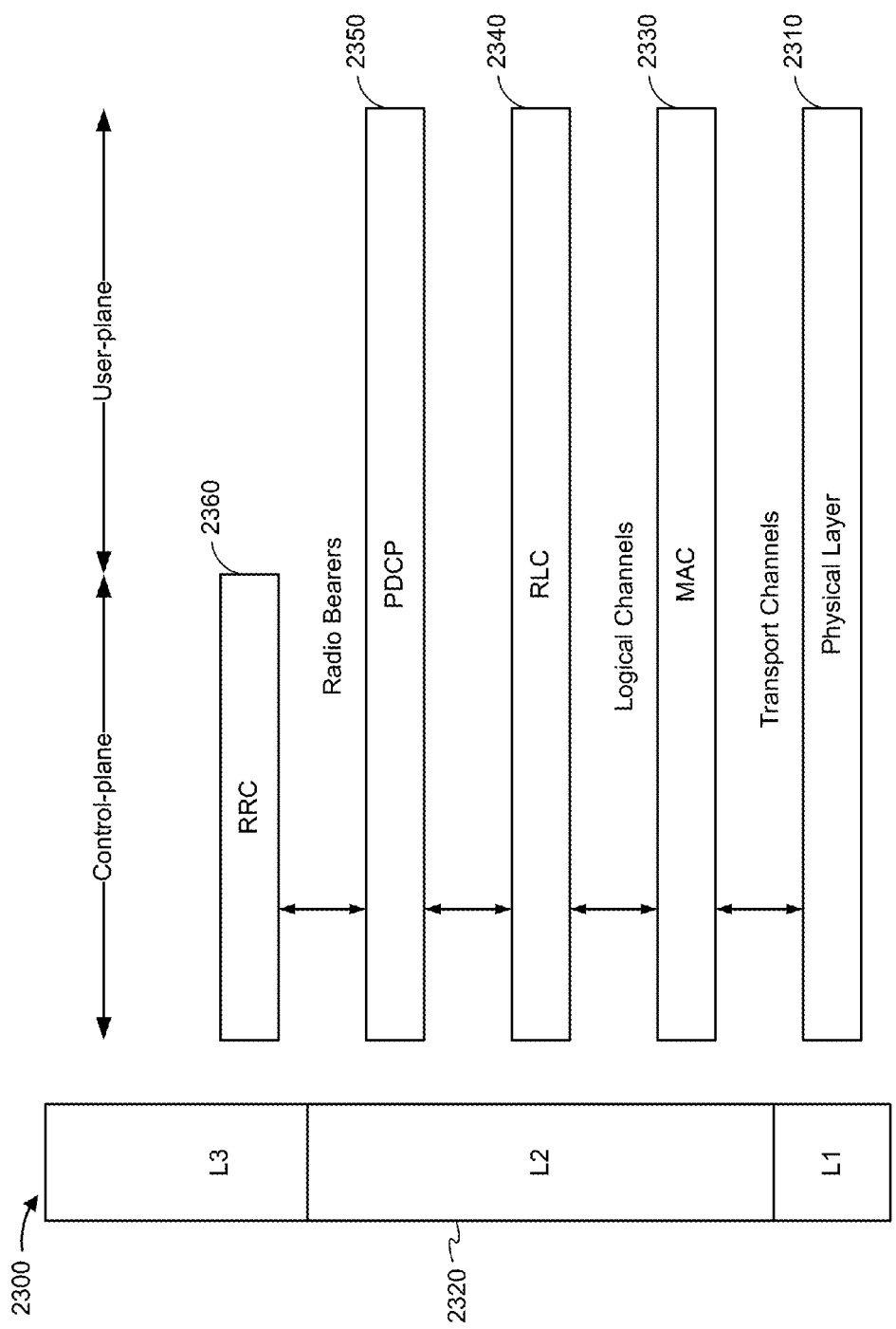
FIG. 23 is a diagram illustrating an example of a radio protocol architecture for a user plane and a control plane in LTE, in accordance with various aspects of the present disclosure.

FIG. 23 is a diagram illustrating an example 2300 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 2310. Layer 2 (L2 layer) 2320 is above the physical layer 2310 and is responsible for the link between the UE and eNB over the physical layer 2310.

In the user plane, the L2 layer 2320 includes a media access control (MAC) sublayer 2330, a radio link control (RLC) sublayer 2340, and a packet data convergence protocol (PDCP) 2350 sublayer, which are terminated at the eNB on the network side. Although not shown, the UE may have several upper layers above the L2 layer 2320 including a network layer (e.g., IP layer) that is terminated at a packet data network (PDN) gateway on the network side, and an application layer that is terminated at the other end of the connection (e.g., far end UE, server, etc.).

The PDCP sublayer 2350 provides multiplexing between different radio bearers and logical channels. The PDCP sublayer 2350 also provides header compression for upper layer data packets to reduce radio transmission overhead, security by ciphering the data packets, and handover support for UEs between eNBs. The RLC sublayer 2340 provides segmentation and reassembly of upper layer data packets, retransmission of lost data packets, and reordering of data packets to compensate for out-of-order reception due to hybrid automatic repeat request (HARQ). The MAC sublayer 2330 provides multiplexing between logical and transport channels. The MAC sublayer 2330 is also responsible for allocating the various radio resources (e.g., resource blocks) in one cell among the UEs. The MAC sublayer 2330 is also responsible for HARQ operations.

In the control plane, the radio protocol architecture for the UE and eNB is substantially the same for the physical layer 2310 and the L2 layer 2320 with the exception that there is no header compression function for the control plane. In some aspects, integrity protection may be provided for the control plane data. The control plane also includes a radio resource control (RRC) sublayer 2360 in Layer 3 (L3 layer). The RRC sublayer 2360 is responsible for obtaining radio resources (i.e., radio bearers) and for configuring the lower layers using RRC signaling between the eNB and the UE.

As indicated above, FIG. 23 is provided as an example. Other examples are possible and may differ from what was described above in connection with FIG. 23.

Figure 24:
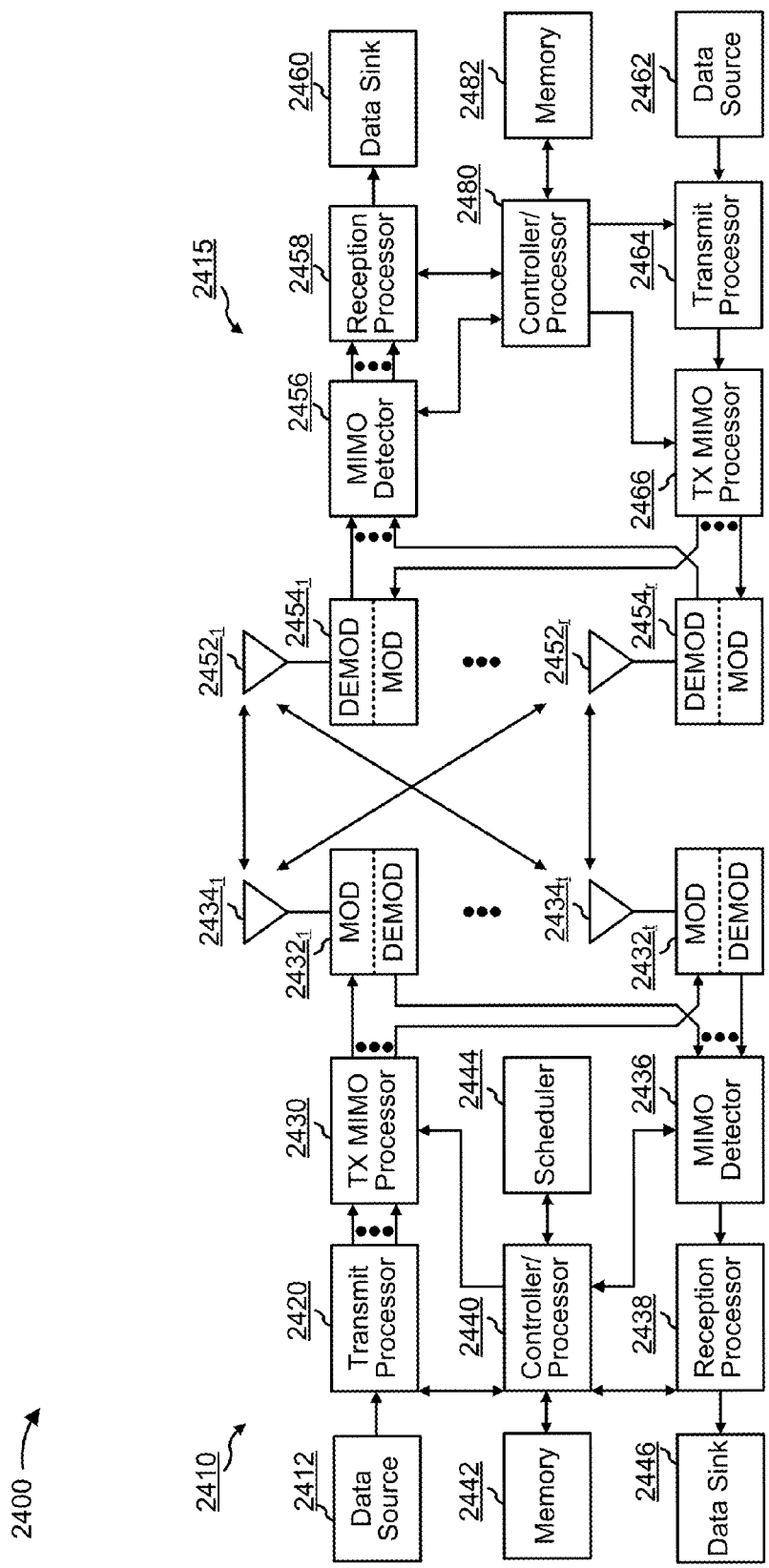
FIG. 24 is a diagram illustrating example components of a communication system including a base station and a UE, in accordance with various aspects of the present disclosure.

FIG. 24 is a diagram illustrating example components of a communication system 2400 including a base station 2410 and a UE 2415, in accordance with various aspects of the present disclosure. In some aspects, base station 2410 may correspond to at least one base station 105, 105-A, at least one eNB 150, or at least one low power eNB 170 described with reference to FIG. 1A or 2, among others. In some aspects, UE 2415 may correspond to one or more of the UEs 115, 115-A, or 250 described above with reference to FIG. 1A or FIG. 2, among others. Base station 2410 may be equipped with antennas $2434_1$ through $2434_t$, and UE 2415 may be equipped with antennas $2452_1$ through $2452_r$, wherein t and r are integers greater than or equal to one.

At base station 2410, a base station transmit processor 2420 may receive data from a base station data source 2412 and control information from a base station controller/processor 2440. The control information may be carried on the Physical Broadcast Channel (PBCH), the Physical Control Format Indicator Channel (PCFICH), the Physical Hybrid-ARQ Indicator Channel (PHICH), the Physical Downlink Control Channel (PDCCH), or the like. The data may be carried on the Physical Downlink Shared Channel (PDSCH), for example. Base station transmit processor 2420 may process (e.g., encode and symbol map) the data and control information to obtain data symbols and control symbols, respectively. Base station transmit processor 2420 may also generate reference symbols, e.g., for the PSS, SSS, and cell-specific reference signal (RS). A base station transmit (TX) multiple-input multiple-output (MIMO) processor 2430 may perform spatial processing (e.g., precoding) on the data symbols, the control symbols, and/or the reference symbols, if applicable, and may provide output symbol streams to base station modulators/demodulators (MODs/DEMODs) $2432_1$ through $2432_t$. Each base station modulator/demodulator 2432 may process a respective output symbol stream (e.g., for OFDM, or the like) to obtain an output sample stream. Each base station modulator/demodulator 2432 may further process (e.g., convert to analog, amplify, filter, and upconvert) the output sample stream to obtain a downlink signal. Downlink signals from modulators/demodulators $2432_1$ through $2432_t$, may be transmitted via antennas $2434_1$ through $2434_t$, respectively.

At UE 2415, as an example, antennas $2452_1$ through $2452_r$, may receive the downlink signals from base station 2410 and may provide received signals to UE modulators/demodulators (MODs/DEMODs) $2454_1$ through $2454_r$, respectively. Each UE modulator/demodulator 2454 may condition (e.g., filter, amplify, downconvert, and digitize) a respective received signal to obtain input samples. Each UE modulator/demodulator 2454 may further process the input samples (e.g., for OFDM, etc.) to obtain received symbols. A UE MIMO detector 2456 may obtain received symbols from all UE modulators/demodulators $2454_1$ through $2454_r$, and perform MIMO detection on the received symbols, if applicable, and provide detected symbols. A UE reception processor 2458 may process (e.g., demodulate, deinterleave, and decode) the detected symbols, provide decoded data for UE 2415 to a UE data sink 2460, and provide decoded control information to a UE controller/processor 2480.

On the uplink, at UE 2415, a UE transmit processor 2464 may receive and process data (e.g., for the Physical Uplink Shared Channel (PUSCH)) from a UE data source 2462 and control information (e.g., for the Physical Uplink Control Channel (PUCCH)) from UE controller/processor 2480. UE transmit processor 2464 may also generate reference symbols for a reference signal. The symbols from UE transmit processor 2464 may be precoded by a UE TX MIMO processor 2466, if applicable, may be further processed by UE modulators/demodulators $2454_1$ through $2454_r$ (e.g., for SC-FDM, etc.), and may be transmitted to base station 2410. At base station 2410, the uplink signals from UE 2415 may be received by base station antennas 2434, processed by at least one base station modulator/demodulator 2432, detected by a base station MIMO detector 2436, if applicable, and further processed by a base station reception processor 2438 to obtain decoded data and control information sent by UE 2415. Base station reception processor 2438 may provide the decoded data to a base station data sink 2446 and the decoded control information to base station controller/processor 2440.

Base station controller/processor 2440 and UE controller/processor 680 may direct the operation at base station 2410 and UE 2415, respectively. Base station controller/processor 2440 and/or other processors and components at base station 2410 may perform or direct, for example, execution of various processes for the techniques described herein. UE controller/processor 2480 and/or other processors and components at UE 2415 may also perform or direct, for example, execution of one or more blocks illustrated in FIG. 26 or FIG. 28, and/or other processes for the techniques described herein. A base station memory 2442 and a UE memory 2482 may store data and program codes for base station 2410 and UE 2415, respectively. A scheduler 2444 may schedule at least one UE 2415 for data transmission on the downlink and/or uplink.

The number and arrangement of components shown in FIG. 24 are provided as an example. In practice, there may be additional components, fewer components, different components, or differently arranged components than those shown in FIG. 24. Furthermore, two or more components shown in FIG. 24 may be implemented within a single component, or a single components shown in FIG. 24 may be implemented as multiple, distributed components. Additionally, or alternatively, a set of components (e.g., one or more components) shown in FIG. 24 may perform one or more functions described as being performed by another set of components shown in FIG. 24.

Figure 25:
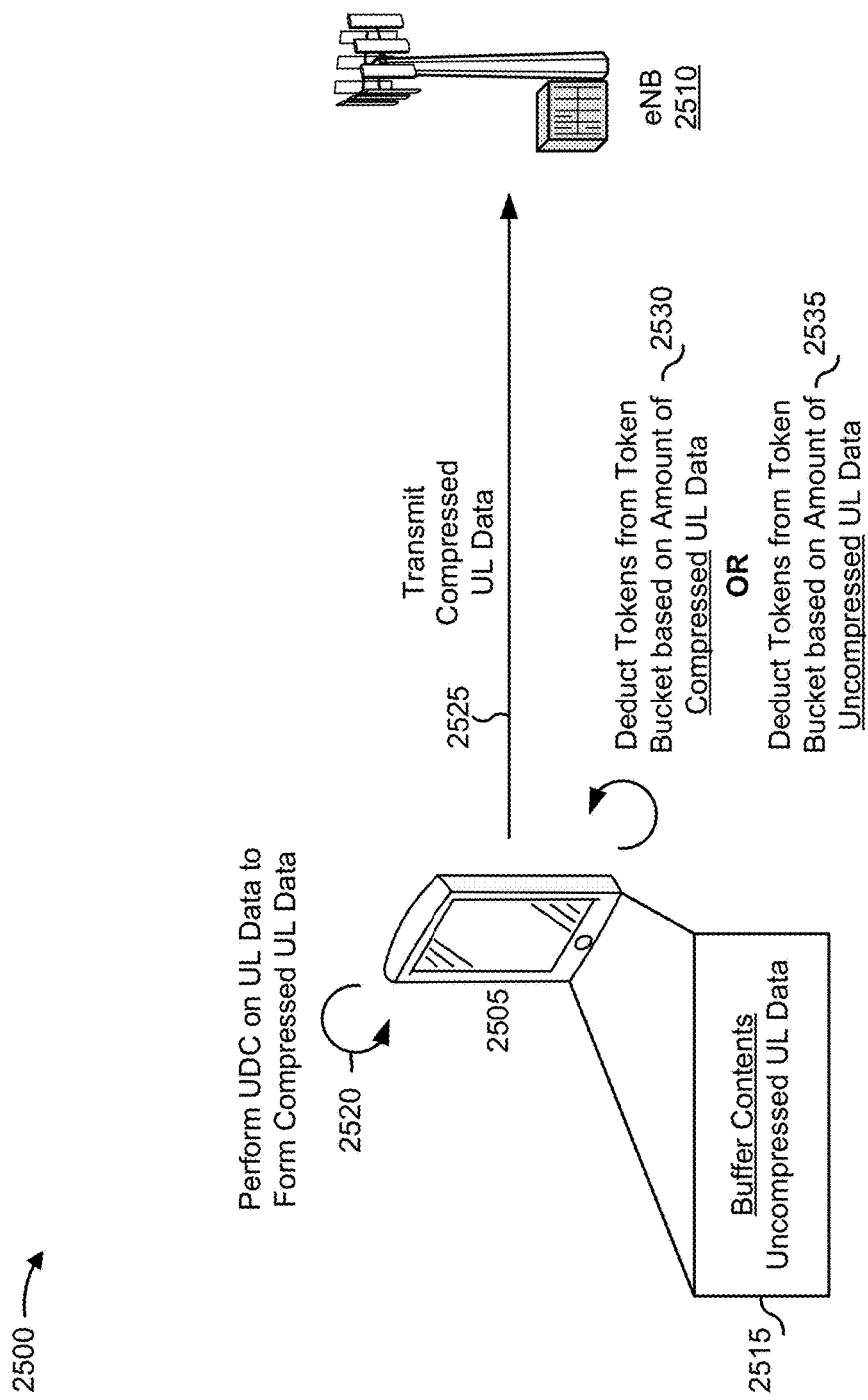
FIG. 25 is a diagram illustrating an example of determining whether tokens are deducted from a token bucket based at least in part on a compressed portion of uplink data, in accordance with various aspects of the present disclosure.

FIG. 25 is a diagram illustrating an example 2500 of determining whether tokens are deducted from a token bucket based at least in part on a compressed portion of uplink data, in accordance with various aspects of the present disclosure. For the purposes of FIG. 25, UE 2505 is configured to perform UDC on uplink data to be transmitted via a radio bearer in the uplink direction to eNB 2510. UE 2505 may correspond to a UE described in connection with one or more other figures of the present disclosure. Similarly, eNB 2510 may correspond to an eNB described in connection with one or more other figures of the present disclosure.

As shown in FIG. 25, UE 2505 may include an uplink buffer associated with transmitting uplink data to eNB 2510. As shown, the uplink buffer 2515 may include uncompressed uplink data that is to be transmitted via a radio bearer in the uplink direction. In some aspects, the radio bearer may correspond to an uplink logical channel associated with a token bucket for performing logical channel prioritization, as described in further detail below. As shown in FIG. 25, UE 2505 may perform UDC on the uplink data, included in the uplink buffer 2515, to form compressed uplink data.

As shown in FIG. 25, after compressing the uplink data, UE 2505 may provide the uplink data for transmission (e.g., from the PDCP layer associated with performing UDC to the MAC layer), and may transmit the compressed uplink data via the radio bearer in the uplink direction. As further shown, UE 2505 may determine a manner in which tokens are to be deducted from the token bucket. For example, as shown in FIG. 25, UE 2505 may be configured to deduct tokens from the token bucket based at least in part on an amount of the compressed uplink data, and may deduct tokens accordingly. Alternatively, as shown, UE 2505 may be configured to deduct tokens from the token bucket based at least in part on an amount of the uplink data before compression, and may deduct tokens accordingly.

In some aspects, the manner in which UE 2505 deducts tokens may be configured by the UE. For example, UE 2505 may be configured to deduct tokens based at least in part on an amount of compressed uplink data for uplink data corresponding to a first logical channel, and may be configured to deduct tokens based at least in part on an amount of uplink data before compression for uplink data corresponding to a second logical channel. In some aspects, deducting the tokens based at least in part on the amount of compressed uplink data or the amount of uplink data before compression may result in increased overall UE throughput associated with a plurality of logical channels of UE 2505. Additional details regarding deducting tokens in the above manners are described below with regard to FIG. 26, among others.

As indicated above, FIG. 25 is provided as an example. Other examples are possible and may differ from what was described in connection with FIG. 25.

Figure 26:
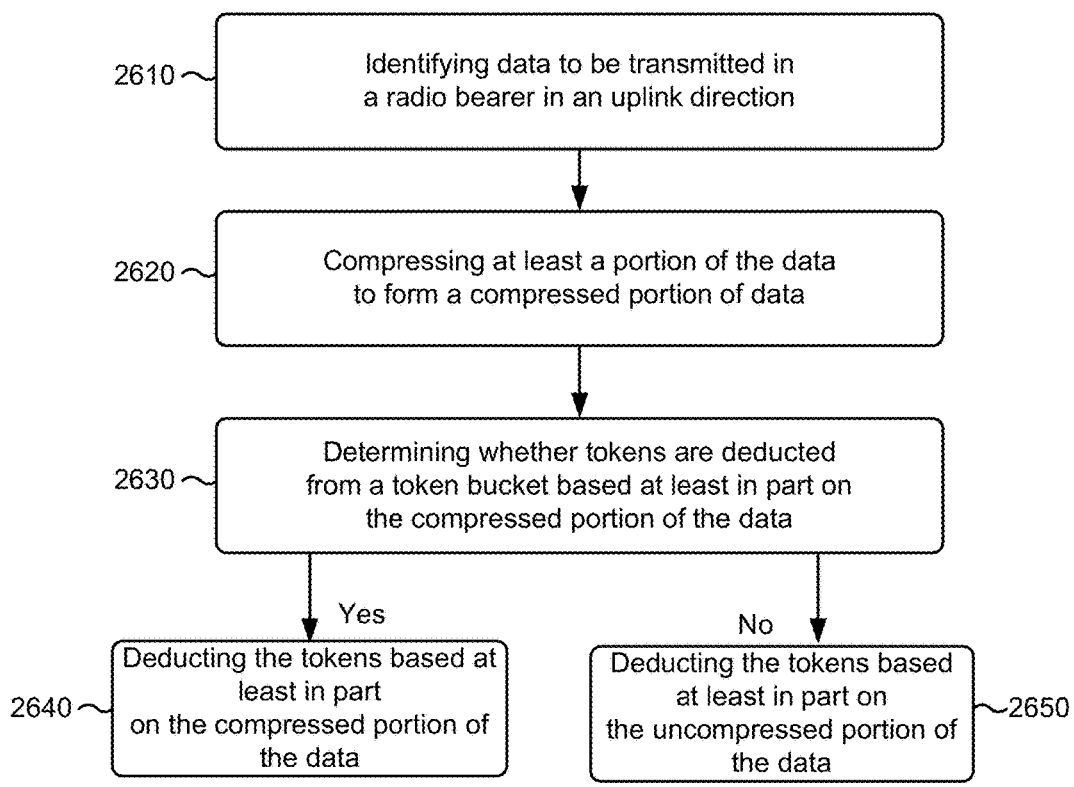
FIG. 26 is a flow diagram of an example process relating to an example shown in FIG. 25, in accordance with various aspects of the present disclosure.

FIG. 26 is a flow diagram of an example process 2600 relating to example 2500 shown in FIG. 25, in accordance with various aspects of the present disclosure. In some aspects, one or more process blocks of FIG. 26 may be performed by one or more UEs described herein. The UE described in associated with example process 2600 may correspond to a UE described in connection with one or more other figures of the present disclosure. In some aspects, one or more process blocks of FIG. 26 may be performed by another device or a plurality of devices separate from or including a UE.

As shown in FIG. 26, process 2600 may include identifying data to be transmitted in a radio bearer in an uplink direction (block 2610). For example, a UE may identify uplink data to be transmitted in a radio bearer in an uplink direction. In some aspects, the UE may identify the uplink data to be transmitted based at least in part on storing the uplink data in one or more uplink data buffers of the UE.

In some aspects, the UE may maintain one or more uplink buffers, where each buffer may correspond to a radio bearer in the uplink direction, and may store uplink data to be transmitted in a corresponding radio bearer. In some aspects, each of the radio bearers in the uplink direction may be mapped to an uplink logical channel (herein sometimes referred to as a "logical channel"), associated with the MAC layer, and may have a priority and a prioritized bit rate (PBR).

The PBR may include a (e.g., guaranteed) minimum data rate to be received by the uplink logical channel before a lower priority uplink logical channel is permitted to transmit uplink data. In some aspects, the UE may perform logical channel prioritization based at least in part on priorities of two or more logical channels (e.g., such that a higher priority logical channel receives an assigned PBR before a lower priority logical channel is permitted to transmit uplink data).

In some aspects, an uplink logical channel may be associated with a corresponding token bucket, where the token bucket may collect tokens at a rate corresponding to the PBR of the logical channel up to a maximum token bucket size. Tokens may be deducted from the token bucket based at least in part on an uplink transmission that includes uplink data corresponding to the uplink logical channel. In some aspects, the UE may use a token bucket algorithm to serve a plurality of logical channels. For example, the UE may serve a highest priority logical channel until a token bucket, associated with the highest priority logical channel, is empty (e.g., indicating that the logical channel has achieved a bit rate faster than the PBR). The UE may then serve a next highest priority logical channel until a token bucket, associated with the next highest logical channel, is empty (or until the highest priority token bucket receives additional tokens), and so on. In some aspects, the UE may identify the uplink data to be transmitted in the radio bearer in the uplink direction as uplink data stored in an uplink buffer corresponding to an uplink logical channel associated with a token bucket.

As further shown in FIG. 26, process 2600 may include compressing a portion of the data to form a compressed portion of data (block 2620). For example, the UE may compress a portion of the uplink data to form a compressed portion of uplink data. In some aspects, the UE may compress the portion of the uplink data after the UE identifies the uplink data to be transmitted in the radio bearer in the uplink direction.

In some aspects, the UE may compress the portion of the uplink data based at least in part on performing UDC on the uplink data. For example, the UE may identify uplink data to be transmitted in the radio bearer in the uplink direction, and may compress one or more packets, included in the uplink data, by performing UDC on the one or more packets when, for example UDC is enabled on the uplink logical channel associated with the uplink data. In some aspects, as described above, UDC may be performed at the PDCP layer such that an amount of uplink data provided to the MAC layer is less than an amount of data at the PDCP layer.

In some aspects, the portion of the uplink data may include uplink data associated with one or more logical channels. For example, the UE may be configured to perform UDC on uplink data corresponding to a subset of logical channels (e.g., rather than performing UDC on uplink data corresponding to all logical channels of the UE). In other words, in some aspects the UE may compress a portion of the uplink data that corresponds to one or more radio bearers in the uplink direction for which UDC is enabled. In some aspects, UDC may not be enabled on one or more logical channels associated with the UE.

As further shown in FIG. 26, process 2600 may include determining whether tokens are deducted from a token bucket based at least in part on the compressed portion of data (e.g., block 2630). For example, the UE may determine whether tokens are deducted from a token bucket, corresponding to the uplink logical channel associated with the uplink data, based at least in part on the compressed portion of uplink data. In some aspects, the UE may determine whether the tokens are deducted from the token bucket based at least in part on the compressed portion of uplink data after the UE compresses the portion of uplink data. Additionally, or alternatively, the UE may determine whether the tokens are deducted from the token bucket based at least in part on the compressed portion of uplink data when the UE provides the compressed uplink data for uplink transmission.

In some aspects, a configuration of the UE may dictate whether tokens are deducted from the token bucket based at least in part on the compressed portion of the uplink data. For example, the UE may be configured to deduct tokens from the token bucket based at least in part on the compressed portion of uplink data (e.g., such that the deducted tokens correspond to an amount of the compressed portion of the uplink data). As another example, the UE may be configured to deduct tokens from the token bucket based at least in part on the portion of uplink data before compression (e.g., such that the deducted tokens correspond to an amount of the uncompressed portion of the uplink data rather than the amount of the compressed portion of the uplink data). In some aspects, the configuration of the UE may correspond to a single logical channel of the UE, a plurality of logical channels of the UE, all logical channels of the UE, or the like.

In some aspects, the UE may determine whether tokens are deducted from the token bucket based at least in part on the compressed portion of uplink data when the UE provides the data for uplink transmission. The UE may then deduct tokens from the token bucket, accordingly. For example, the UE may provide a compressed portion of uplink data, associated with a logical channel, for uplink transmission. Here, the UE may determine, based at least in part on a configuration of the UE associated with the logical channel, whether tokens, associated with the compressed portion of uplink data, are to be deducted based at least in part on an amount of the compressed portion of uplink data or based an amount of the uplink data before compression, and may deduct the tokens, accordingly.

As further shown in FIG. 26, if the UE determines that the UE is to deduct tokens corresponding to the compressed portion of the data (block 2630—YES), then process 2600 may include deducting the tokens from the token bucket based at least in part on the compressed portion of the data (block 2640). In some aspects, deducting the tokens corresponding to the compressed portion of uplink data may cause a PBR, associated with the uplink logical channel, to be satisfied at the MAC layer (e.g., while a bit rate at the application layer may be higher or lower than the PBR). Additionally, or alternatively, deducting the tokens corresponding to the compressed portion of uplink data may cause a guaranteed bit rate, associated with the logical channel, to be greater than the PBR associated with the uplink logical channel.

In some aspects, deducting the tokens corresponding to the compressed portion of uplink data may result in an increased overall UE throughput associated with two or more logical channels. For example, if the UE deducts tokens corresponding to a compressed portion of the uplink data associated with the first logical channel, then overall UE throughput, associated with the first logical channel and a second logical channel, may increase (e.g., even though UDC is performed on the uplink data associated with the first logical channel only).

Additionally, or alternatively, deducting the tokens corresponding to the compressed portion of the uplink data may result in an increased bit rate associated with a logical channel associated with the compressed uplink data. For example, deducting the tokens corresponding to the compressed portion of uplink data may cause a first bit rate, associated with a first logical channel for which UDC was performed, to be greater than a bit rate of the first logical channel without performing UDC. In this example, a second bit rate, associated with a second logical channel (e.g., a logical channel for which UDC was not performed), may be approximately equal to a bit rate of the second logical channel without data compression. In this case, overall UE throughput may be increased (e.g., since the first logical channel receives a higher bit rate than received without UDC and the second logical channel receives a same bit rate as that received without UDC). This increased UE throughput for the first logical channel may result when the first logical channel has a higher priority than the second logical channel or when the first logical channel has a lower priority than the second logical channel.

As further shown in FIG. 26, if the UE determines that the UE is not to deduct tokens corresponding to the compressed portion of the k data (block 2630—NO), then process 2600 may deducting the tokens from the token bucket based at least in part on the portion of the data before compression (block 2650). In some aspects, the UE may determine that the UE is not to deduct tokens corresponding to the compressed portion of the uplink data, the UE may determine that the UE is to deduct tokens corresponding to the portion of the uplink data before compression (e.g., a size of the uncompressed portion of the uplink data), and the UE may deduct the tokens from the token bucket.

In some aspects, deducting the tokens corresponding to the portion of uplink data before compression may cause a PBR, associated with the uplink logical channel, to be satisfied at the application layer (e.g., while a bit rate at the MAC layer may be higher or lower than the PBR). Additionally, or alternatively, deducting the tokens corresponding to the portion of uplink data before compression may cause a guaranteed bit rate, associated with the logical channel, to be approximately equal to the PBR associated with the uplink logical channel.

In some aspects, deducting the tokens corresponding to the portion of the uplink data before compression may result in an increased bit rate for a logical channel that is different than a logical channel associated with the compressed uplink data. For example, deducting the tokens corresponding to the portion of uplink data before compression may cause a first bit rate, associated with a first logical channel (e.g., a logical channel for which UDC was not performed), to be greater than a bit rate of the first logical channel without performing UDC on uplink data associated with a second logical channel. In this example, a second bit rate, associated with the second logical channel (e.g., a logical channel for which UDC was performed), may be approximately equal to a PBR associated with the second logical channel. In this case, overall UE throughput may be increased (e.g., since the first logical channel receives a higher bit rate than received without UDC being performed on uplink data of the second logical channel). This increased UE throughput for the first logical channel may result when the first logical channel has a higher priority than the second logical channel or when the first logical channel has a lower priority than the second logical channel.

As discussed above, in some aspects, deducting tokens based at least in part on the compressed portion of data or based at least in part on the uncompressed portion of the data may affect a throughput associated with the logical channel for which UDC was performed and/or another logical channel (e.g., a logical channel for which UDC was not performed).

As an example, a UE is configured to transmit first uplink data, associated with a first logical channel (e.g., LC1) and a PBR (e.g., 8 kilobytes per second (kBps)), and second uplink data associated with a second logical channel (e.g., LC2) and the same PBR. Further, LC1 has a higher priority than LC2, and that LC1 and LC2 have unlimited queues of uplink data to be transmitted. Finally, the UE achieves a compression gain of 50% when compressing uplink data using UDC, and that the eNB provides the UE with an uplink transmission grant of a distinct size (e.g., 12 bytes) at distinct intervals of time (e.g., each millisecond for a period of 20 seconds). The effects on throughput of LC1 and LC2, based at least in part on performing UDC on the LC1 uplink data and deducting tokens based in the two manners described above, may be illustrated in the following table:

| Case | LC1 MAC Throughput (kBps) | LC1 Appln Throughput (kBps) | LC2 MAC Throughput (kBps) | LC2 Appln Throughput (kBps) |
|---|---|---|---|---|
| No UDC | 8 | 8 | 4 | 4 |
| UDC on LC1 (Compressed UL Data Deductions) | 8 | 16 | 4 | 4 |
| UDC on LC1 (Uncompressed UL Data Deductions) | 4 | 8 | 8 | 8 |

As shown, in this example, if the UE does not perform UDC on uplink data for LC1 or uplink data for LC2, then only LC1 achieves the PBR (e.g., since LC2 achieves only 4 kBps at both the MAC layer and the application layer).

As further shown, in this example, deducting tokens based at least in part on the compressed portion of uplink data causes the logical channel for which UDC was performed (e.g., LC1) to achieve the PBR at the MAC layer, while deducting tokens based at least in part on the uncompressed portion of the uplink data causes the logical channel for which UDC was performed to achieve the PBR at the application layer.

As also shown, in this example, deducting tokens based at least in part on the compressed portion of uplink data causes the logical channel for which UDC was performed (e.g., LC1) to achieve a higher bit rate as compared to the no UDC case (e.g., 16 kBps rather than 8 kBps at the application layer), while causing the logical channel for which UDC was not performed (e.g., LC2) to achieve a bit rate that is equal to the bit rate achieved by LC2 when UDC was not performed (e.g., 4 kBps).

As further shown, in this example, deducting tokens based at least in part on the uncompressed portion of the uplink data causes the logical channel for which UDC was performed (e.g., LC1) to achieve a bit rate that is equal to the bit rate achieved by LC1 when UDC was not performed (e.g., 8 kBps at the application layer), while causing the logical channel for which UDC was not performed (e.g., LC2) to achieve a higher bit rate as compared to the no UDC case (e.g., 8 kBps rather than 4 kBps).

As shown, in this example, deducting tokens using either method causes an increase in overall UE throughput as compared to the no UDC case (e.g., 8 kBps+4 kBps=12 kBps at the application layer for no UDC<8 kBps+8 kBps=16 kBps at the application for deductions based at least in part on the uncompressed uplink data<16 kBps+4 kBps=20 kBps at the application layer for deductions based at least in part on the compressed uplink data). In this way, benefits of performing UDC may be seen on a logical channel for which UDC is performed and/or a logical channel for which UDC is not performed. Similar effects may result from other examples, such as when UDC is applied to a lower priority logical channel (e.g., LC2 rather than LC1).

In this way, UE throughput, associated with a plurality of logical channels, may be increased due to implementation of UDC. Moreover, logical channel prioritization, associated with the plurality of logical channels, may be maintained even while implementing UDC on one or more of the plurality of logical channels.

Although FIG. 26 shows example blocks of process 2600, in some aspects, process 2600 may include additional blocks, fewer blocks, different blocks, or differently arranged blocks than those depicted in FIG. 26. Additionally, or alternatively, two or more of the blocks of process 2600 may be performed in parallel.

Figure 27:
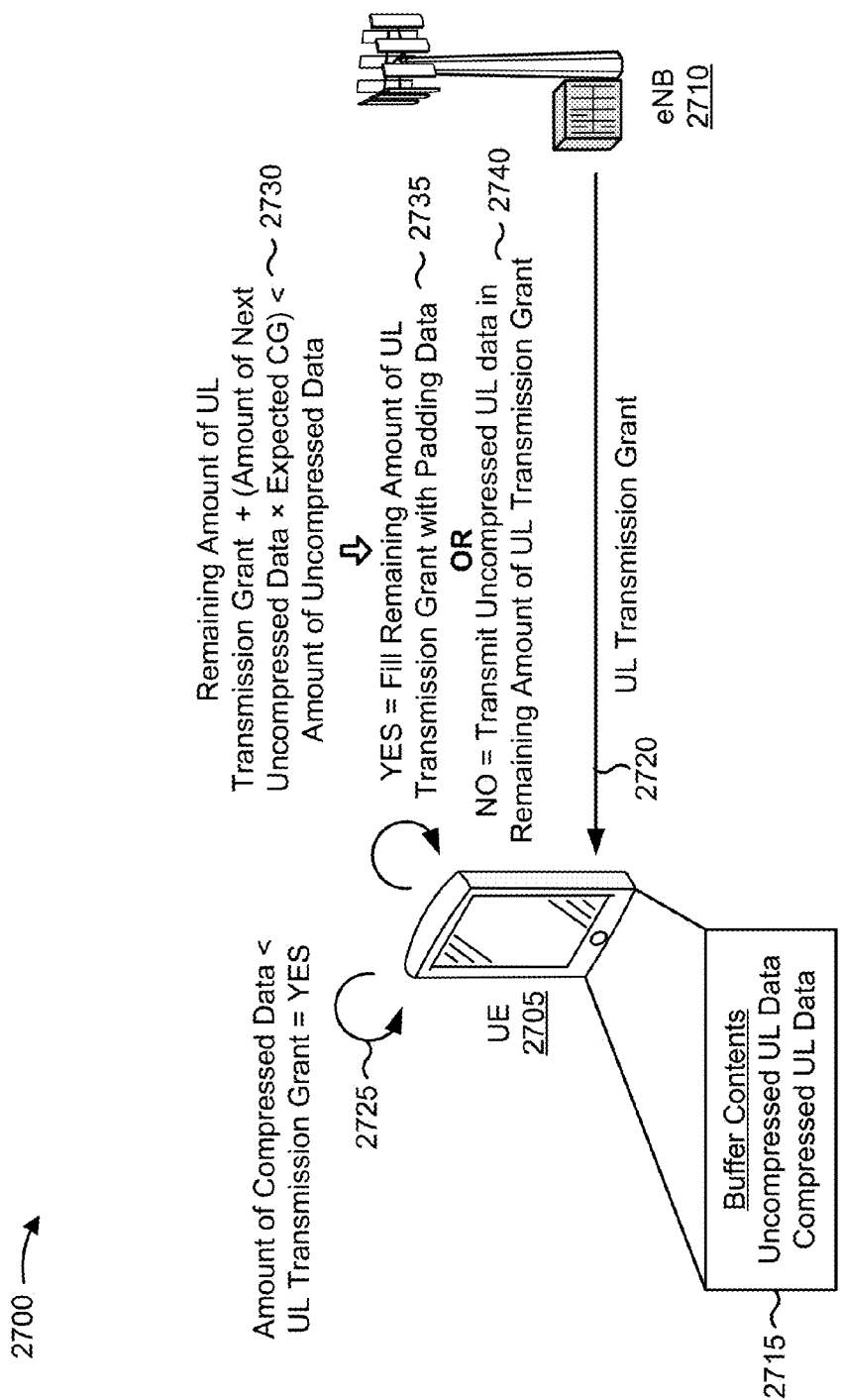
FIG. 27 is a diagram illustrating an example of transmitting compressed uplink data for an uplink transmission based at least in part on a determination of whether to fill a remaining amount of resources of an uplink transmission grant with uncompressed uplink data, in accordance with various aspects of the present disclosure.

FIG. 27 is a diagram illustrating an example 2700 of transmitting compressed uplink data for an uplink transmission based at least in part on a determination of whether to fill a remaining amount of resources of an uplink transmission grant with uncompressed uplink data, in accordance with various aspects of the present disclosure.

In some cases, when a UE receives an uplink transmission grant, one or more uplink buffers of the UE may not include a sufficient amount of compressed uplink data to fill the uplink transmission grant. As such, the UE may fill a remaining amount of resources (e.g., an amount of resources remaining in the uplink transmission grant after the compressed uplink data is included in the uplink transmission grant) with padding data or uncompressed uplink data. Filling the remaining resources with padding data may result in a waste of resources of the uplink transmission grant, as may filling the remaining resources with uncompressed uplink data (e.g., since filling the remaining resources with uncompressed uplink data prevents future compression of the uncompressed uplink data due to segmenting). Therefore, the UE may determine which of these options most reduces the waste of uplink resources in a given situation. As described below, the UE may make this determination across uplink transmission grants rather than with regard to a single uplink transmission grant.

For the purposes of FIG. 27, UE 2705 is configured to perform UDC on uplink data to be transmitted via a radio bearer in the uplink direction to eNB 2710. UE 2705 may correspond to a UE described in connection with one or more other figures of the present disclosure. Similarly, eNB 2710 may correspond to an eNB described in connection with one or more other figures of the present disclosure.

As shown in FIG. 27, UE 2705 may include one or more uplink buffers associated with transmitting uplink data to eNB 2710. As shown, the one or more uplink buffers may include uncompressed uplink data and compressed uplink data. As shown in FIG. 27, eNB 2710 may provide, to UE 2705, an uplink transmission grant. The uplink transmission grant may include a grant that identifies an amount resources that the UE may use to transmit uplink data via a radio bearer in the uplink direction.

As shown in FIG. 27, based at least in part on the amount of resources identified in the uplink transmission grant and an amount of the compressed data included in the one or more uplink buffers, UE 2705 may determine that the amount of compressed uplink data is less than the amount of resources identified in the uplink transmission grant. In other words, UE 2705 may determine that the one or more uplink buffers of UE 2705 does not include an amount of compressed uplink data that will fill the uplink transmission grant.

As shown in FIG. 27, based at least in part on determining that the amount of compressed uplink data is less than the amount of resources in the uplink transmission grant, UE 2705 may determine an amount of remaining resources of the uplink transmission grant (e.g., an amount of resources of the uplink transmission grant remaining after taking into account the compressed data).

As further shown, UE 2705 may determine a predicted amount of compressed uplink data (e.g., associated with uncompressed uplink data to be provided for uplink transmission) by multiplying an amount of uncompressed uplink data (e.g., a size of a packet of the uncompressed uplink data) and a compression gain stored or accessible by UE 2705. As shown, UE 2705 may then determine whether a combination (e.g., an addition) of the remaining amount of resources and the predicted amount of uplink data, is less than the amount of the uncompressed uplink data.

As shown in FIG. 27, based at least in part on the determination that the addition of the remaining amount of resources and the predicted amount of uplink data is less than the amount of the uncompressed uplink data, UE 2705 may determine that UE 2705 is not to transmit the uncompressed uplink data in the uplink transmission grant, and may fill the remaining amount of resources with padding data. The padding data may include arbitrary data and/or data that conveys no meaningful information. In some aspects, UE 2705 may alternatively fill the remaining amount of uplink resources with uplink data corresponding to a different logical channel (e.g., a logical channel with a lower priority than the logical channel associated with the uplink data).

Alternatively, based at least in part on a determination that the addition of the remaining amount of resources and the predicted amount of uplink data is not less than the amount of the uncompressed uplink data, UE 2705 may determine that UE 2705 is to transmit the uncompressed uplink data in the uplink transmission grant, and may fill the remaining amount of resources with the uncompressed uplink data. In this case, UE 2705 may segment a packet of the uncompressed uplink data (e.g., transmitting a first portion of the packet for the uplink transmission grant and transmitting a second portion of the packet for a future (e.g., next) uplink transmission grant).

In this way, UE 2705 may determine whether to fill a remaining amount of resources of an uplink transmission grant with uncompressed uplink data in order to reduce an overall amount of uplink resources (e.g., a number of bytes) used by UE 2705 to transmit uplink data. As such, UE 2705 implementing UDC reduces overall use of uplink resources (e.g., across a plurality of uplink transmission grants) when transmitting the uplink data.

As indicated above, FIG. 27 is provided as an example. Other examples are possible and may differ from what was described in connection with FIG. 27.

Figure 28:
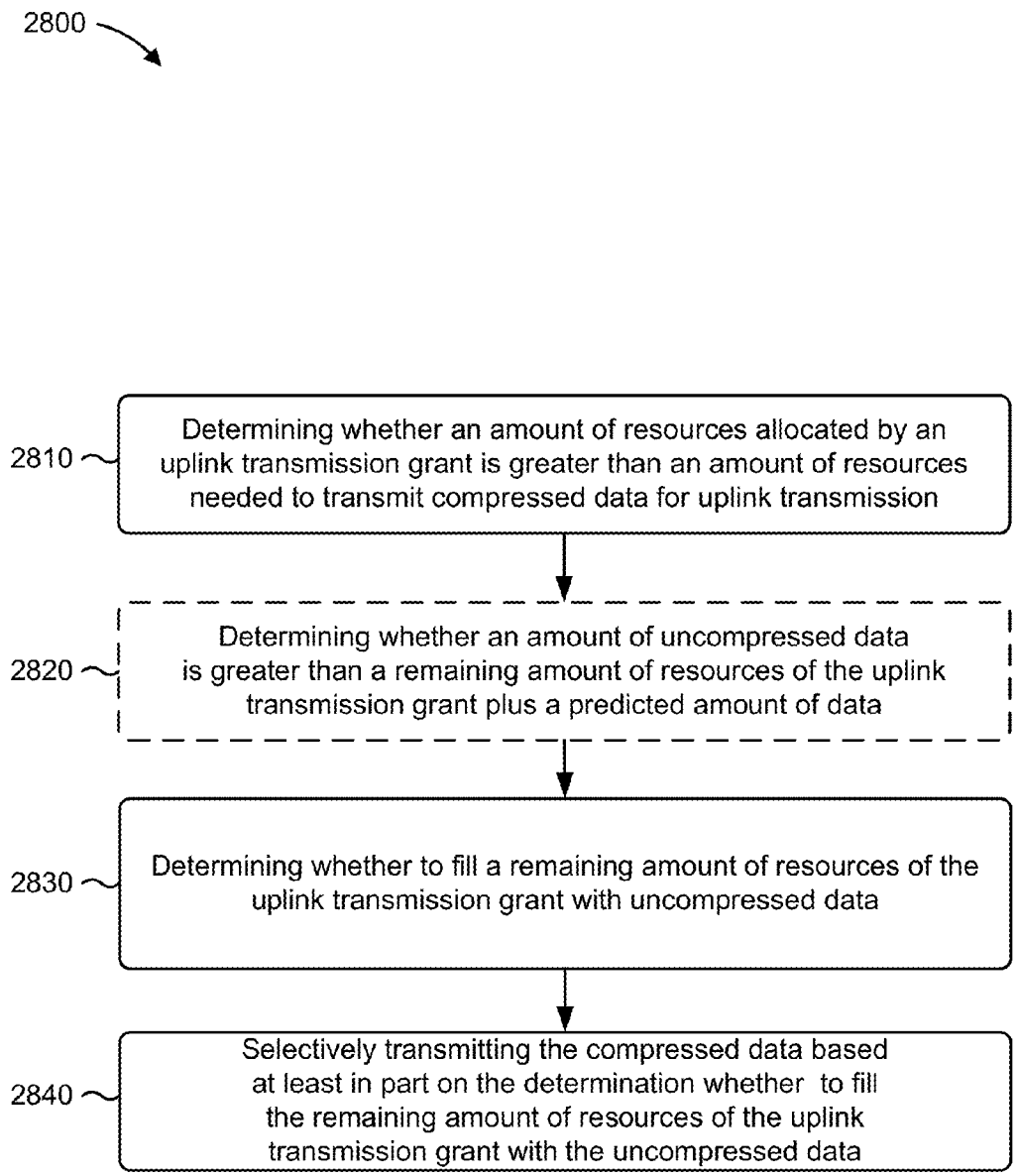
FIG. 28 is a flow diagram of an example process relating to an example shown in FIG. 27, in accordance with various aspects of the present disclosure.

FIG. 28 is a flow diagram of an example process 2800 relating to example 2700 shown in FIG. 27, in accordance with various aspects of the present disclosure. In some aspects, one or more process blocks of FIG. 28 may be performed by one or more UEs described herein. The UE described in associated with example process 2800 may correspond to a UE described in connection with one or more other figures of the present disclosure. In some aspects, one or more process blocks of FIG. 28 may be performed by another device or a plurality of devices separate from or including a UE.

As shown in FIG. 28, process 2800 may include determining whether an amount of resources allocated by an uplink transmission grant is greater than an amount of resources needed to transmit compressed uplink data for uplink transmission (block 2810). For example, a UE may determine whether an amount of resources allocated by an uplink transmission grant is greater than an amount of resources needed to transmit compressed uplink data for the uplink transmission. In other words, the UE may have compressed uplink data and uncompressed uplink data (awaiting UDC) for uplink transmission, and the amount of compressed uplink data may be less than the amount of resources allocated by the uplink transmission grant.

In some aspects, the UE may determine whether the amount of resources allocated by the uplink transmission grant is greater than the amount of resources needed to transmit the compressed uplink data based at least in part on receiving the uplink transmission grant from an eNB. The uplink transmission grant may include a grant that identifies an amount uplink resources that the UE may use to transmit uplink data via a radio bearer in the uplink direction. For example, the uplink transmission grant may include an amount (e.g., a size in bytes) of uplink data that the UE is permitted to transmit during a time identified in the uplink transmission grant.

In some aspects, based at least in part on receiving the uplink transmission grant, the UE may determine an amount of compressed uplink data corresponding to compressed uplink data in an uplink buffer of the UE. The UE may then compare the amount of the compressed uplink data and the amount of resources allocated by the uplink transmission grant and, based at least in part on the comparison, may determine whether the amount of resources allocated by the uplink transmission grant is greater than the amount of resources needed to transmit the compressed uplink data. In other words, the UE may determine whether an uplink buffer of the UE includes an amount of compressed uplink data sufficient to fill the uplink transmission grant. In some aspects, the UE may receive the uplink transmission grant before the UE performs UDC on uncompressed uplink data and, as such, the uplink buffer may not include compressed uplink data sufficient to fill the uplink transmission grant.

In some aspects, if the amount of resources is greater than the amount of compressed uplink data, the UE may determine a remaining amount of resources of the uplink transmission grant. For example, the UE may subtract the amount of the compressed uplink data from the amount of resources to determine a remaining amount of resources of the uplink transmission.

Additionally, or alternatively, if the amount of resources is less than or equal to the amount of the compressed uplink data, then the UE may fill the uplink transmission grant (e.g., entirely) with compressed uplink data and may transmit the compressed uplink data, accordingly.

As further shown in FIG. 28, process 2800 may include determining whether an amount of uncompressed data is greater than a remaining amount of resources of the uplink transmission grant plus a predicted amount of data (block 2820), and may include determining whether to fill the remaining amount of resources of the uplink transmission grant with uncompressed uplink data (block 2830). For example, the UE may determine whether the amount of uncompressed data is greater than a remaining amount of resources of the uplink transmission grant plus the predicted amount of data and may determine whether to fill the remaining amount of resources of the uplink transmission grant with uncompressed uplink data. In some aspects, the UE may perform block 2820 and block 2830 after the UE determines that the amount of resources allocated by the uplink transmission grant is greater than the amount of resources needed to transmit the compressed uplink data.

In some aspects, the UE may determine whether to fill the remaining amount of resources with uncompressed uplink data based at least in part on a predicted amount of uplink data. As described above, the predicted amount of uplink data may include a predicted amount of uplink data that will result from performing UDC on the uncompressed uplink data. In some aspects, as described above, the UE may determine the predicted amount of uplink data based at least in part on the amount of the uncompressed uplink data and an expected compression gain associated with performing UDC on the uncompressed uplink data. For example, the UE may determine a size of a next packet of uncompressed uplink data that is to be transmitted for uplink transmission, and may multiply the size of the next packet by the expected compression gain to determine the predicted amount of uplink data.

In some aspects, the UE may determine whether to fill the remaining amount of resources with uncompressed uplink data by adding the predicted amount of uplink data and the amount of remaining resources, and comparing a result of the addition to the amount of the uncompressed uplink data.

In some aspects, if the amount of the uncompressed uplink data is greater than the result of the addition of the predicted amount of uplink data and the amount of remaining resources, then the UE may determine that the UE is not to fill the remaining amount of resources with uncompressed uplink data. In this case, the UE may wait to provide the uncompressed uplink data as compressed uplink data (after UDC) in a future (e.g., next) uplink transmission grant. In some aspects, based at least in part on determining that the UE is not to fill the remaining amount of resources with uncompressed uplink data, the UE may fill the remaining amount of resources with padding data (e.g., arbitrary data, data that conveys no meaningful information, etc.). Additionally, or alternatively, the UE may fill the remaining amount of resources with uplink data for a different logical channel than a logical channel associated with the compressed data (e.g., a next highest priority logical channel).

In some aspects, the UE may use uplink resources more efficiently by not entirely filling the uplink transmission grant with uplink data (e.g., as compared to including uncompressed uplink data in the uplink transmission grant). For example, if the UE, when compressing the uncompressed uplink data, achieves a compression gain such that the amount of remaining resources plus an amount of the compressed uplink (e.g., resulting from compressing the uncompressed uplink data) is less than the amount of the uncompressed uplink data, then the UE will use less uplink resources to transmit the uplink data by waiting to transmit the uncompressed uplink data in a future uplink transmission grant.

In some aspects, the UE may store information that identifies the remaining amount of resources for use in determining whether the uncompressed uplink data is to be transmitted in a future uplink transmission grant (e.g., such that the remaining amount of unfilled resources in the uplink transmission grant may be taken into account when determining whether to include the uncompressed uplink data in a next uplink transmission grant).

Alternatively, if the amount of the uncompressed uplink data is not greater than the result of the addition of the predicted amount of uplink data and the amount of remaining resources, then the UE may determine that the UE is to fill the remaining amount of resources with uncompressed uplink data. In this case, the uncompressed uplink data may be segmented (e.g., divided) between the uplink transmission grant and one or more future uplink transmission grants, and UDC may not be possible for the segmented uncompressed uplink data.

As further shown in FIG. 28, process 2800 may include selectively transmitting the uncompressed uplink data based at least in part on the determination whether to fill the remaining amount of resources of the uplink transmission grant with uncompressed data (block 2840). For example, the UE may selectively transmit the uncompressed uplink data based at least in part on the determination whether to fill the remaining amount of resources of the uplink transmission grant with uncompressed data.

In some aspects, the UE may selectively transmit the uncompressed uplink data after the UE determines whether the UE is to fill the remaining amount of resources with uncompressed uplink data. For example, the UE may transmit the compressed uplink data and may also transmit padding data associated with filling the remaining amount of resources of the uplink transmission grant when the UE determines that the UE is not to fill the remaining amount of resources with the uncompressed uplink data.

As another example, the UE may transmit the compressed uplink data and may also transmit the uncompressed uplink data (e.g., to be segmented in order to fill the remaining amount of resources of the uplink transmission grant) when the UE determines that the UE is to fill the remaining amount of resources with the uncompressed uplink data.

For an example of such a selective transmission, the UE stores an amount of compressed uplink data (e.g., a first packet of 600 bytes), and an amount of uncompressed uplink data (e.g., a second packet of 500 bytes) at a time when the UE receives an uplink transmission grant of a distinct size (e.g., 1000 bytes). Further, the UE may expect a compression gain of 50% when compressing uncompressed uplink data. Here, the UE may determine that the amount of compressed data is less than the amount of resources of the uplink transmission grant (e.g., 600 bytes<1000 bytes), and that a remaining amount of resources after including the compressed uplink data in the uplink transmission grant is 400 bytes. Here, the UE may determine that a predicted amount of uplink data, associated with the uncompressed uplink data, is 250 bytes (e.g., 500 bytes×50%=250 bytes). The UE may then determine that the remaining amount of resources of the uplink transmission grant plus the predicted amount of uplink data is not less than the amount of the uncompressed data (e.g., 400 bytes+250 bytes=650 bytes>500 bytes). As such, the UE may determine that the UE is to transmit the uncompressed uplink data in the remaining resources of the uplink transmission grant (e.g., such that the uncompressed uplink data is segmented), and may transmit the uncompressed data accordingly.

As another example of a selective transmission, the UE stores an amount of compressed uplink data (e.g., a first packet of 900 bytes), and an amount of uncompressed uplink data (e.g., a second packet of 500 bytes) at a time when the UE receives an uplink transmission grant of a distinct size (e.g., 1000 bytes). Further, the UE may expect a compression gain of 50% when compressing uncompressed uplink data. Here, the UE may determine that the amount of compressed data is less than the amount of resources of the uplink transmission grant (e.g., 900 bytes<1000 bytes), and that a remaining amount of resources after including the compressed uplink data in the uplink transmission grant is 100 bytes. Here, the UE may determine that a predicted amount of uplink data, associated with the uncompressed uplink data, is 250 bytes (e.g., 500 bytes×50%=250 bytes). The UE may then determine that the remaining amount of resources of the uplink transmission grant plus the predicted amount of uplink data is less than the amount of the uncompressed data (e.g., 100 bytes+250 bytes=350 bytes<500 bytes). As such, the UE may determine that the UE is to wait to transmit the uncompressed uplink data in a future uplink transmission grant (e.g., after the uncompressed uplink data has been compressed), and the UE may fill the remaining resources of the uplink transmission with padding data.

In this way, the UE may determine whether to fill a remaining amount of resources of an uplink transmission grant with uncompressed uplink data, and may selectively transmit the uncompressed uplink data accordingly. Based at least in part on such a determination, the UE reduces an overall amount of uplink resources (e.g., a number of bytes) used to transmit uplink data.

Although FIG. 28 shows example blocks of process 2800, in some aspects, process 2800 may include additional blocks, fewer blocks, different blocks, or differently arranged blocks than those depicted in FIG. 28. Additionally, or alternatively, two or more of the blocks of process 2800 may be performed in parallel.

Techniques described herein may permit a UE, configured to perform UDC on uplink data, to carry out one or more MAC layer functions in a manner such that performance of the one or more MAC layer functions is improved (e.g., optimized) based at least in part on implementation of UDC on the uplink data. The UE may perform the one or more MAC layer functions in a manner such that overall performance of the UE is improved based at least in part on implementing UDC.

The foregoing disclosure provides illustration and description, but is not intended to be exhaustive or to limit the aspects to the precise form disclosed. Modifications and variations are possible in light of the above disclosure or may be acquired from practice of the aspects. For example, while the foregoing disclosure describes techniques for optimizing functions associated with data to be provided in the uplink direction, in some aspects, the described techniques may also apply to data to be provided in a downlink direction (e.g., from an eNB to a UE).

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

It will be apparent that the techniques described herein, may be implemented in different forms of hardware, firmware, or a combination of hardware and software. The actual specialized control hardware or software code used to implement these techniques is not limiting of the aspects. Thus, the operation and behavior of the techniques described herein without reference to specific software code—it being understood that software and hardware can be designed to implement the techniques based at least in part on the description herein.

Even though distinct combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover: a; b; c; a and b; a and c; b and c; and a, b and c.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based at least in part on" is intended to mean "based at least in part on" unless explicitly stated otherwise.

The detailed description set forth above in connection with the appended drawings describes example embodiments and does not represent all the examples that may be implemented or that are within the scope of the claims. The term "exemplary" used in this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes WCDMA and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method for wireless communications at a wireless device, comprising:
   determining a first content size of an uncompressed buffer, the uncompressed buffer stores a first uncompressed packet and a second uncompressed packet;
   determining a second content size of a compressed buffer, the compressed buffer stores a compressed packet that is a compressed copy of the first uncompressed packet, wherein the second uncompressed packet is unassociated with packets of the compressed buffer; and
   generating a buffer status report (BSR) that indicates an estimate of a buffer size, wherein the estimate of the buffer size is based at least in part on the compressed buffer storing the compressed copy of the first uncompressed packet of the uncompressed buffer, the second uncompressed packet, and a relationship between the first content size of the uncompressed buffer and the second content size of the compressed buffer; and
   transmitting the BSR to a receiving device.

2. The method of claim 1, further comprising:
   determining whether a packet is uncompressed or compressed based at least in part on contents of the uncompressed buffer and contents of the compressed buffer, wherein generating the BSR is based at least in part on an uncompressed service data unit (SDU) size if the packet is uncompressed or on a compressed SDU size if the packet is compressed.

3. The method of claim 1, further comprising:
   receiving an acknowledgement (ACK) indicating a successfully received packet;
   removing a compressed copy of the successfully received packet from the compressed buffer; and
   removing an uncompressed copy of the successfully received packet from the uncompressed buffer.

4. The method of claim 3, wherein receiving the ACK comprises:
   receiving a radio link control (RLC) ACK message corresponding to the successfully received packet.

5. The method of claim 3, wherein receiving the ACK comprises:
   receiving radio link control (RLC) ACK messages corresponding to previously transmitted packets of a packet data convergence protocol (PDCP) sequence.

6. The method of claim 1, further comprising:
   receiving an acknowledgement indicating a successfully received packet;
   determining that a previously transmitted packet of a packet data convergence protocol (PDCP) sequence corresponds to a hole in a receiver window; and
   omitting the successfully received packet from subsequent BSRs.

7. The method of claim 1, further comprising:
   determining a data compression scheme is disabled or reset;
   removing a content of the compressed buffer in response to the determination that the data compression scheme is disabled or reset; and
   generating a subsequent BSR based at least in part on a third content size of the uncompressed buffer.

8. The method of claim 1, further comprising:
   determining a compression gain based at least in part on the first uncompressed packet and the compressed packet, wherein generating the BSR is based at least in part on the compression gain.

9. The method of claim 8, wherein determining the compression gain comprises:
   determining a size of the first uncompressed packet;
   determining a size of the compressed packet; and
   comparing the size of the first uncompressed packet to the size of the compressed packet.

10. The method of claim 8, wherein generating the BSR comprises:
    scaling a third content size of the uncompressed buffer by the compression gain, wherein the third content size is based at least in part on the compressed buffer storing the compressed copy of the first uncompressed packet.

11. The method of claim 8, further comprising:
    identifying a subsequent uncompressed packet in the uncompressed buffer;
    identifying a subsequent compressed packet in the compressed buffer corresponding to the subsequent uncompressed packet;
    comparing the subsequent uncompressed packet and the corresponding subsequent compressed packet; and
    adjusting the compression gain based at least in part on the comparison.

12. The method of claim 11, wherein adjusting the compression gain comprises:
    determining an average compression gain based at least in part on the first uncompressed packet, the compressed packet, the subsequent uncompressed packet, and the corresponding subsequent compressed packet.

13. The method of claim 8, wherein determining the compression gain comprises:
    determining the compression gain based at least in part on a bearer.

14. The method of claim 13, wherein determining the compression gain comprises:
    determining the compression gain for all bearers with data compression enabled.

15. The method of claim 8, further comprising:
    initializing the compression gain at a predetermined value; and
    updating the compression gain based at least in part on the first uncompressed packet and the compressed packet.

16. The method of claim 1, further comprising:
    determining a predicted amount of buffer based at least in part on a third content size of the uncompressed buffer and an expected compression gain, wherein the BSR is generated based at least in part on the predicted amount of buffer.

17. The method of claim 16, further comprising:
    combining the predicted amount of buffer and a fourth content size of the compressed buffer to determine a total amount of buffer, wherein the BSR is generated based at least in part on the total amount of buffer.

18. An apparatus for wireless communications at a wireless device, comprising:
    a processor;
    memory in electronic communication with the processor; and
    instructions stored in the memory; wherein the instructions are executable by the processor to:

determine a first content size of an uncompressed buffer, the uncompressed buffer stores a first uncompressed packet and a second uncompressed packet;

determine a second content size of a compressed buffer, the compressed buffer stores a compressed packet that is a compressed copy of the first uncompressed packet, wherein the second uncompressed packet is unassociated with packets of the compressed buffer;

generate a buffer status report (BSR) indicating an estimate of a buffer size, wherein the estimate of the buffer size is based at least in part on the compressed buffer storing a compressed copy of the first uncompressed packet of the uncompressed buffer, the second uncompressed packet, and a relationship between the first content size of the uncompressed buffer and the second content size of the compressed buffer; and transmit the BSR to a receiving device.

* * * * *